United States Patent [19]
Kurobe et al.

[11] Patent Number: 5,479,212
[45] Date of Patent: Dec. 26, 1995

[54] PICTURE DATA CODING APPARATUS

[75] Inventors: Akio Kurobe, Tondabayashi; Shoichi Masaki, Katano, both of Japan

[73] Assignee: Matsushita Electric Industrial Co., Ltd., Osaka, Japan

[21] Appl. No.: 283,241

[22] Filed: Jul. 29, 1994

[30] Foreign Application Priority Data

Jul. 30, 1993 [JP] Japan .................................. 5-189986
Jul. 28, 1994 [JP] Japan .................................. 6-177261

[51] Int. Cl.$^6$ .................................................. H04N 7/50
[52] U.S. Cl. ........................ 348/409; 348/401; 348/402; 348/412; 348/413; 348/416; 348/419; 348/423; 348/715
[58] Field of Search .................... 348/401, 402, 348/409, 412, 413, 416, 419, 423, 715; H04N 7/133, 7/137

[56] References Cited

U.S. PATENT DOCUMENTS 5,260,783  11/1993  Dixit ....................................... 348/401
5,386,234   1/1995  Veltman ................................... 348/409

FOREIGN PATENT DOCUMENTS 39683      of 0000  Japan.
2100533    of 0000  Japan.

OTHER PUBLICATIONS

"A Study on Control Method for Low Rate Video Coding", The Vernal National Convention on the Electric Information Communication in 1990 (with partial English translation).

Primary Examiner—Howard W. Britton
Attorney, Agent, or Firm—Price, Gess & Ubell

[57] ABSTRACT

According to the picture data coding apparatus of the present invention, the picture data storage unit stores each frame inputted from the pre-process unit, and the frame memory stores the latest-transmitted decoded frame. The frame selection unit judges whether or not a frame under transmission can be displayed. If the frame has been judged to be incapable of being displayed, the frame selection unit judges whether or not each frame stored in the picture data storage unit 103 can be displayed or not, and selects the smallest numbered frame among frames which have been judged to be capable of being displayed. The coding unit predictive codes the selected frame by using the latest-transmitted frame stored in the frame memory 131 as a reference frame, thereby outputting it to the transmission buffer 127. These features can minimize frame skipping even when a frame under transmission becomes incapable of being displayed due to a burst error.

27 Claims, 24 Drawing Sheets

$$\boxed{\text{generation code amount (n)}} = \text{generation code amount (n-1)} * \frac{\text{null block number (n)} - \text{entire block number}}{\text{null block number (n-1)} - \text{entire block number}}$$

n : predictive code frame number
n-1: previous coded frame number

Fig. 10
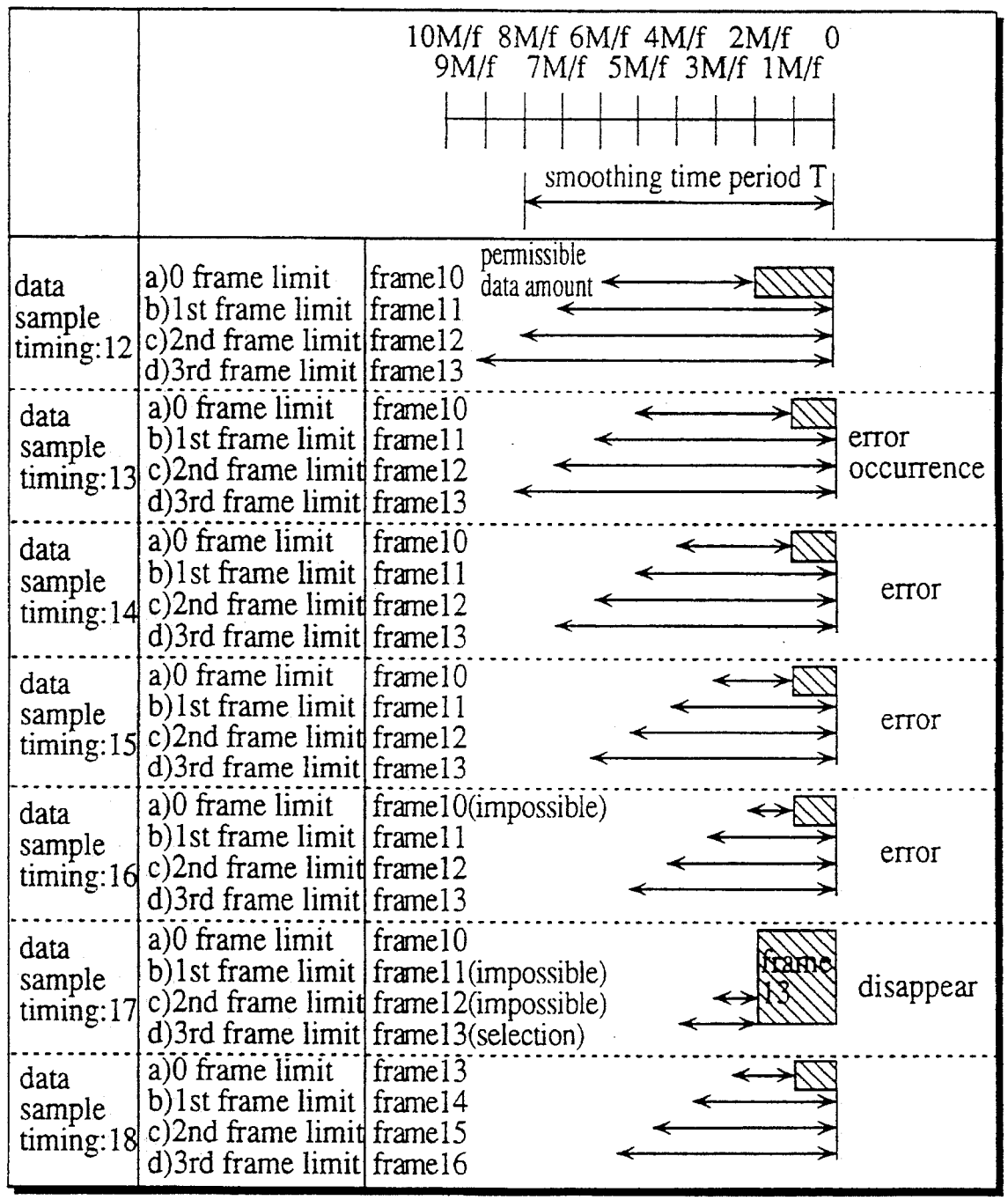
 :buffer data amount

PICTURE DATA CODING APPARATUS

BACKGROUND OF THE INVENTION (1) Field of the Invention

The present invention relates to a picture data coding apparatus for coding and decoding motion picture data which are used in video conference, video phones, and the like.

(2) Description of the Related Art

Various arts for processing digitalized motion picture data have been realized these days. Generally, picture data are transmitted in a large amount so that it is necessary to compress or reduce them in volume in order to make them available for record or transmission.

ITU (International Telecommunication Union) Recommendation H.261 Video Codec for Audiovisual Services is known as a picture data compression coding method for transmitting motion picture data at a low-bit rate of between 64Kbps and 2Mbps.

According to the method, a frame containing picture data to be coded (hereinafter a target frame) is divided into several blocks. Then, one block in a target frame is compared with an area corresponding to one block in another frame, which precedes the target frame, and as a result, a motion vector between them is detected. A motion vector indicates a one block area in the preceding frame, which block area has the closest correlation with a block to be coded in the target frame (hereinafter a target block), so that not only the prediction error between the target block and the corresponding one block area in the preceding frame, but the motion vector are coded and transmitted.

FIG. 1 shows the construction of a conventional picture data coding apparatus which is based on the picture data compression coding method H. 261. The apparatus has a pre-process unit 15, a coding unit 6, a transmission control unit 7, and an unillustrated decoding unit.

The pre-process unit 15 is provided with a YC separation and A/D conversion unit 12, an NTSC/CIF (Common Intermediate Format) conversion unit 13, and a pre-process filter 14. The YC separation and A/D conversion unit 12 divides an NTSC signal into a luminosity signal and a color difference signal and then applies them with A/D conversion. The NTSC/CIF conversion unit 13 converts an NTSC signal into a CIF signal. The use of the intermediate format allows communication among any video cordic, regardless of the difference in their TV systems.

There are two types of intermediate formats to be defined in H. 261, one of which is CIF where a frame is coded into a luminosity component (Y) and two color difference components (CB and CR). The codes indicating these components are defined in CCIR Recommendation 601. An example of the luminosity component has 288 horizontal lines per frame, each line consisting of 352 pixels. An example of the two color difference components has 144 horizontal lines per frame, each line consisting of 176 pixels.

The other type is QCIF where the numbers of pixels and lines are reduced to half of CIF. The selection between CIF and QCIF is done by using an external unit such as TTC standard -H221. In the case shown in FIG. 1, CIF is selected through the NTSC/CIF conversion unit 13.

The pre-process filter 14 is a digital filter for deleting the noise of signals to be inputted.

The coding unit 6 is provided with a coding sub unit 4 and a coding control unit 5. The coding control unit 5 checks the presence of an available storage area in a transmission buffer 27 which will be described later. When there is a certain amount of available storage area, the coding unit 6 makes the coding sub unit 4 perform a coding operation and output coded picture data to the transmission buffer 27.

The coding sub unit 4 is provided with a motion compensation frame prediction unit 16, a DCT (discrete Cosine Transform) 17, a quantization unit 18, a first variable length coding unit 19, a second variable length coding unit 20, and a multiplexer 21.

The motion compensation frame prediction unit 16 divides each frame into blocks consisting of 16×16 pixels and detects a block that has the smallest difference with a target block from the latest-transmitted frame, the detection being carried out in a range between −15 pixels and +15 pixels of the target block. Then, the motion compensation frame prediction unit 16 finds the motion vector which indicates positional relation between these blocks. When the difference between the target frame and another frame is supposed to be detected, the latter frame is called a reference frame.

The motion compensation frame prediction unit 16 further detects a block that has the smallest difference with the target block, from the latest-transmitted frame per luminosity component and color difference component, and finds the difference between the target block and the detected block. As a result, a prediction error between these frames is outputted.

The DCT 17 cross-converts the luminosity component and color difference component of the difference between the block detected by the motion compensation frame prediction unit 16 and the target block, thereby converting space coordinate data into frequency coordinate data. The quantization unit 18 linear- quantizes the conversion coefficients obtained by the cross-conversion. The first variable length coding unit 19 huffman-codes the quantized conversion coefficients, and the second variable length coding unit 20 huffman-codes a motion vector used for motion compensation. The multiplexer 21 multiplexes the prediction error coded in the first variable length coding unit 19 with the motion vector coded in the second variable length coding unit 20, and consequently forms a frame to be transmitted to the transmission buffer 27.

The unillustrated decoding unit is provided with a frame memory including a storage area which accommodates picture data corresponding to at least two frames. The decoding unit inverse-quantizes and inverse-DCT-converts the coded prediction error. The frame memory has already obtained the latest-coded frame that has been already decoded, to which the decoded prediction error that has been inverse-quantized and inverse-DCT-converted is added in order to decode the frame which is being coded.

The transmission control unit 7, which is provided with a transmission buffer 27, a re-transmission control unit 28, and a re-transmission buffer 29, controls data transmission depending on transmission conditions of a transmission path. The first-in first-out transmission buffer 27 receives frames from the multiplexer 21 and sequentially transmits them. The coded frames which were unable to be displayed on the display of the receiver are abandoned sequentially. The retransmission control unit 28 stores coded frame under transmission to the re-transmission buffer 29 to re-transmit it upon a re-transmission request. A frame under transmission is a frame which is being transmitted. The re-transmission control unit 28 detects an occurrence of an error such as a burst error caused by fading in a wireless circuit, thereby re-transmitting the data according to ARQ (automatic Repeat Request). The display unit of a receiver requests data re-transmission to the transmitter, upon detecting an occurrence of a burst error. The picture signals sent from the transmission control unit 7 are transmitted through the transmission path 22.

The operation of the conventional picture data coding apparatus which has the construction shown in FIG. 1 will be described with reference to the time charts (a)–(f) in FIG. 2.

The time chart (a) shows the timing for transmitting each frame from the pre-process unit 15 to the coding unit 6 at a rate of thirty frames per second. In the time chart (b), arrows indicate the timing for sampling frames. The time chart (c) shows a time required for coding each frame. The required time varies depending on the amount of picture data of prediction errors. The time chart (d) shows a time required for transmitting coded frame. The time chart (e) shows a time required for decoding coded frame. The time chart (f) shows the timing for displaying decoded frame on the display unit of the receiver.

The frame which has been received first has a large amount of picture data because a prediction error cannot be obtained without any frame transmitted so far. This holds true when a frame is received after a long interval. In the picture data coding transmission at a low bit rate of 64Kbps, one frame cannot be transmitted within one-frame time, which means a time period between the input of a frame and the input of a subsequent frame. If the amount one frame is reduced by, for example, enlarging quantization values, the image quality is deteriorated, which makes pictures to be displayed very unclear.

In order to avoid this deterioration of the image quality, all frames received are not sampled but some frames are extracted for sampling at a certain time interval and coded for transmission. This is called frame skipping. Although this makes the movement of motion pictures to be displayed on the receiver look a little discontinuous, the amount of picture data to be transmitted per frame can be increased accordingly.

The display timing shown in the time chart (f) follows the ending point of a smoothing time period "T" which immediately follows a sampling operation performed by the coding unit 6. The smoothing time period "T" is provided for compensating the disperse in the time required for coding or decoding different picture data, or for compensating delay jitter caused by the disperse in the time required for transmitting coded data. The delay jittering means the disperse in the time period between a sampling time and a displaying time of each frame on the display unit of the receiver. The jittering results from that the times required for coding, transmitting, and decoding each frame are different depending on the amount of data. If they were displayed without any amendment, something moving at a certain speed in the original motion picture might move sometimes faster and sometimes slower than expected. The frame which has been decoded before the end of the smoothing time period "T" is held until the smoothing time period "T" expires and then displayed. On the other hand, those frames which were unable to complete their decoding operations by the end of the smoothing time period "T" are abandoned. In FIG. 2, the smoothing time period "T" is made eight-frame time.

Each process for coding, transmitting, and decoding frames is carried out block by block. Among the frames inputted as shown in the time chart(a), a target frame, which has been sampled at the timing shown in the time chart (b) is divided into blocks each having 16×16 pixels. Then, the coding control unit 5 checks the presence of an available storage area in the transmission buffer 27. When there is such an area, a coding operation shown in the time chart (c) is started per block. Then, coded blocks are sequentially stored in the transmission buffer 27, and started to be transmitted on a first-in first-out basis as shown in the time chart (d). The coded blocks thus transmitted are decoded by the decoding unit of the receiver. If the decoding operations are finished before the smoothing time period "T" expires, the decoded frames are held until their display timing pointed by the arrows and then displayed on the display unit of the receiver. Each circle in the time chart (F) represents a frame which have been displayed in this timing, and each cross indicates a frame which have not been displayed in this timing.

As shown in the time chart (f), the frames 1, 4, and 16 are displayed eight-frame time after a respective sampling operation, and the frame 10 is not displayed because its decoding operation has not been completed within the smoothing time period "T".

As mentioned above, H. 261, which allows the transmission of picture data at a low bit rate of 64Kbps, is suitable for audiovisual services such as video phone with digital telephone and video conference. However, transmission errors caused by, for example, fading are inevitable when motion pictures are coded via a portable wireless circuit such as a digital codeless phone. Such burst errors caused by fading in the movable wireless circuit reach three- to six-frame time when the moving speed of the circuit is lower than walking speed.

In FIG. 2, it is assumed that the frame 10 has the same amount of picture data corresponding to a prediction error as the frame 1. In other words, the frame 10 is assumed to need two-frame time for a coding operation, three-frame time for a transmitting operation unless there is a transmission error, and one-frame time for a decoding operation. It is further assumed that a burst error is caused by the above-mentioned fading over four-frame time while the frame 10 is under transmission.

As shown in the time chart (d), the frame 10 contains picture data corresponding to three-frame time but one-third of them have not been transmitted because of the occurrence of a transmission error. If the transmission error disappears during the remaining one-frame time for transmission and another one-frame time for a decoding operation, the picture data can be displayed. In other words, the frame 10 has a possibility of being displayed before the frame 16 is inputted, so that the transmission control unit 7 continues to transmit the frame 10 by the frame 16 is inputted.

The coded frames stored in the transmission buffer 27 after the transmission of the frame 10 is started are abandoned when the display of the frame 10 has been judged to be impossible, because these frames have been coded by using the frame 10 or an earlier frame as a reference frame. The frame 10 is also abandoned because it has not been transmitted yet. Consequently, when it is judged that the frame 10 cannot be displayed because of the transmission error, the frame 16 can be started to be coded. Since the conventional picture data coding apparatus is not provided with a memory for storing a latest-transmitted frame, the frame 16 is intra-coded. The intra-coding operation unit to code picture data in a frame without detecting the prediction error between the frame and an immediately preceding frame. The frame 16 is displayed on the display unit of the receiver at the end of eight-frame time.

Thus, according to the conventional picture coding apparatus, due to the transmission error corresponding to four-frame time, as many as 12 frames are skipped before the frame 16 is displayed on the display unit of the receiver after the frame 4 has been displayed. Such too much frame skipping makes motion pictures on the display unit discontinuous, which may result in that a man in the picture suddenly appears or disappears.

As another problem is that if inter-frame coding operation is performed after the occurrence of a burst error, the generation data amount of a frame under transmission becomes large. As a result, the time required for transmitting frames increases, thereby producing another frame skipping after the frame has been transmitted.

If the smoothing time period "T" provided for absorbing delay jitters is expanded, more frames can be in time for display. However, the time difference between actually inputted motion pictures and their display are increased, and consequently, smooth conversation in the bidirectional video communication system such as video conference or a video phone are spoiled.

SUMMARY OF THE INVENTION

A first object of the present invention is to provide a motion picture coding apparatus capable of reducing the number of frames to be skipped when a frame under transmission fails to be displayed on a display time by the receiver owing to a transmission error, without extending a smoothing time period, which is provided between a sampling operation of the frame and a display operation of the frame.

The first object can be achieved by a picture data coding apparatus for predictive coding a series of inputted frames each composed of picture data, and for displaying the frames on a display of a receiver at an end of a predetermined smoothing time period. The smoothing time period follows a sampling operation of each frame and is provided for smoothing dispersion in time required for coding, transmitting, and decoding each sampled frame.

The picture data coding apparatus comprises the following units.

A picture data storage unit includes a storage area for storing at least one frame, receives the frames at a predetermined interval, samples every m frame received, and stores sampled frames to the storage area, the m being a natural number.

A latest-transmitted frame storage unit stores the same frame as a frame which has been transmitted latest.

A coding unit predictive codes each frame inputted.

A transmission unit transmits each coded frame to the receiver via a transmission path.

A first judging unit judges every predetermined point of time whether or not a frame under transmission can be displayed on the display of the receiver, from a remaining time before a displaying operation of the frame from a current time point, remaining amount of code of the frame, and a decode time of the frame. The frame under transmission is a frame which is being transmitted.

A second judging unit judges whether or not each frame stored in the picture data storage unit can be displayed on the display of the receiver, from a remaining time before a displaying operation of the frame from a current time point, amount of code of the frame, a coding time, and a decode time of the frame.

A system control unit for, when the first judging unit has judged that the frame under transmission cannot be displayed, directing the picture data storage unit to transfer a frame stored therein to the second judging unit. When the second judging unit has judged that the frame stored in the picture data storage unit can be displayed, directing the picture data storage unit to transfer the frame that has been judged to be capable of being displayed, to the coding unit, and further directing the latest-transmitted frame storage unit to transfer a latest-transmitted frame to the coding unit, as a reference frame.

The picture data storage unit may comprise n (n is a natural number) picture data memories each including the storage area and a write control unit for writing each received frame to a respective one of the n picture data memories, by numbering each frame.

When the first judging unit has judged that a frame under transmission cannot be displayed, the system control unit may control the picture data storage unit to transfer frames stored in the n picture data memories starting from a smallest numbered frame to the second judging unit. When the second judging unit has judged that the frame stored in the picture data storage unit can be displayed, the system control unit may further control the picture data storage unit to transfer frames stored in the n picture data memories to the coding unit.

The first object can be also achieved by a picture data coding apparatus comprising the following units:

A reference frame storage unit, which has a capacity to store at least one frame, stores a predetermined frame.

A coding unit samples every predetermined number of inputted frames and predictive codes sampled frames by using, as reference frames, at least a latest-transmitted frame stored in the reference frame storage unit and a frame under transmission.

A coded data storage unit, which has storage areas to store at least two coded frames, stores predictive coded frames.

A transmission unit transmits each coded frame to the receiver via a transmission path.

A first judging unit judges every predetermined point of time whether or not a frame under transmission can be displayed on the display of the receiver, from a remaining time before a displaying operation of the frame from a current time point, amount of coded data of the frame, and a decode time of the frame.

A second judging unit judges whether or not each frame stored in the coded data storage unit can be displayed on the display of the receiver, from a remaining time before a displaying operation of the frame from a current time point, amount of coded data of the frame, and a decode time of the frame.

A system control unit, when the first judging unit has judged that the frame under transmission cannot be displayed, directs the coded data storage unit to read a frame which uses a predetermined frame as a reference frame among frames stored in the storage area and to transfer the read frame to the second judging unit. When the second judging unit has judged that the frame stored in the coded data storage unit can be displayed, the system control unit directs the coded data storage unit to transfer the frame that has been judged to be capable of being displayed, to the coding unit.

The first object can be also achieved by a picture data coding apparatus comprising the following units:

A coding unit predictive codes each inputted frame from a smallest numbered frame.

A transmission unit, which has a transmission buffer for storing coded frames to be transmitted, stores frames coded by the coding unit to the transmission buffer, and transfers each coded frame from a smallest numbered frame from the transmission buffer to the receiver via a transmission path.

A first judging unit judges whether or not a frame under transmission can be displayed on the display of the receiver at the end of the smoothing time period.

A picture data reproduction unit applies a process opposite to the coding operation to frames coded by the coding unit until the first judging unit judges that a frame under transmission cannot be displayed, and substantially reproduces picture data before the coding operation. When the first judging unit has been judged that a frame under transmission cannot be displayed, applies the process opposite to the coding operation to all the remaining frames in the transmission buffer at that time and substantially reproduces picture data before the coding operation.

A reproduced data storage unit has a storage area for storing at least four reproduced frames. Two of the four reproduced frames are a latest-transmitted frame and a latest-coded frame among frames reproduced by the picture data reproduction unit.

A second judging unit judges whether or not every remaining frame in the transmission buffer can be displayed on the display of the receiver at the end of the smoothing time period.

A system control unit controls the coding unit to code a reproduced frame which has been first judged to be capable of being displayed, by using, as a reference frame, a latest-transmitted frame whose receipt has been informed from the receiver. Then, the system control unit controls the coding unit to further code the next inputted frame in the same manner as a newly inputted frame by using, as a reference frame, a frame which has been coded immediately before the next inputted frame and to transfer the coded frame to the transmission unit.

The code amount prediction unit may further comprises the following units:

A latest-stored frame number storage unit stores a frame number of a latest-stored frame among frames stored in the picture data storage unit and the reproduced data storage unit.

A code amount prediction control unit, when the first judging unit has judged that the frame under transmission cannot be displayed, directs the coding unit to code a frame whose frame number is stored in the latest-stored frame number storage unit and the reproduced data by using the latest-transmitted frame as a reference frame and to detect its generation code amount. The code amount prediction control unit regards the generation code amount as generation code amount of a frame to be judged by the second judging unit.

A second object of the present invention is to provide a motion picture coding apparatus capable of reducing the number of calculations required for detecting a frame which can be displayed on the display of the receiver at the end of the smoothing time period and which can minimize the number of frames to be skipped, and consequently, capable of restricting the decrease in the entire process speed which results from the detecting operation of the frame and further restricting the increase in power consumption.

The second object can be achieved by the code amount prediction unit comprising the following units:

An inter-frame difference detection unit detects an inter-frame difference value between a frame to be judged by the second judging unit and a latest-transmitted frame by detecting a difference between one decoded block in the frame to be judged by the second judging unit and picture data of a block located in a corresponding position to the decoded block in the latest-transmitted frame.

A cross conversion unit cross converts the inter-frame difference detected by the inter-frame difference detection unit.

A no-data block detection unit regards a block whose cross conversion coefficients are all smaller than a predetermined threshold as a no-data block and detects a number of no-data blocks contained in the frame to be judged by the second judging unit.

A code amount calculation unit determines a number of effective blocks, based on the detected number of no-data blocks and calculates generation code amount, based on an equation shown below: (effective block number) = (entire block number) − (no-data block number) (generation code amount) = (generation code amount per effective block in a latest-coded frame) * (effective block number)

The code amount prediction unit may comprise the following units:

An inter-frame difference detection unit detects an inter-frame difference value between a frame to be judged and a latest-transmitted frame by detecting a difference between one decoded block in the frame to be judged by the second judging unit and picture data of a decoded block located in a corresponding position to the decoded block to be judged, in the latest-transmitted frame.

A cross conversion unit cross converts the inter-frame difference detected by the inter-frame difference detection unit.

A no-data block detection unit regards a block whose cross conversion coefficients are all smaller than a predetermined threshold as a no-data block and detects a number of no-data blocks contained in the frame to be judged by the second judging unit.

A code amount calculation unit determines a number of effective blocks, based on the detected number of no-data blocks and calculates generation code amount, based on an equation shown below: (effective block number) = (entire block number) − (no-data block number) (generation code amount) = (generation code amount per effective block in a latest-coded frame) * (effective block number)

The code amount prediction unit may comprise the following units:

An inter-frame difference detection unit detects an inter-frame difference value between a frame to be judged and a latest-transmitted frame by detecting a difference between one block in the frame to be judged by the second judging unit and picture data of a decoded block located in a corresponding position to the decoded block to be judged, in the latest-transmitted frame.

A cross conversion unit cross converts the inter-frame difference detected by the inter-frame difference detection unit.

A no-data block detection unit regards a block whose cross conversion coefficients are all smaller than a predetermined threshold as a no-data block and detects a number of no-data blocks contained in the frame to be judged by the second judging unit.

A code amount calculation unit determines a number of effective blocks, based on the detected number of no-data blocks and calculates generation code amount, based on an equation shown below: (effective block number) = (entire block number) − (no-data block number) (generation code amount) = (generation code amount per effective block in a latest-coded frame) * (effective block number).

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7a is a formula showing the relationship between generation code amount and the number of null blocks obtained from inter-frame difference values.

FIG. 7b is a graph illustrating the formula of FIG. 7a.

FIG. 10 explains the operation of the frame limit calculation unit 502 constructed as shown in FIG. 9.

FIG. 21 shows the construction of the picture data coding apparatus of the third embodiment provided with a transmission control unit 455a.

<EMBODIMENT 1>

Figure 1:
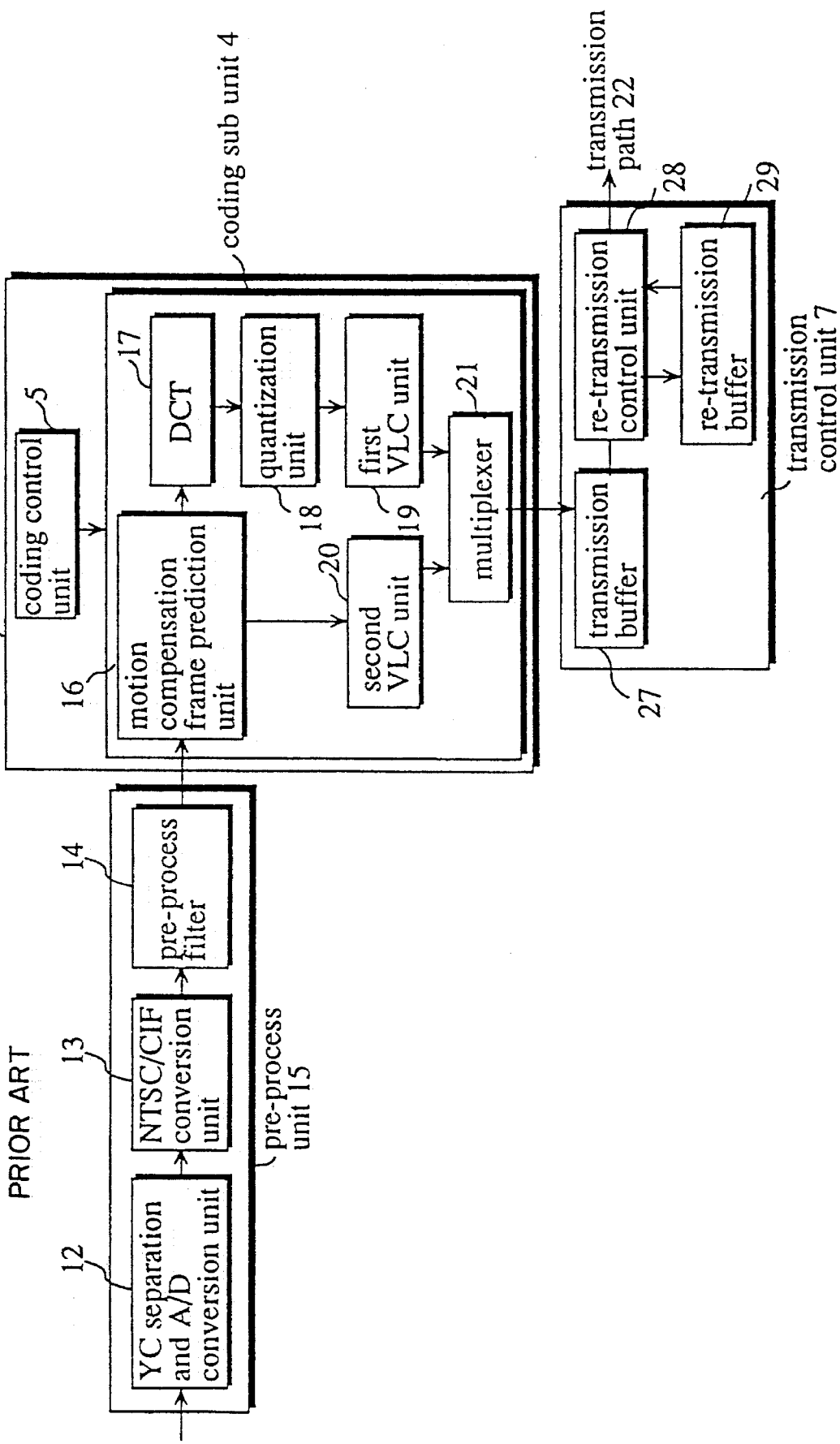
FIG. 1 shows the construction of a conventional picture data coding apparatus.
Figure 2:
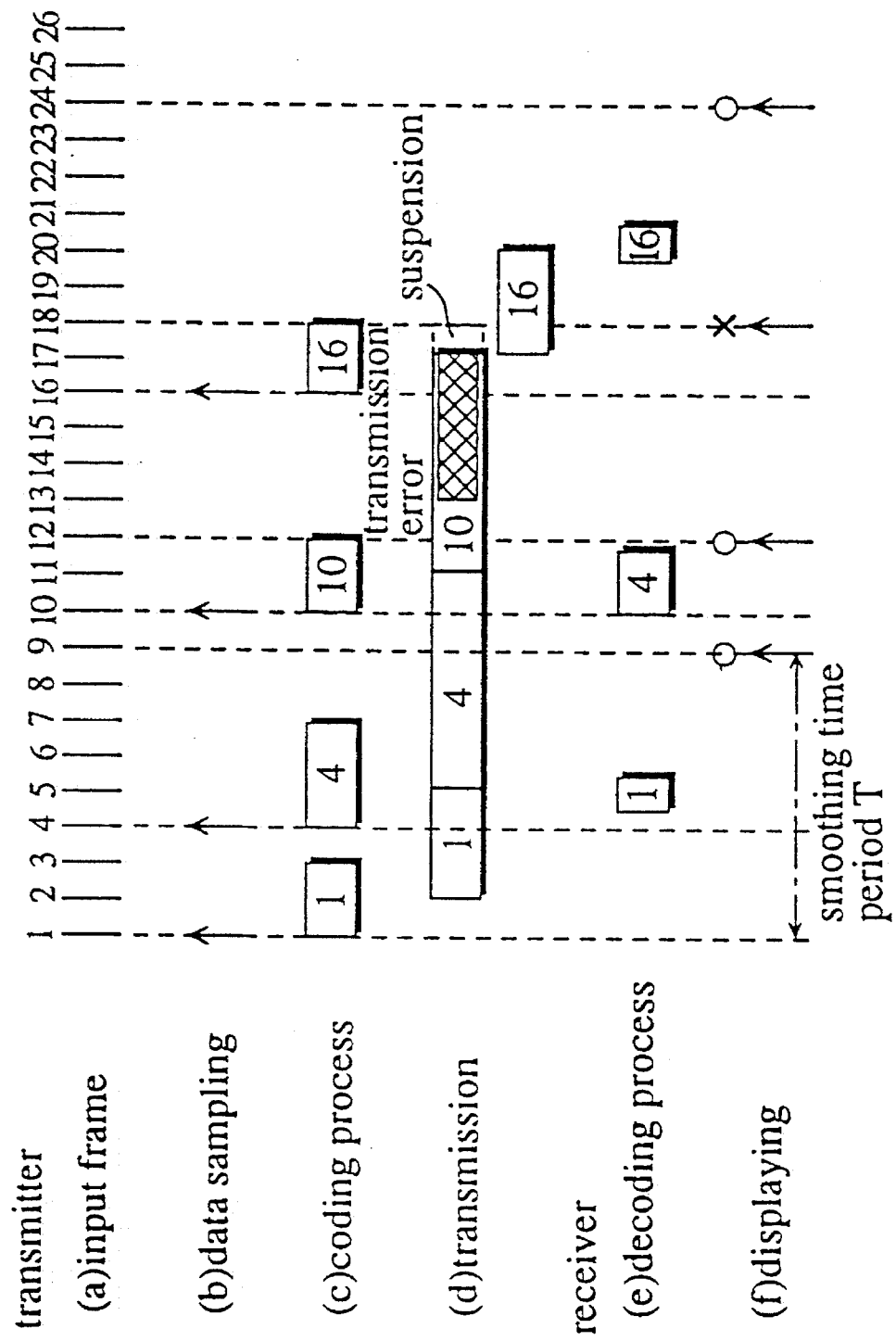
FIG. 2 shows time charts (a)–(f) for explaining the operation of the conventional picture data coding apparatus.
Figure 3:
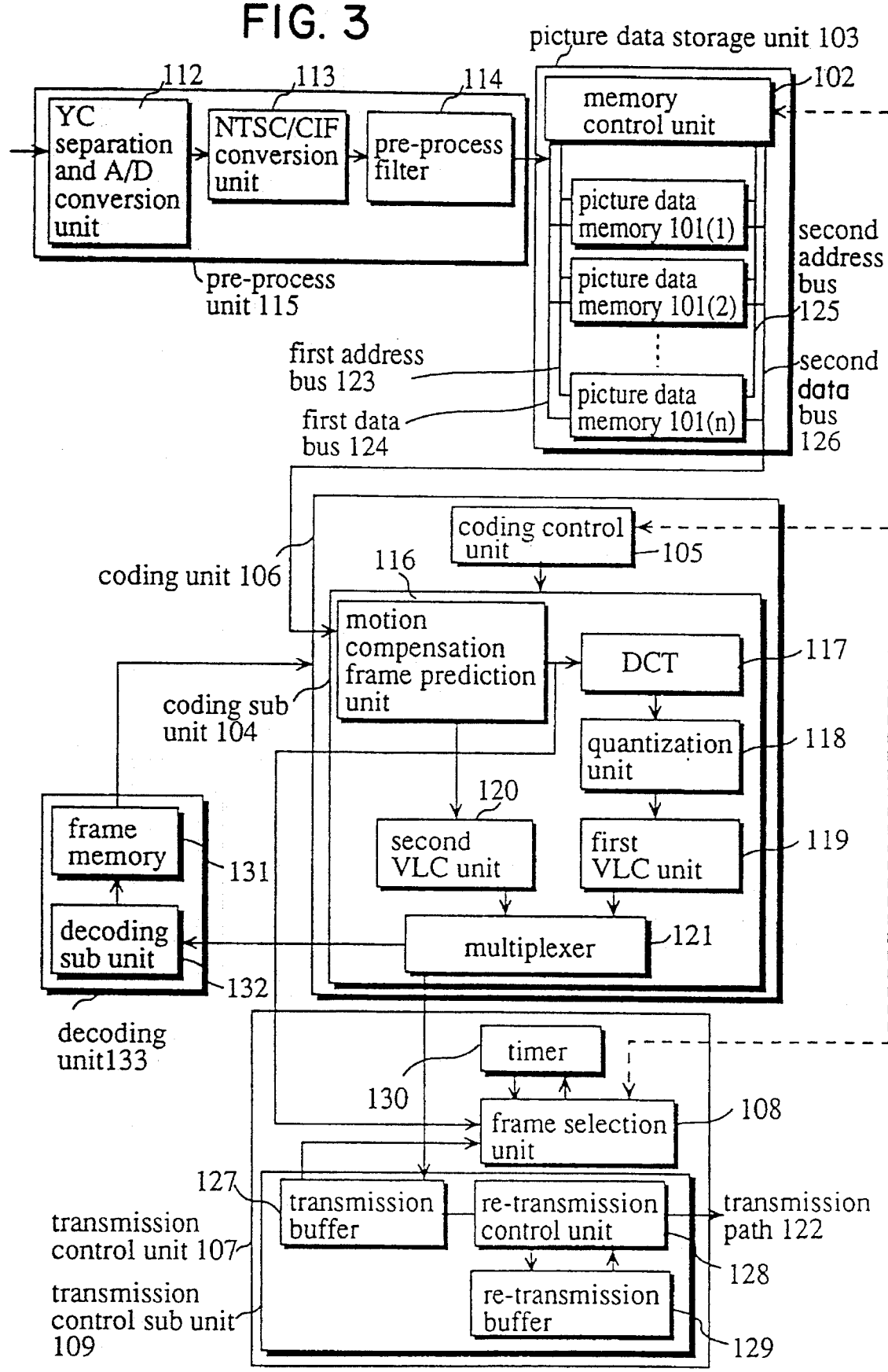
FIG. 3 shows the construction of the picture data coding apparatus of the first embodiment of the present invention.

FIG. 3 shows the construction of the picture data coding apparatus of this embodiment.

The apparatus comprises a pre-process unit 115, a picture data storage unit 103, a coding unit 106, a transmission control unit 107, and a decoding unit 133.

The picture data storage unit 103 includes n picture data memories 101(1)-(n) and a memory control unit 102. The coding unit 106 includes a coding sub unit 104 and a coding control unit 105. The coding sub unit 104 is composed of a motion compensation frame prediction unit 116, a DCT 117, a quantization unit 118, a first variable length coding unit 119, a second variable length coding unit 120, and a multiplexer 121. The transmission control unit 107 includes a timer 130, a frame selection unit 108, and a transmission control sub unit 109. The transmission control sub unit 109 is composed of a transmission buffer 127, a re-transmission control unit 128, and a re-transmission buffer 129. The decoding unit 133 includes a frame memory 131 and a decoding sub unit 132.

The picture data memories 101(1)-(n) are dual-port memories capable of reading and writing data at the same time, and store inputted frames in association with frame reference numbers.

The memory control unit 102 controls the writing of the picture data to the picture data memories 101(1)-(n) via the first address bus 123 and the first data bus 124, and the reading of picture data from the picture data memories 101(1)-(n) via the second address bus 125 and the second data bus 126.

When it has been judged that a frame under transmission cannot be displayed on the display of the receiver at the end of the smoothing time period because of the occurrence of a transmission error, the picture data storage unit 103 outputs picture data stored in the picture data memories 101(1)-(n) to a coding unit 106. Among the picture data stored in the picture data memories 101(1)-(n), those judged to be incapable of being displayed on the display unit of the receiver at the end of the smoothing time period T are abandoned. The picture data for n frames are already stored in the picture data storage unit 103, the picture data of the smallest numbered frame is updated by the picture data of the frame inputted latest.

When a transmission error has caused a frame under transmission not to be displayed on the display unit of the receiver within the smoothing time period "T", the picture data storage unit 103 sends picture data stored in the picture data memories 101(1)-(n) to the coding unit 106.

The motion compensation frame prediction unit 116 determines motion vectors in the same manner as the conventional art until a frame under transmission becomes incapable of being displayed, thereby outputting a prediction error signal. When a frame under transmission has become incapable of being displayed, the motion compensation frame prediction unit 116 reads out the decoded latest-transmitted frame of the frame memory 131, in accordance with the direction of the frame selection unit 108, and then determines the interframe difference between the decoded frame and each frame which has been read out of the picture data memories 101(1)-(n).

The inter-frame difference is obtained by simply determining the difference between each one-block picture data in each frame which has been read out of the picture data memories 101(1)-(n) and a positionally corresponding one-block data in the latest-transmitted frame. The simple determination frees the motion compensation frame prediction unit 116 from determining the motion vector between the two frames. The motion compensation frame prediction unit 116 outputs the inter-frame difference as an inter-frame differential signal to the frame selection unit 108.

The coding control unit 105 detects the generation code amount of a frame to be outputted to the transmission buffer 127, and the remaining coded data amount of a frame under transmission, which amount indicates the amount of coded data which have not been transmitted yet, thereby outputting the detected both amounts to the frame selection unit 108.

The DCT 117, the quantization unit 118, the first variable length coding unit 119, the second variable length coding unit 120, and the multiplexer 121 are the same as conventional ones so that they are not explained again.

The timer 130 outputs a signal at a certain time interval, the value of the signal varying every one-frame time.

The frame selection unit 108 calculates the time left before the start of the displaying operation of a frame under transmission, thereby determining the decode time required for decoding the frame based on the generation code amount.

The frame selection unit 108 then judges, at a certain time interval, whether or not the transmission of remaining picture data of a frame can be completed and the decoding operation of the frame can be completed within the left time, based on the remaining code amount of the frame under transmission and the transmission speed of the transmission path.

When a transmission error has caused a frame under transmission not to be displayed on the display unit of the receiver at the end of the smoothing time period "T", the frame selection unit 108 predicts the generation code amount of the picture data stored in the picture data memories 101(1)-(n), based on the inter-frame difference sent from the motion compensation frame prediction unit 116. As a result, the coding time and decode time are determined, and further a time period is determined which is between the impossibility of displaying the frame was judged and the start of the displaying operation. Then, it is judged whether the transmission of the coded frame having the detected generation code amount can be completed within the time period obtained by subtracting process time, that is, the sum of the coding time and the decode time, from the remaining time. In other words, it is judged whether the picture frame can be displayed on the display unit of the receiver at the end of the smoothing time period "T". The smoothing time period T is obtained by subtracting the decode time from the time left before the start of the displaying operation.

Thus, the frame selection unit 108 judges the possibility of displaying the picture frames stored in the picture data memories 101(1)-(n), and selects a frame that can be displayed on the display unit of the receiver at the end of the smoothing time period "T" and that is the smallest numbered.

The transmission buffer 127, the re-transmission Control unit 128, the re-transmission buffer 129, and the pre-process unit 115 are the same as conventional ones so that they are not explained again.

Although CIF is selected as an intermediate format by the NTSC/CIF conversion unit 113 in the pre-process unit 115, QCIF can be selected instead at the stage. If QCIF is selected, the amount of picture data to be stored in the picture data memories 101(1)-(n) can be one-fourth of the case of CIF, reducing the capacity of the picture data memories 101(1)-(n).

The frame memory 131 stores decoded data corresponding to the picture data of a coded frame before its prediction error has been determined and further stores the decoded latest-transmitted frame. The decoding sub unit 132 decodes the coded data based on the prediction error and multiplexes them with the decoded frame which has been decoded immediately before the coded data, thereby decoding the frame which is currently being coded.

<The frame selection unit 108>

Figure 4:
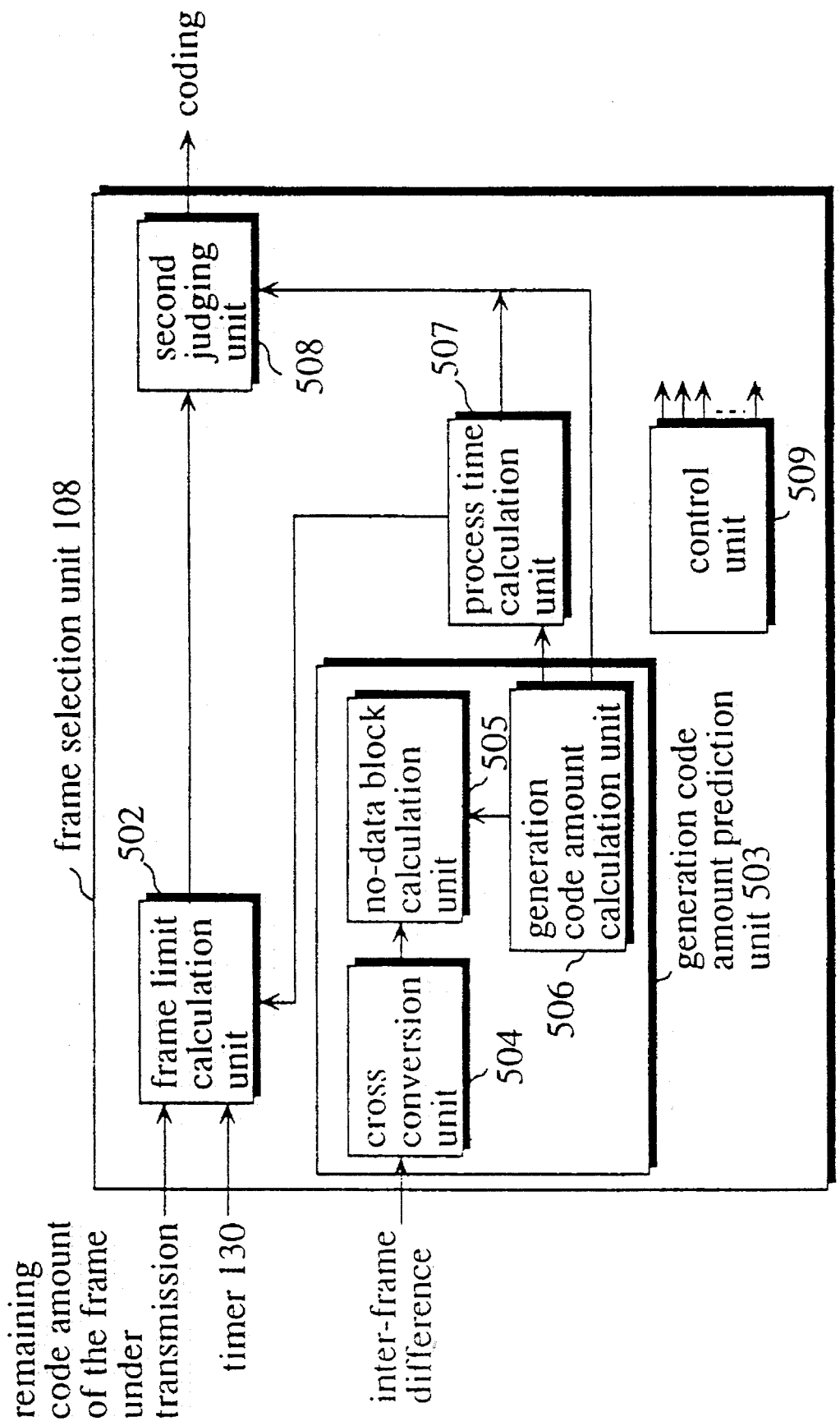
FIG. 4 shows the construction of the frame selection unit 108 provided in the picture data coding apparatus of the first embodiment.

FIG. 4 shows the construction of the frame selection unit 108 provided in the picture data coding apparatus of this embodiment. The frame selection unit 108 includes a frame limit calculation unit 502, a generation code amount prediction unit 503, a process time calculation unit 507, a second judging unit 508, and a control unit 509.

The frame limit value calculation unit 502 judges, at a certain time interval, whether or not the picture data of a frame under transmission can be displayed on the display unit of the receiver at the end of the smoothing time period "T", based on the frame limit of the frame, and outputs a display impossibility signal to the control unit 509 as soon as the frame becomes incapable of being displayed. The frame limit means the maximum amount of codes to be transmitted by the start of the displaying operation of a picture frame from the current time. The method for determining the value will be described below.

Upon detecting a display impossibility signal for the frame under transmission, the control unit 509 directs the memory control unit 102 to transfer the frame which follows the frame under transmission which is stored in the picture data memories 101(1)-(n) to the coding unit 106. The control unit 509 then directs the coding unit 106 to detect the inter-frame difference between frames sent from the picture data memories 101(1)-(n), and to output the detected inter-frame difference to the generation code amount prediction unit 503.

Based on the direction of the control unit 509, the frame limit calculation unit 502 calculates the frame limit of the frames stored in the picture data memories 101(1)-(n), thereby sequentially outputting the frame limit to the second judging unit 508.

The generation code amount prediction unit 503 predicts the generation code amount when the frames are read out of the picture data memories 101 (1)-(n) based on an inter-frame difference signal outputted from the coding unit 106 and outputs the generation code amount to the process time calculation unit 507 and the second judging unit 508. The detailed construction of the generation code amount prediction unit and the method for predicting the amount will be described below.

The process time calculation unit 507 calculates process amount for a frame under transmission based on the generated code amount which has been outputted from the coding control unit 105. The process amount means amount of coded data that can be transmitted during the process time corresponding to the sum of the time required for coding and decoding.

The coding rate per unit time is fixed according to code units and decoding rate per unit time is fixed according to decode units, so that the time required for coding and decoding picture data in each frame is determined in proportion to the generation code amount. Hereinafter, the process time calculation unit 507 calculates process time by regarding the time required for coding as 0 because the frame under transmission is already coded.

The process time calculation unit 507 then determined process amount by multiplying the process time by the transmission speed of the transmission path, thereby outputting the result to the frame limit calculation unit 502. To be more specific, the process time calculation unit 507 performs the following calculation in which * means a symbol for multiplication:

(process amount) = (transmission speed) * {(generation code amount) / (decode rate) + (generation code amount)/ (code rate)}

The process time calculation unit 507 calculates the decode time for each frame stored in the picture data memories 101(1)-(n), based on the generation code amount predicted by the generation code amount prediction unit 503, and further calculates the process amount and outputs it to the second judging unit 508. The contents of the calculation performed by the process time calculation unit 507 is equal to the abovementioned equation.

When the frame limit calculation unit 502 has judged that a frame under transmission cannot be displayed, the second judging unit 508 operates as follows according to the direction of the control unit 509.

If the generation code amount of a frame are smaller than the value obtained by subtracting the process amount from the decode limit, the second judging unit 508 judges that the frame can be displayed. The judgement is based on the frame limit outputted from the frame limit calculation unit 502, the generation code amount outputted from the generation code amount calculation unit 503, and the process amount outputted from the process time calculation unit 507. The second judging unit 508 then selects the smallest numbered frame among those judged to be capable of being displayed, thereby outputting the frame reference number to the control unit 509.

The second judging unit 508 outputs a display impossibility signal to the control unit 509 when judged that the smallest numbered frame cannot be displayed. Upon detecting the display impossibility signal, the control unit 509 directs the memory control unit 102 to transfer the frame following the smallest numbered frame to the coding unit 106. Hereinafter these operations are repeated for all the frame stored in the picture data memories 101(1)-(n) until a frame which can be displayed is found.

The operation of the picture data coding apparatus constructed as above is described as follows with reference to the time charts (a)-(f) shown in FIG. 5.

The time chart (a) shows the timing for transmitting each frame from the pre-process unit 115 to the picture data storage unit 103 at a rate of thirty frames per second. In the time chart (b), arrows indicate the timing for sampling frames by the coding unit 106. The time chart (c) shows a time required for coding each frame. The required time varies depending on the amount of picture data for prediction errors. The time chart (d) shows a transmission condition of the each coded data. The time chart (e) shows a time required for decoding coded frame. The time chart (f) shows the timing for displaying decoded frame on the display unit of the receiver. The circles in the time chart (f) indicate the frames that have been successfully displayed on the time point and the cross indicates otherwise. In FIG. 5, the frames 1 and 4 are displayed at the end of the smoothing time period corresponding to eight-time period which follows their sampling operations, and the frame 10 is not displayed because its decoding operation has not been completed by the end of the smoothing time period "T". Operations of the picture data coding unit of the present invention when no transmission error is caused are the same as those of the conventional apparatuses, so that they are not described here.

It is assumed that the frame 10 has the same amount of picture data corresponding to a prediction error as the frame 1. In other words, the frame 10 is assumed to need two-frame time for a coding operation, three-frame time for a transmitting operation unless there is a transmission error, and one-frame time for a decoding operation. Consequently, the frame 10 can be displayed on the display unit of the receiver, after eight-frame time following the sampling operation, as long as the transmission of the picture data can be completed within five-frame time even if there is a transmission error.

However, when picture data is transmitted through a portable transmitter and transmitted to the receiver via a wireless circuit, an occurrence of an error such as a burst error caused by fading is inevitable. Such burst errors reach four- to six-frame time when the moving speed of the portable transmitter is lower than walking speed. It is further assumed that a burst error caused by the above-mentioned fading stretches over four-frame time while the frame 10 is under transmission.

As shown in the time chart (d), the frame 10 has picture data corresponding to three-frame time but one-third of them has not been transmitted because of the occurrence of a transmission error. If the transmission error disappears during the remaining one-time frame for transmission and another one-time frame for a decoding operation, the frame can be displayed. In other words, the frame 10 can be displayed before the frame 16 is inputted.

The transmission control unit 107 judges whether or not a frame under transmission can be displayed on the display unit of the receiver every frame time, and suspends the displaying operation of the frame 10 when the frame 16 is inputted, thereby directing the memory control unit 102 to read out picture data of the picture data memories 101(1)-(n).

Having transferred the inputted frame 10 to the coding sub unit 104, the picture data storing unit 103 stores the frame 11 in the picture data memory 101(1), the frame 12 in the picture data memory 101(2), and the subsequent frames in the subsequent data memories.

The frame 11 must be displayed when the frame 19 is inputted. In the same manner, the frame 12 must be displayed when the frame 20 is inputted, and the frame 13 must be displayed when the frame 21 is inputted. At the time point when the frame selection unit 108 has determined to suspend displaying the frame 10, or when the frame 16 is inputted, the frames 11, 12, and 13 need three-frame time, four-frame time, and five-frame time respectively for coding, transmitting, and decoding. The frame selection unit 108 selects the smallest numbered frame that can be displayed at the end of the smoothing time period "T".

When the frame selection unit 108 has judged the impossibility of displaying the frame 10, the memory control unit 102 sequentially reads out the frames which follow the frame 10 of the picture data memories 101(1)-(n), and then transfers them to the coding unit 106. The coding unit 106 determines the inter-frame difference between the decoded latest-transmitted frame stored in the frame memory 131 in the decoding unit 133 and each frame which has been transferred from the picture data memories 101(1)-(n), thereby outputting an inter-frame difference signal to the frame selection unit 108. The frame selection unit 108 selects the smallest numbered frame which can be entirely coded, transmitted, and decoded within the respective time periods, based on the inter-frame difference signal outputted from the coding unit 106.

Then, the memory control unit 102 reads out the frame selected by the frame selection unit 108 of the picture data memories 101(1)-(n), and transfers it to the coding unit 106. The coding unit 106 determines the prediction error of the selected frame by using, as a reference frame, the same frame as the latest-transmitted frame stored in the frame memory 131, and then outputs the determined prediction error to the transmission control unit 107.

Figure 5:
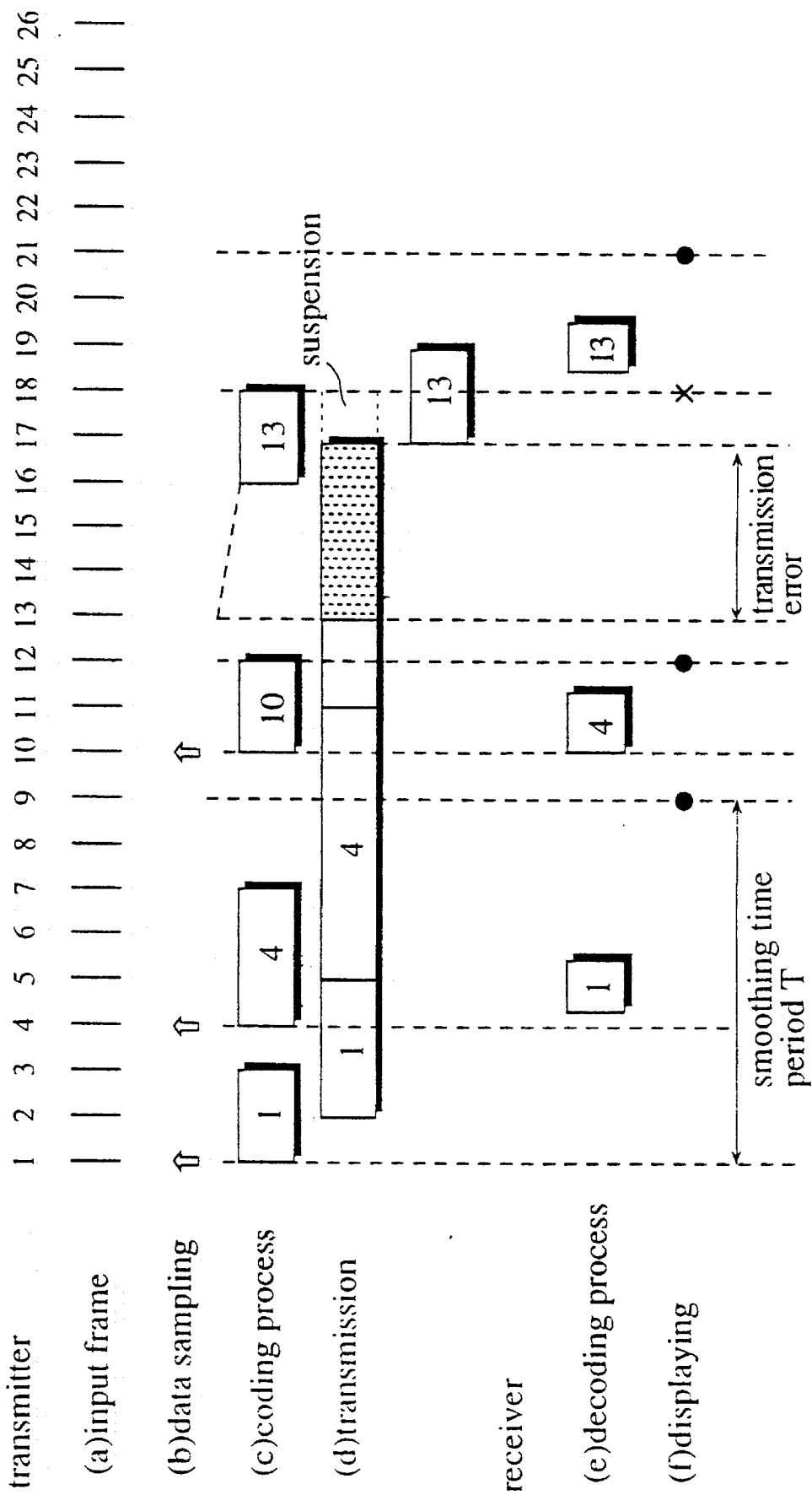
FIG. 5 shows time charts (a)–(f) for explaining the operation of the picture data coding apparatus of the first embodiment.

In FIG. 5, when the frame 16 is inputted, the frame selection unit 108 selects the frame 13, thereby starting a coding operation, starts a transmitting operation when the frame 17 is inputted, and displays the picture corresponding to the frame 13 when the picture data of frame 21 is inputted. In the conventional picture data coding apparatus, 12 frames are skipped when a burst error has occurred whereas the skipping number is restricted to 8 in this embodiment. As described hereinbefore, according to the present invention, frame skipping which is caused in the case where a coded frame cannot be decoded by the displaying time owing to a transmission delay can be minimized without extending the time delay for the display.

When a frame under transmission has been judged to be incapable of being displayed, the smallest numbered frame which can be displayed at the end of the smoothing time period "T" is selected among all the frames following the frame under transmission; however, the frames preceding the frame under transmission can be selected as long as they meet the requirement. This is effective in the cases where the generation code amount of the frame under transmission is large or where a transmission error has occurred immediately after starting to transmit the frame, and this can further decrease frame skipping caused when the frame under transmission becomes incapable of being displayed.

In order to simplify the description hereinbefore, the time required for the frame selection unit 108 to select a frame and to code the picture data stored in the picture data memories 101(1)-(n) are not taken into account.

<The generation code amount prediction unit 503>

The detailed construction of the generation code amount prediction unit 503 and the method for predicting the generation code amount are described below with reference to FIGS. 4, 6, and 7.

As shown in FIG. 4, the generation code amount prediction unit 503 includes a cross conversion unit 504, a no-data block calculation unit 505, and a generation code amount calculation unit 506.

The cross conversion unit 504 receives inter-frame difference signals from the coding unit 106, and cross-converts them for each block, thereby converting the space coordination into the frequency coordination. The no-data block calculation unit 505 determines a threshold which is similar to the first level of quantizaton in the coding sub unit 104, and compares the threshold with the cross-conversion coefficient of the frequency coordination, thereby regarding a block whose coefficients are smaller than the threshold as a no-data block.

With regard to the first level of the quantization in the coding sub unit 104, the DCT 117 first cross-converts the prediction error outputted from the motion compensation frame prediction unit 116. The quantization unit 118 quantizes the cross conversion coefficient obtained through the cross conversion, and as a result, the value of the cross conversion coefficient which is smaller than the first level of the quantization becomes 0. Consequently, a block whose cross conversion coefficients are all below the first level is regarded as a no-data block and not transmitted. The first level is given as a matrix with predetermined values.

The no-data block calculation unit 505 calculates the number of no-data blocks and outputs the number of no-data blocks contained in one frame to the generation code amount calculation unit 506. The generation code amount calculation unit 506 multiplies the number of effective blocks with the proportional constant obtained through the equations shown in FIGS. 6 and 7, thereby calculating generation code amount. The number of effective blocks is obtained by subtracting the number of no-data blocks from the number of entire blocks.

Figure 6:
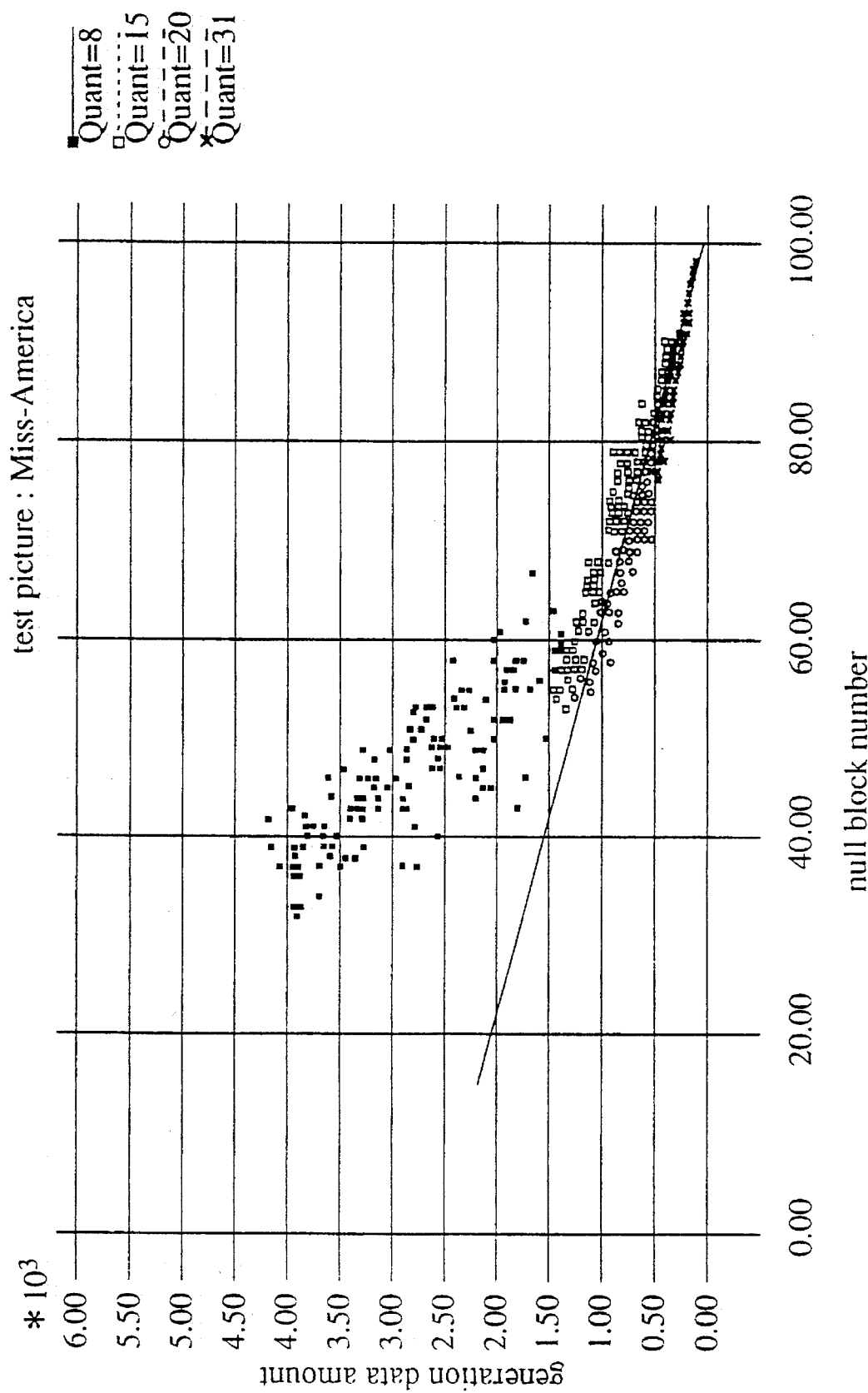
FIG. 6 is a graph showing the relationship between generation code amount and the number of no-data blocks obtained from experiments.

FIG. 6 is a graph showing the relationship between generation code amount and the number of effective blocks obtained from experiments. FIG. 7 is a graph showing the relationship between generation code amount and the number of effective blocks obtained from inter-frame difference values.

In the graph of FIG. 6, the axis of abscissa indicates the number of no-data blocks and the axis of ordinate indicates generation code amount. The number of entire blocks is made **99*4 in CIF and 99 in QCIF, and the number of no-data blocks is indicated. The generation code amount is indicated by bits. The number of no-data blocks is obtained from the inter-frame difference value between the target frame and a preceding frame by using the first level of the quantization as the threshold. The generation code amount is obtained by determining the prediction error between the target frame and the preceding frame and then actually coding the prediction error to calculate the generation code amount. As a sample picture, "Miss America" is used. In FIG. 6, quantization values 8, 15, 20, and 31 are used for plotting. The quantization value 8** has a wide dispersion; however, in the other quantization values the generation code amounts are in proportion to the effective block number. The quantization value 8 is not used in the picture data coding apparatus at a low transmission rate of 64Kbps or so because the unit of quantization is so small that the generation code amount becomes too large. Consequently, it may be said that the generation code amount is in proportion to the effective block number.

Since the effective block number (m) = the entire block number − no-data block number (m), the relationship between the effective block number and the generation code amount is shown by the following equation:

generation code amount (m) = generation code amount (m-1) / effective block number(m-1) * effective block number (m)

In the equation, m is a natural number indicating the number of a target frame, and m-1 indicates the frame number of a frame immediately preceding the target frame. The generation code amount (m-l)/the effective block number (m-1) indicates the inclination in the graphs shown in FIGS. 6 and 7 and calculated every time a frame is coded.

Figures 7A, 7B:
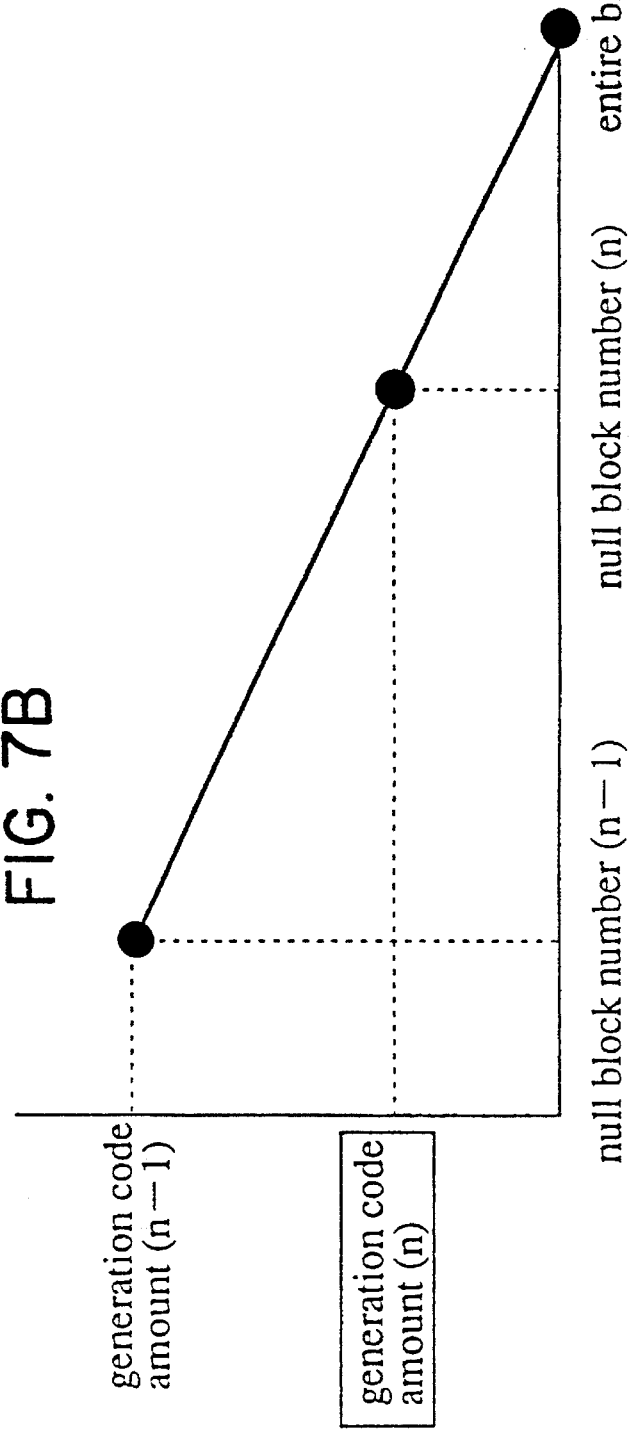

Since the relations shown in the graphs of FIGS. 6 and 7 are obtained from the inter-frame difference value and the prediction error between a target frame and a preceding frame, the relations cannot be always true if the number of skipped frames becomes large between the two frames. However, it is assumed that there are such relations between the inter-frame difference value and generation code amount obtained from a target frame and the latest-transmitted frame.

The cross conversion unit 504, which is provided in the generation code amount prediction unit 503 in this embodiment, has the same construction as the DCT 117. In other words, the inter-frame difference value sent from the motion compensation frame prediction unit 116 may be cross-converted by the DCT 117 in the coding sub unit 104, and the resultant cross-conversion coefficients may be sent out to the no-data block calculation unit 505.

The frame selection unit 108 can dispense with the generation code amount prediction unit 503 by changing its construction as follows.

Figure 8:
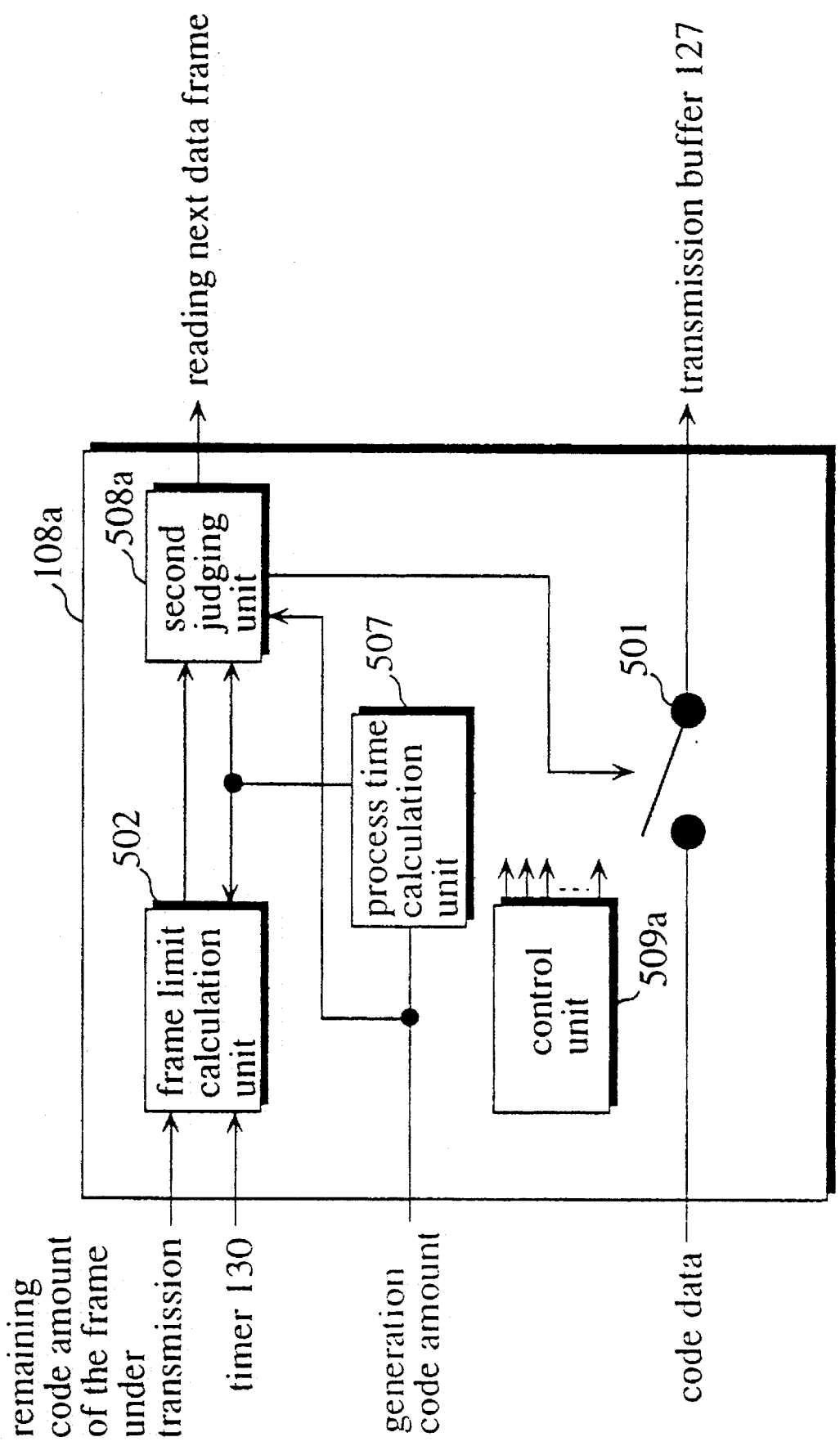
FIG. 8 shows the construction of a frame selection unit 108a of the picture data coding apparatus of the first embodiment.

FIG. 8 shows the construction of a frame selection unit 108a including a frame limit calculation unit 502, a process time calculation unit 507, a second judging unit 508, a control unit 509a, and a switch 501.

Upon detecting a display impossibility signal for the frame under transmission sent from the frame limit calculation unit 502, the control unit 509a directs the memory control unit 102 to read out picture data stored in the picture data memories 101(1)-(n) and to transfer them to the coding unit 106. The control unit 509a further directs the coding control unit 105 to code the read picture data by using the latest-transmitted frame as a reference frame and to send out the coded picture data and a resulting generation code amount to the frame selection unit 108a.

The process time calculation unit 507 calculates the decoding time of the frame, based on the generation code amount, thereby determining the decode amount. The process time calculation unit 507 sends out the decode amount to the frame limit calculation unit 502 and the second judging unit 508.

The frame limit calculation unit 502 judges whether or not the frame under transmission can be displayed at the end of the smoothing time period "T", based on the remaining ode amount of a frame under transmission, which amount is outputted from the coding control unit 105 and the decode amount sent out from the process time calculation unit 507. The unit 502 sends out a display impossibility signal to the control unit 509a if the impossibility of the display has been judged. The frame limit calculation unit 502 outputs the frame limit of each frame to the second judging unit 508 in accordance with the direction of the control unit 509a.

The second judging unit 508a judges whether or not the frame can be displayed on the display unit of the receiver at the end of the smoothing time period "T", from the generation code amount, the frame limit, and the decode amount, thereby outputting a display impossibility signal to the control unit 509a if the display is impossible. Otherwise, the unit 508 outputs a display possibility signal to the control unit 509a.

The control unit 509a puts the switch 501 in an off state when detected the display impossibility signal, and, when detected a display possibility signal, puts it in an on state to transmit the inputted coded data to the transmission buffer 127.

The generation code amount prediction unit 503 of this embodiment predicts the generation code amount by multiplying the number of effective blocks in a target frame by the average generation data amount of the effective blocks in the immediately preceding coded frame; however, the prediction can be performed by multiplying the number of effective blocks in a target frame by the proportional constant obtained through experiments, or by using the generation data amount of the immediately preceding coded data as the generation code amount of the target frame.

The simplest method for calculating the generation code amount is to actually code a target frame and calculate the amount; however, it takes a lot of time to determine a motion vector and detect the difference according to the motion vector, and power consumption increases accordingly. However, this embodiment makes it possible to predict the amount of data generated by coding without predicting motion compensation frame having too much process amount or performing a quantization and to select a target frame by comparing the predicted amount with the frame limit.

<The frame limit calculation unit 502>

Figure 9:
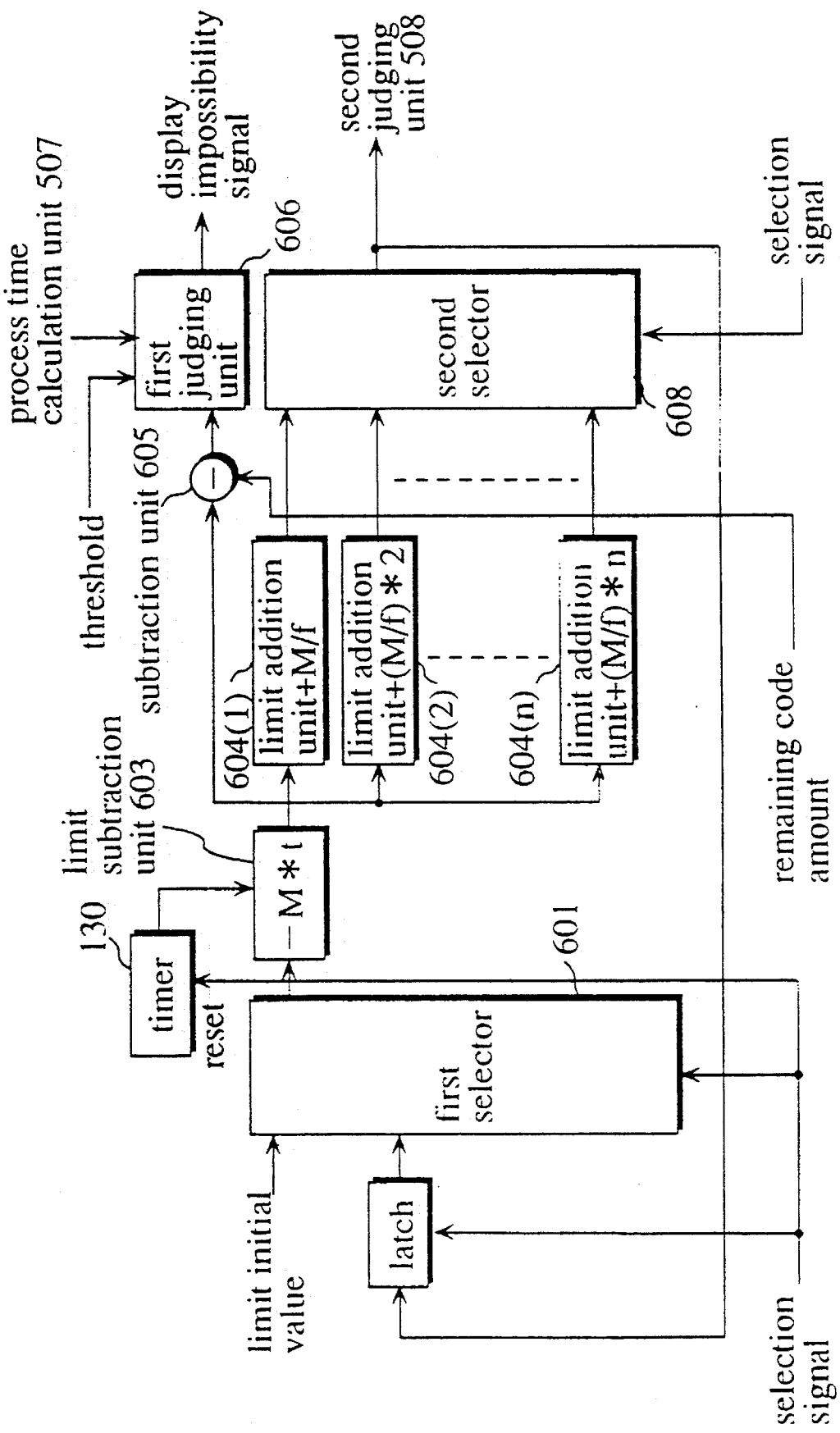
FIG. 9 shows the construction of the frame limit calculation unit 502 of the picture data coding apparatus of the first embodiment.

FIG. 9 shows the construction of the frame limit calculation unit 502 comprising a first selector 601, a timer 130, a limit subtraction unit 603, n limit addition units 604(1)-(n), a subtraction unit 605, a first judging unit 606, and a second selector 608.

The first selector 601 selects one of two signals in accordance with a selection signal sent from the control unit 509 and outputs the selected signal to the limit subtraction unit 603. One of the two signals indicates a value obtained by multiplying the smoothing time period "T" with the transmission speed Mbps, the value being a signal indicating a limit initial value M*T. The first selector 601 selects the limit initial value signal in accordance with the selection signal when the picture data coding apparatus of this embodiment starts to operate.

The other signal inputted to the first selector 601 is the output of the second selector. The first selector 601 selects the output of the second selector 608 in accordance with the selection signal when the second judging unit 508 has detected a frame that can be displayed.

The timer 130 changes its output every predetermined time period, the predetermined time period here corresponding to one-frame time (1/f, f = frame cycle).

The limit subtraction unit 603 subtracts the value of M*t, which is the product between the transmission speed Mbps and a time t, from the output value of the first selector 601 every time the output of the timer 130 changes.

The n limit addition unit 604(1)-(n) add the output of the limit subtraction unit 603 with the time difference between when the frame under transmission is sampled and when the next frame is sampled. The time difference corresponds to the value M/f which is the product between one-frame time (1/f) and the transmission speed Mbps.

In the same manner, the other limit addition units 604(2)-(n) add the output of the limit subtraction unit 603 to the time difference between when a respective frame under transmission is sampled and each frame is sampled by the picture data storage unit 103, that is, (2M/f), (3M/f),— (M*N/f), which are the product between the transmission speed Mbps and each of two-frame time (2/f), three-frame time (3/f), —n-frame time (n/f). The n limit addition units 604(1)-(n) output a respective addition result to the second selector 608.

The subtraction unit 605 subtracts the remaining code amount of a frame under transmission which remains in the transmission buffer 127 from the 0 frame limit to be outputted from the limit subtraction unit 603, thereby outputting the result to the first judging unit 606.

The first judging unit 606 judges whether or not the frame can be displayed on the display unit of the receiver at the end of the smoothing time period "T". To be more specific, the first judging unit 606 receives an output of the subtraction unit 603, the decode amount sent from the process time calculation unit 507, and a predetermined threshold.

The first judging unit 606 subtracts the decode amount from the output value of the subtraction unit 603, and when the result is below the threshold, determines the impossibility of displaying the frame under transmission. Then, the first judging unit 606 outputs an display impossibility signal to the control unit 509.

The second selector 608 selects one of (n+1) input signals in accordance with the selection signal and sequentially output selected signals to the second judging unit 508 and the first selector 601.

The operation of the frame limit calculation unit 502 which is constructed as shown in FIG. 9 will be described as follows with reference to FIGS. 5 and 10. FIG. 10 shows change in the frame limit of each frame every one-frame time since the frame 12 is sampled after the transmission of the frame 10 shown in FIG. 5 is started.

In FIG. 10, the axis of abscissa indicates transmission data amount and transmission time. Each division indicates data bit amount (M/f) to be transmitted in one-frame time. The smoothing time period T corresponds to eight-frame time. The hatched rectangular indicate remaining code amount remaining in the transmission buffer 127.

During the sample timings 12–17, the 0 frame limit, the first frame limit, the second frame limit, the third frame limit indicate the limits for the frame 10, frame 11, frame 12, and frame 13 respectively.

On the sample timing 18, the 0- third frame limit indicate the limits for the frame 14, frame 11, frame 15, and frame 16 respectively.

On the sample timing 12, one-frame time has already passed after the transmission of the frame 10 has been started. Since the frame 10 has data amount which can be transmitted within three-frame time, that is, 3M/f bit, the remaining code amount of the frame 10 is 2M/f.

The 0 frame limit for the frame 10 indicates the data amount which can be transmitted by the display time of the frame 10, that is, 6M/f, which is obtained as follows.

When the coding sub unit 104 samples the frame 10 (sampling time 10), the first selector 601 selects a limit initial value which is inputted from the 0 input of the first selector 601. In other words, the first selector selects T*M(= 8M/f) which is the product between the smoothing time period T (=8/f) and transmission data amount per frame time (M).

On the sample timing 12, two-frame time(2/f) has passed after the frame 10 is sampled, and as a result, the 0 frame limit is obtained by subtracting 2M/f from the limit initial value by the limit subtraction unit 603. The output of the limit subtraction unit 603 becomes 6M/f. The difference between the frame limit and the remaining code amount remaining in the transmission buffer 127 is permissible data amount, which is determined by the subtraction unit 603.

The first frame limit is larger than the 0 frame limit by bit numbers (M/f) to be transmitted in one-frame time. The second frame limit is larger than the 0 frame limit by bit numbers (2M/f) to be transmitted in two-frame time. The third frame limit is larger than the 0 frame limit by bit numbers (3M/f) to be transmitted in three-frame time. Consequently, the first, second, and third frame limits are respectively 7M/f, 8M/f, and 9M/f. The first-third frame limits are calculated by the limit addition units 604(1)–(3).

The sample timing 13 indicates each frame limit one-frame time after the sample timing 12. The remaining code amount remaining in the transmission buffer 127 is decreased by (M/f) as a result of a transmitting operation. The 0-third frame limits are also decreased by M/f, and the frame 10 corresponding to the 0 frame has the same permissible data amount as on the sampling timing 12.

On the sample timing 14, even one bit of data was not transmitted because of a bad condition of the transmission path, so that the remaining code amount does not decrease. In contrast, each of the 0-third frame limits decreases M/f by the subtracting operation of the limit subtraction unit 603, and the permissible data amount of the 0 frame has the same amount of decrease accordingly.

On the sample timings 15 and 16, the same state is continued, and the permissible data amount of the 0 frame becomes M/f on the sample timing 16. The permissible data amount of the 0 frame is held in the first judging unit 606 where the decoding amount is subtracted. Since the decode time of the frame 10 is one-frame time, the decode amount becomes M/f. When the decode amount is subtracted from the permissible data amount, the result becomes 0. If the threshold is 0, the first judging unit 606 outputs the display impossibility signal to the second judging unit 508, thereby indicating that the frame 10 cannot be displayed. As the threshold, a positive value is set in the case where this judgement is done much earlier.

When the coding operations of the frames 11, 12, and 13 are started at this point, the frame limits which let the transmitting and decoding operations of these frames be finished by their displaying operations are respectively 3M/f, 4M/f, and 5M/f, which are obtained as frame limit to be outputted from the limit addition units 604(1)–(3). These frame limits are sent to the second selector 608, and are sequentially outputted to the second judging unit 508 in the frame selection unit 108.

Upon receiving the display impossibility signal, the second judging unit 508 subtracts each decode amount from the frame limit of each frame outputted from the second selector 608, thereby comparing the subtracted results with the generation code amount of each frame. If the generation code amount of a frame is smaller than the value obtained by subtracting decode amount from the frame limit, the second judging unit 508 judges that the frame can be displayed, and further selects the smallest numbered frame among the frames thus judged. The sample timing 17 shows a case where the second judging unit 508 selects the frame 13. At this point, the frame 10 remaining in the transmission buffer 127 is abandoned, and the coded frame 13 becomes a frame to be transmitted. The data amount of the frame 13 is 2M/f. At this point a transmission error is settled and the transmission of the frame 13 is started.

At the point where the frame 13 is selected, the first selector 601 selects the third frame limit on the sample timing 17 which is an output of the second selector 608, and then sends out it to the limit subtraction unit 603. As a result, the frame limit for the frame 13 is sent to the subtraction unit 603 as the 0 frame limit.

On the sample timing 18, the limit subtraction unit 603 subtracts M/f from the remaining code amount remaining in the transmission buffer 127 because one-frame time has passed after the transmission of the frame 13 was started. The 0 frame limit which has lost the remaining code amount in the transmission buffer 127 by the subtraction unit 603 and is outputted to the first judging unit 606 as the permissible data amount. The first judging unit 606 subtracts the decode amount of the frame 13 from the permissible data amount, thereby comparing the obtained result with the threshold value. The frame selection unit 108 repeats these operations hereinafter.

Figure 11:
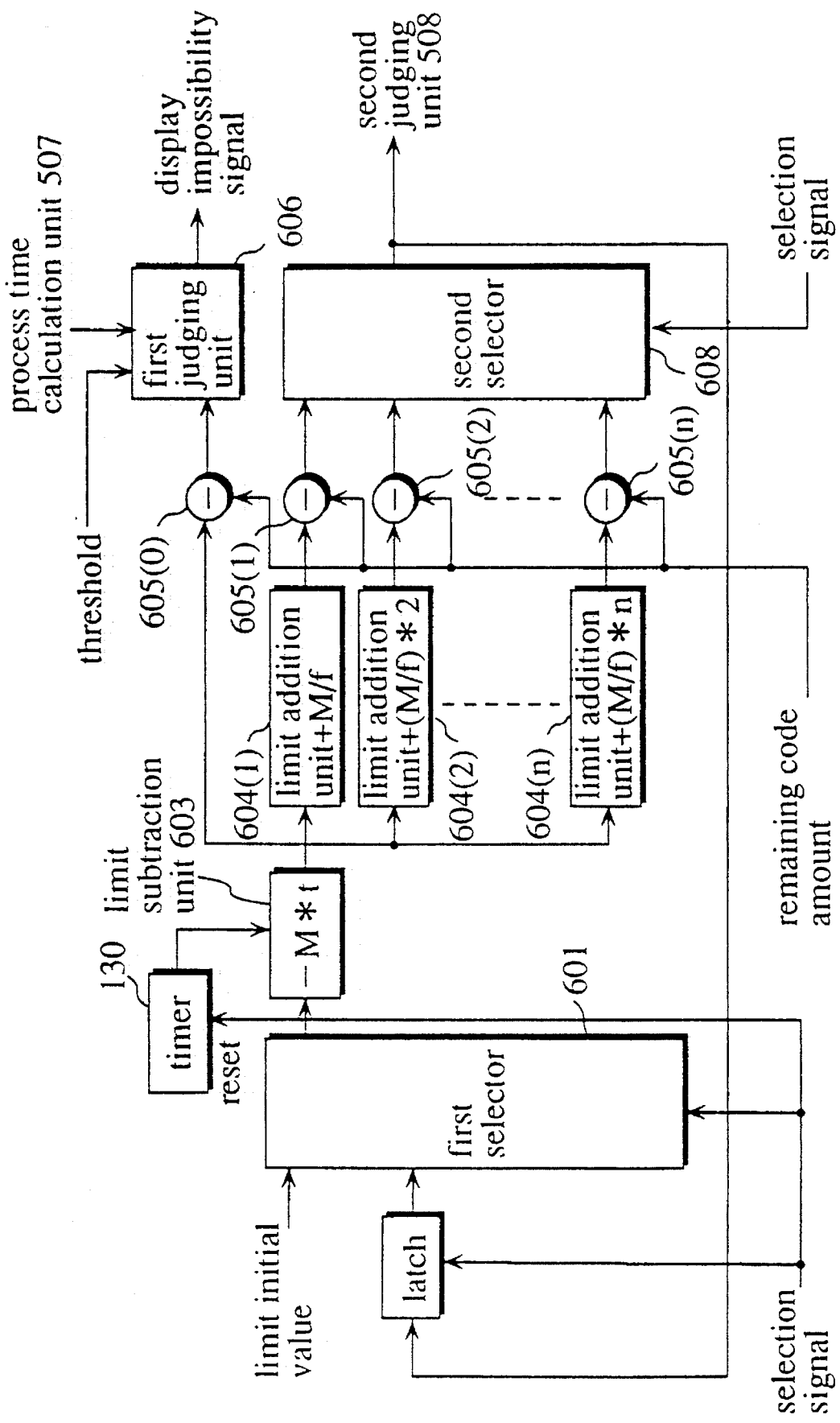
FIG. 11 shows another construction of the frame limit calculation unit 502.

The frame maximum value calculation unit 502 having the construction shown in FIG. 9 may be constructed as shown in FIG. 11 in which n subtraction units 605(0)-(n) are provided between the n limit addition units 604(1)-(n) and the second selector 608, thereby subtracting the remaining code amount which remains in the transmission buffer 127.

As a result, while the frame 10 is under transmission, the subsequent frames such as frames 11 and 12 can be judged the possibility of their display.

When it has been judged that a frame cannot be displayed, the remaining data in the transmission buffer 127 is abandoned, so that 0 is outputted as the remaining code amount. Consequently, even if it has been judged that a frame cannot be displayed on a time point, the frame limits for the subsequent frames can be determined.

Instead of the n limit addition units 604(1)-(n), a time difference detection unit and a calculation unit may be provided. The time difference detection unit detects the time difference between the time point where the frames stored in the picture data memories 101(1)-(n) are sampled and the time point where the frame under transmission is sampled. The time difference becomes a negative value when the frames stored in the picture data memories 101(1)-(n) are ahead of the frame under transmission. The calculation unit multiples the detected time difference with the transmission code amount per frame time, and adds the obtained value with the output of the limit subtraction unit 603 when the time difference is a positive value. In contrast, when the time difference is a negative value, the obtained value is subtracted from the output of the limit subtraction unit 603. The calculation unit sends out the calculated result to the second judging unit 508. Consequently, the possibility of displaying those frames stored in the picture data memories 101(1)-(n) which have been sampled before the frame under transmission can be judged.

As explained hereinbefore, the frame limit calculation unit 502 of this embodiment can sequentially calculate the frame limits when the possibility of displaying each frame stored in the picture data storage unit 103 is judged, and further can output a transmission impossibility signal when the difference between the sum of the remaining code data, generation code amount, and decode amount, and a respective frame limit is smaller than the threshold.

<EMBODIMENT 2>

Figure 12:
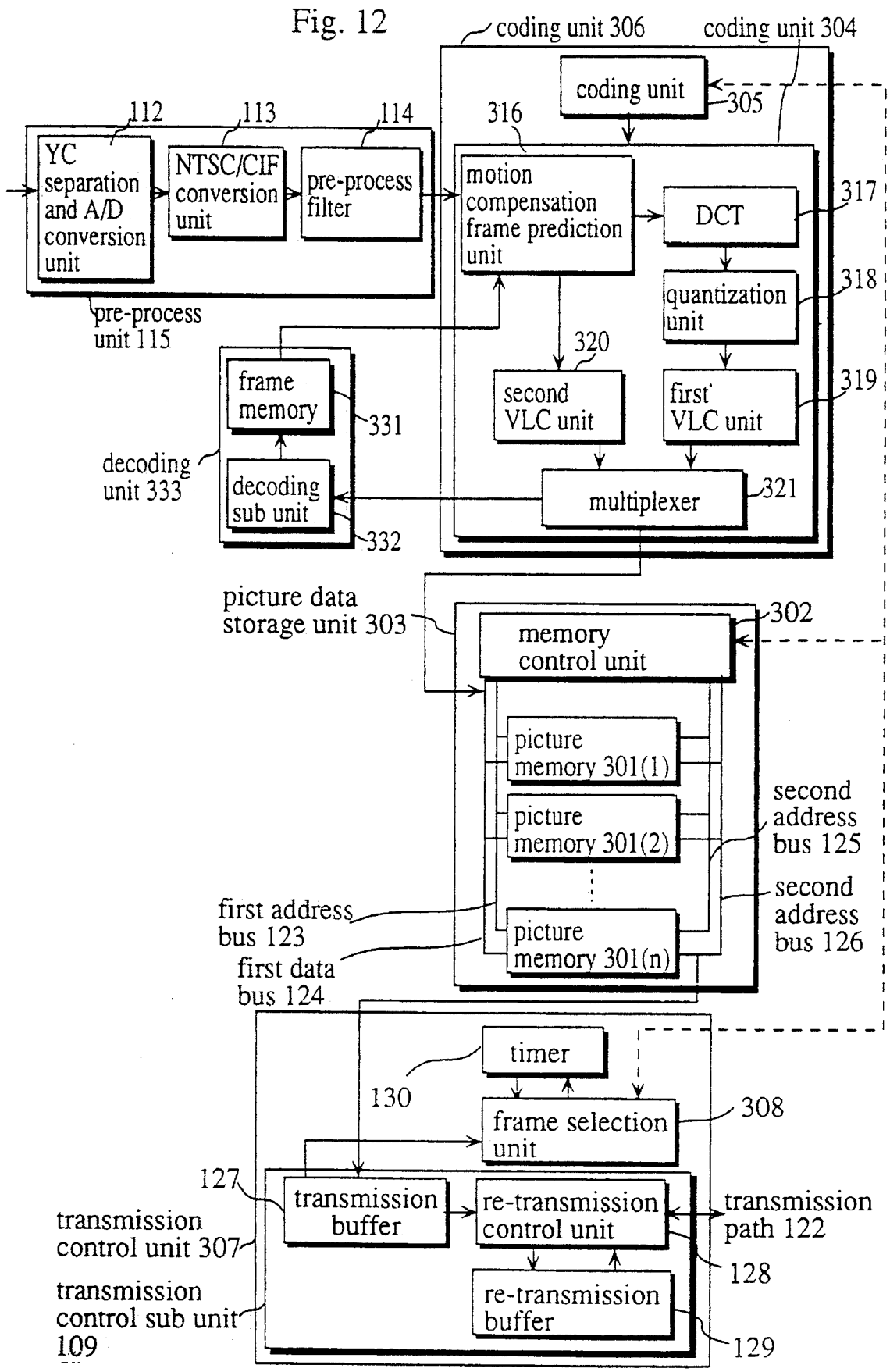
FIG. 12 shows the construction of the picture coding apparatus of the second embodiment.

FIG. 12 shows the construction of the picture coding apparatus of this embodiment.

The apparatus comprises a pre-process unit 115, a picture data storage unit 303, a coding unit 306, a transmission control unit 307, and a decoding unit 333.

The picture data storage unit 303 includes n picture data memories 301(1)-(n) and a memory control unit 302. The coding unit 306 includes a coding sub unit-304 and a coding control unit 305. The decoding unit 333 includes a frame memory 331 and a decoding sub unit 332. The transmission control unit 307 includes a timer 130, a frame selection unit 308, and a transmission control sub unit 109.

Since the pre-process unit 115 has the same construction as that in the first embodiment, it is not described here. The picture data memories 301(1)-(n) are dual-port memories capable of reading and writing data at the same time, and store inputted frames. The memory control unit 302 controls the writing of frames to the picture data memories 301(1)-(n) via the first address bus 123 and the first data bus 124, and the reading of frames from the picture data memories 101 via the second address bus 125 and the second data bus 126.

The picture data storage unit 303 stores coded frames which have been outputted from the coding unit 306 to the picture data memories 301(1)-(n), and stores the frame numbers of the coded frames, the frame numbers of the reference frames for the coded frames, and the generation code amount of the coded frames by associating each other.

The coding unit 306 is provided with a high-speed motion picture processing DSP. In the conventional picture coding unit and that of the first embodiment, coding and decoding are performed by using a motion picture data processing DSP having instruction run time 16.5 ns such as Matsushita VDSP(MN 195901). This requires about two-frame time for coding one-frame picture data. Higher-speed picture data processing DSP having instruction run time 3.3 ns such as NEC VSP3 have been published, and the coding unit 306 of this embodiment belongs to this.

The coding sub unit 304 is composed of a motion compensation frame prediction unit 316, a DCT 317, a quantization unit 318, a first variable length coding unit 319, a second variable length coding unit 320, and a multiplexer 321. Since the operations of these components are the same as those of their equivalents in the first embodiment, they are omitted.

The coding sub unit 304 samples inputted frames every one-frame time. The coding sub unit 304 codes sampled target frame by using a latest-transmitted frame as a reference frame in one-frame time, and further codes the target frame by using, as a reference frame, a frame which is under transmission when the target frame is sampled. Instead of the single coding sub unit 304 performing a coding operation in one-frame time, a plurality of coding units may be provided to perform the coding operation in parallel.

The coding control unit 305 controls the coding sub unit 304 to output coded frames to the transmission buffer 127 in accordance with the direction of the frame selection unit 308. The coding operation of the coded frames are performed by using immediately preceding coded frames as a reference frame. The coded frame which are outputted to the transmission buffer 127 in order to detect generation code amount after a frame under transmission becomes incapable of being displayed because of a transmission error is the frame coded by using the latest-transmitted frame as a reference frame.

The coding control unit 305 then outputs frames coded by the coding sub unit 304 to the coded data storage unit 303, and calculates the generation code amount of the coded frames, thereby outputting the calculated generation code amount, the frame number of the target frame, the frame number of the reference frame in association with the coded frame to the coded data storage unit 303.

The frame memory 331 is provided with a storage area for storing decoded n frames (n is a predetermined natural number), and stores decoded frames sent from the decoding sub unit 332 for the latest-transmitted frame, the frame under transmission, and another frame which has been sampled before the completion of the transmission of either frame.

The decoding sub unit 332 decodes coded frames sent from the multiplexer 321, and further inverse-quantized and inverse-DCT-converted. The decoding sub unit 332 decodes a frame under transmission by adding the decoded frame thus inverse-DCT-converted and the decoded reference frame, thereby outputting the frame under transmission to the frame memory 331.

Since the transmission buffer 127, the timer 130, the transmission control sub unit 109 have the same constructions as their equivalents in the first embodiment, they are not described here.

Figure 13:
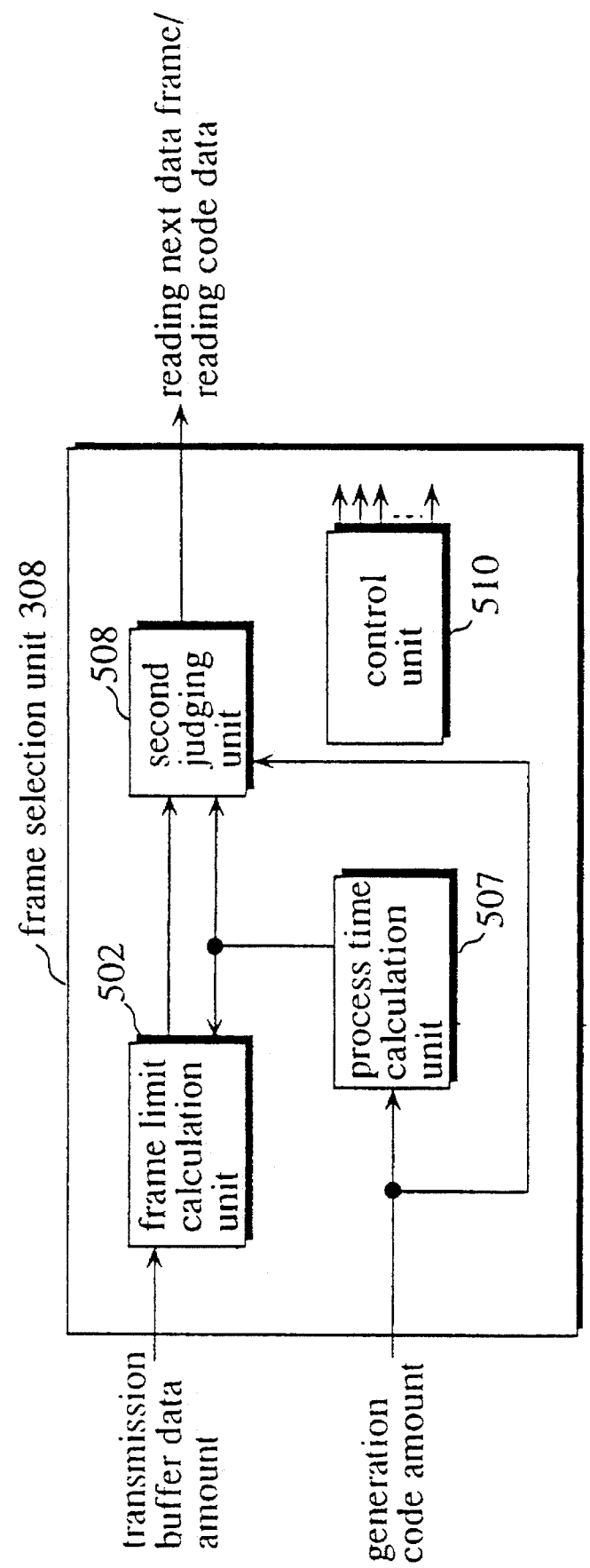
FIG. 13 shows the construction of the frame selection unit 308 provided in the picture data coding apparatus of the second embodiment.

FIG. 13 shows the construction of the frame selection unit 308 of the picture coding unit of this embodiment.

The frame selection unit 308 includes a frame limit calculation unit 502, a process time calculation unit 507, a second judging unit 508, and a control unit 510. Since their operations are the same as their equivalents in the frame selection unit 198a shown in FIG. 8, they are not described again.

Upon detecting the display impossibility signal sent from the frame limit calculation unit 502, the control unit 510 directs the coded data storage unit 303 to sequentially read out coded frames stored in the picture data memories 301(1)-(n) which follow the frame under transmission and to output the generation code amount for the coded frame to the process time calculation unit 507. The process time calculation unit 507 calculates decoded amount for the coded frame read out from the coded data storage unit 303, based on the generation code amount, thereby outputting the decode amount to the second judging unit 508.

Hereinafter, process amount is calculated by regarding the time required for coding as 0.

The second judging unit 508 judges whether or not the transmission of the coded frame can be completed and the decoding of the coded frame can be completed by a receiver before the time to display the frame. In other words, the possibility of displaying the frame is judged. The second judging unit 508 outputs the frame number of the coded frame which have been judged to be capable of being displayed, and the frame number of a reference frame to the coded data storage unit 303, and directs the coded data storage unit 303 to output the coded frame thus designated to the transmission buffer 127.

The operation of the picture coding apparatus constructed as above is described as follows with reference to the time charts shown in FIG. 14.

The time chart (a) shows frames inputted from the pre-process unit 115 to the coding unit 306 at a rate of thirty frames per second. The time chart (b) shows arrows indicating the sample timing of frames. The time chart (c) shows a time required for coding each frame. The time varies depending on the amount of picture data for prediction errors. The coding unit 306 completes the coding operation of frames. The time chart (d) shows a time required for transmitting each coded frame. The time chart (e) shows a time required for decoding each coded data. The time chart (f) shows the timing for displaying decoded picture data on the display unit of the receiver. The circles in the time chart (f) indicate frames which can be displayed on this display timing and the cross indicates otherwise.

Figure 14:
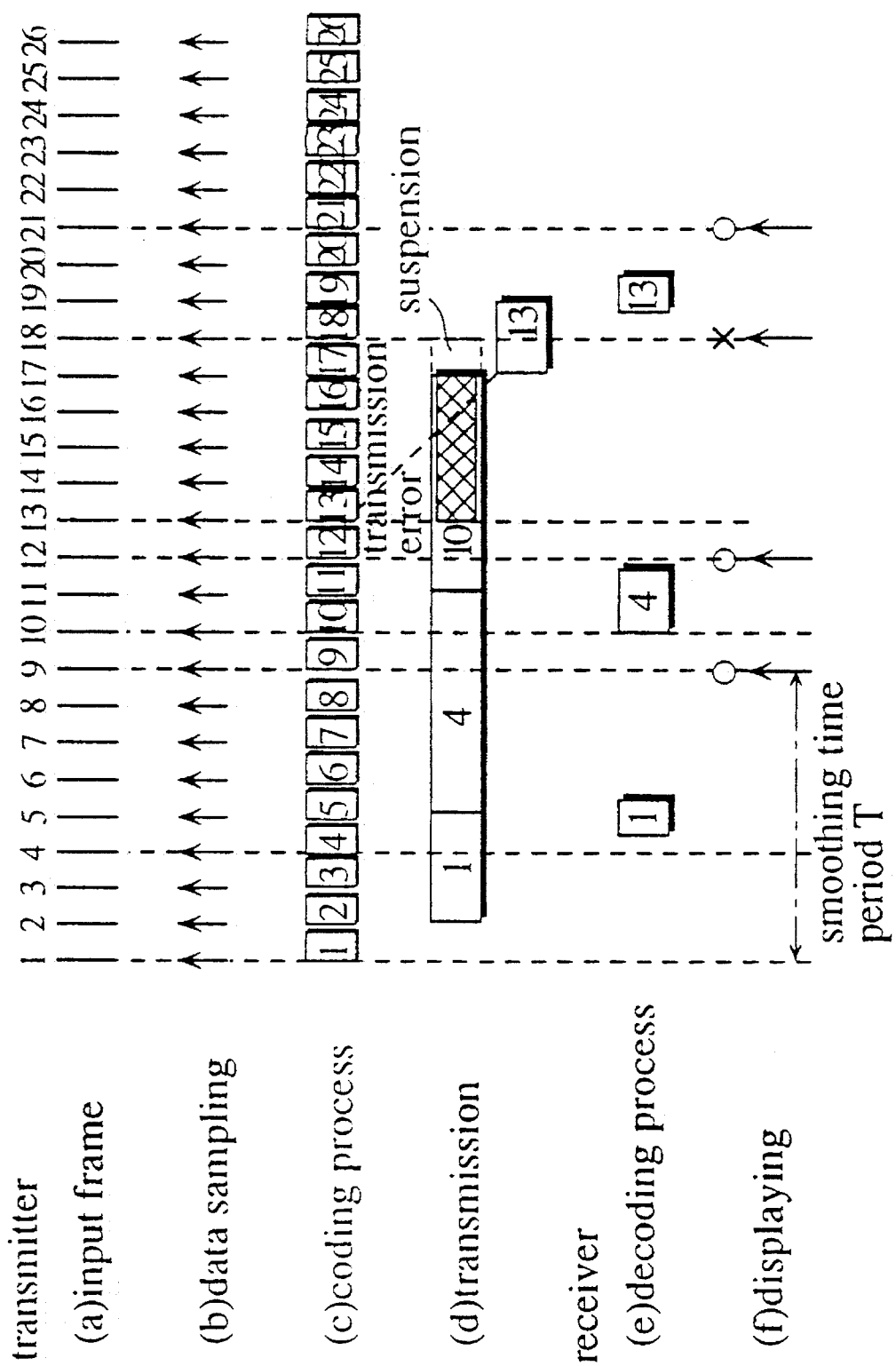
FIG. 14 shows time charts (a)–(f) for explaining the operation of the picture data coding apparatus of the second embodiment.

In FIG. 14, the frames 1 and 4 are displayed at the end of eight-frame time, or the time period "T" after they are sampled, and the frame 10 is not displayed because its decoding operation has not been completed within the time period "T".

It is assumed that the frame 10 has the same amount of image data corresponding to a prediction error as the frame 1. In other words, the frame 10 is assumed to need two-frame time for a coding operation, three-frame time for a transmitting operation unless there is a transmission error, and one-frame time for a decoding operation.

It is assumed that the transmission has started from frame 1. The coding sub unit 304 first codes the frame 1 without determining the prediction error, and outputs it to the transmission buffer 127, the coded data storage unit 303, and the decoding sub unit 332. The frame 1 outputted to the coded data storage unit 303 is stored in association with the frame number and information indicating no reference frame exists, and the generation code amount. The coded frame outputted to the decoding sub unit 332 is decoded by the decoding sub unit 332 and stored in the frame memory 331.

Then, the frame 2 is coded without determining the prediction error and is coded by using the decoded frame 1 as a reference frame stored in the frame memory 331. The coded frame is outputted to the coding data storage unit 303 and the decoding sub unit 332. The coded frame 2 is not outputted because there is not enough vacant storage area in the transmission buffer 127. If there were, the coded frame 2 using the decoded frame 1 as a reference frame is outputted to the transmission buffer 127. The coded frame 2 outputted to the coded data storage unit 303 is stored in the coded data storage unit 303 by being associated with the frame number and either information indicating no reference frame exists or the frame number of the reference frame, and the generation code amount.

Thus, at the point where the frame 2 is coded, there is no frame transmitted, so that the decoded frame 2 which have been coded without determining a prediction error is stored in a different storage area in the frame memory 331 from the area where the frame 1 is stored.

The frame 3 is coded without determining the prediction error, by using the decoded frames 1 and 2 stored in the frame memory 331 as a reference frame. The frame 3 is not outputted to the transmission buffer 127 because of the lack of enough vacancy in the storing area, but transmitted to the coding data storage unit 303 and the decoding sub unit 332.

The coded frame 3 outputted to the coded data storage unit 303 is stored in association with the frame number of the frame, either information indicating no reference frame exists or the frame number of the reference frame, and the generation code amount. The coded frame 3 outputted to the decoding sub unit 332 is outputted to the frame memory 331 after being decoded.

Thus, at the point where the frame 3 is coded, there is no frame transmitted so far, so that the decoded frame 3 which have been coded without determining a prediction error is stored in a different storage area in the frame memory 331 from the area where the frames 1 and 2 are stored.

If there were enough vacant area and the coded frame 2 is stored, the decoded frame 3 using decoded frame 2 as a reference frame is outputted to the transmission buffer 127. If there were enough vacant area and the coded frame 1 is stored, the decoded frame 3 using the decoded frame 1 as a reference frame is outputted to the transmission buffer 127.

The coded data of frame 4 is outputted to the transmission buffer 127 since enough storage area is available. At this point, the coded frame 1 is stored in the transmission buffer 127, so that the coded frame 4 using the decoded frame 1 as a reference frame is outputted to the transmission buffer 127.

In addition, among coded data in the coded frame 4, those coded without determining the prediction error are outputted to the decoding sub unit 332. The coded data outputted to the decoding sub unit 332 is decoded in the decoding sub unit 332 and stored in a different storage area in the frame memory 331 from the area where the frames 1, 2, and 3 are stored.

Since the transmission of the frame 1 is completed at a point where the frame 5 is sampled, the decoded frames 2 and 3 stored in the frame memory 331 are abandoned. At the same time, the decoded frame stored in the coded data storage unit 303 having the frames 2 and 3 as reference numbers are abandoned.

The picture data of frame 5 are coded by using the frames 1 and 4 as reference frames. The coded frame 5 is stored in the coded data storage unit 303 in association with the frame number, the frame number of the reference frame, and the generation code amount.

In the same manner, the frames 6 through 10 are sequentially coded by using the decoded frames 1 and 4 stored in the frame memory 331 as reference frames. The coding unit 306 performs a picture data coding operation for each frame in one-frame time. The frames thus coded are all outputted to the coding data storage unit 303 and stored in association with the frame number of the frame, the frame number of the reference frame, and the generation code amount.

In addition, among the coded frames, those to be outputted to the transmission buffer 127 are outputted to the decoding sub unit 332. The coded frame thus outputted are decoded and outputted to the frame memory 331, thereby being multiplexed with the latest-transmitted decoded frame to be stored in association with its frame number.

Thus, at a time when the coding operation for the frame 10 is completed, the transmission buffer has a certain amount of vacant storage area and the coded frame 10 is outputted to the transmission buffer 127. Then, at the time point where the frame 11 is sampled, the data coding of the frame 4 is completed, and the transmission of coded frame 10 is started.

At this point, the frame 4 becomes the latest-transmitted frame. Consequently, among the coded frames stored in the coded data storage unit 303, those using the frame 1 as a reference frame are abandoned.

It is assumed that a burst error is caused by the above-mentioned fading over four-frame time while the frame 10 is under transmission.

As shown in the time chart (d) of FIG. 14, if the transmission error lasts even after the time point where the frame 16 is to be inputted, the frame selection unit 308 determines the impossibility of displaying the frame 10, based on its data amount remaining in the buffer 127, the time left before the time point where the frame 10 is to be displayed, and the generation data amount.

After transferring the coded frame 10, the coded data storage unit 303 sequentially codes the frames 11, 12, 13, and so on, by using the frames 4 and 10 as reference frames and stored in the picture data memories 301(1)-(n).

For example, the frames 11, 12, and 13 are allowed to spend three-frame time, four-frame time, and five-frame time respectively for transmission and decoding when the impossibility of displaying the frame 10 has been judged, that is, when the frame 16 is inputted. The frame selection unit 308 selects the smallest numbered frame among those capable of being transmitted and decoded within the respective time limit, thereby outputting the frame number of the selected frame and the frame number of the reference frame to the memory control unit 302.

Here, it is assumed that the frame 13 has been selected. The memory control unit 302 reads the coded data frame 13 using the frame 4 as a reference frame, and outputs it to the transmission control unit 307.

In this case, the transmitting operation of the frame 13 is started when the transmission error has disappeared, that is, when the frame 17 is being inputted. Then, the frame 13 is displayed on the display unit of the receiver when the frame 20 is being inputted.

Instead of selecting the smallest numbered frame among those capable of being transmitted and decoded within the time limit, a frame prior to the frame under transmission may be selected. This is effective in the cases where the generation code amount of the frame under transmission is large or where a transmission error has occurred immediately after the start of transmitting the frame, and can further decrease the number of frames skipped to be caused when the frame under transmission becomes incapable of being displayed.

Although the generation code amount of each coded frame is stored in the coded data storage unit 303 together with coded frame, the amount may be calculated every time a coded frame is read out of the coded data storage unit 303 for determining the possibility of displaying them without storing in the unit 303.

Thus, in the conventional picture data coding unit, 12 frames are skipped when a burst error has occurred whereas in the present invention, the skipping is restricted to 8. In other words, all frames are coded and stored in the coded data storage unit 303, the frame skipping, which happens when a frame under transmission becomes incapable of being displayed owing to a transmission delay can be minimized without extending the smoothing time period.

Furthermore, the transmission of a coded frame selected by the frame selection unit 308 can be started quickly.

The frame which has been sampled by the completion of the first one frame transmission, is coded and then decoded in the decoding unit 333, multiplexed with the decoded reference frame, and stored in the frame memory 331; however, those frames may be stored directly to the frame memory 331 after being coded.

In other words, as shown in FIG. 14, the frames 2, 3, and 4 which are sampled by the completion of the transmission of the frame 1, may be directly stored in the frame memory 331.

<EMBODIMENT 3>

The construction of the picture coding apparatus of this embodiment will be described as follows with reference to FIGS. 15 and 16.

Figure 15:
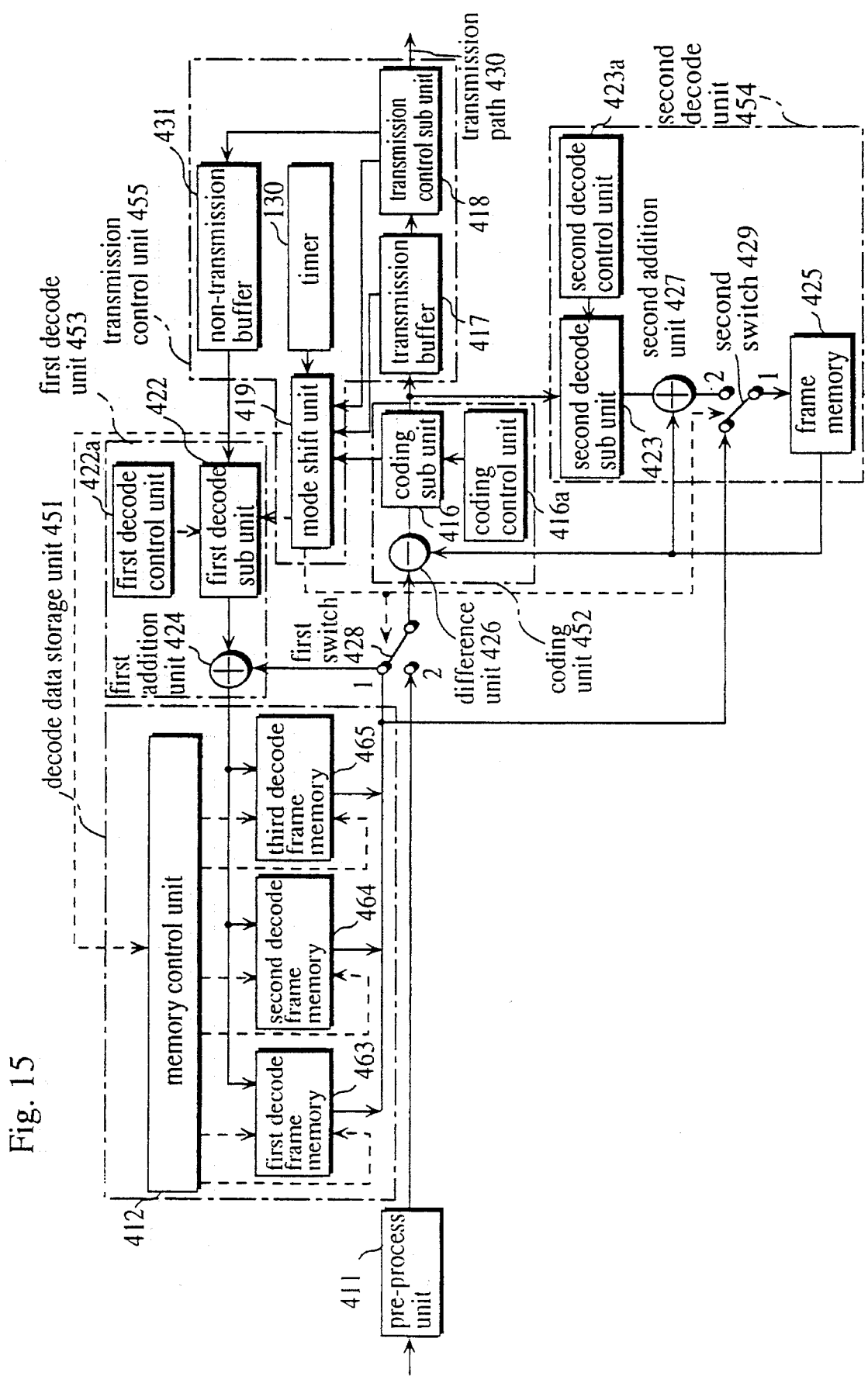
FIG. 15 shows the construction of the picture coding apparatus of the third embodiment.

In FIG. 15, the apparatus comprises a pre-process unit 411, a decode data storage unit 451, a coding unit 452, a first decode unit 453, a second decode unit 454, a transmission control unit 455, a first switch 428, and a second switch 429.

The decode data storage unit 451 includes a memory control unit 412, a first decode frame memory 463, a second decode frame memory 464, and a third decode frame memory 465. The coding unit 452 includes a coding sub unit 416, a coding control unit 416a, and a difference unit 426. The first decode unit 453 includes a first decode sub unit 422, a first decode control unit 422a, and a first addition unit 424. The second decode unit 454 includes a second decode sub unit 423, a second decode control unit 423a, a frame memory 425, and a second addition unit 427. The transmission control unit 455 includes a transmission buffer 417, a transmission control sub unit 418, a mode shift unit 419, a timer 130, and a non-transmission buffer 431.

The pre-process unit 411 is the same that in the first embodiment and its description is omitted.

The decode data storage unit 451 stores decode frame outputted from the first decode unit 453.

Each of the first, second, and third decode frame memories 463–465 is a dual-port memory and includes a storage area for storing decode one-frame data.

If a newly decoded frame is written when all the decode frame memories are full, the smallest numbered decoded frame is replaced by the newly decoded frame. When a decode frame which has not been yet transmitted is newly written, the smallest numbered decoded frame that has not been yet transmitted is replaced.

The memory control unit 412 controls the reading and writing of decoded frames from/to the first, second, and third decode frame memories 463–465.

The coding unit 452 predict-codes inputted frames under control of the coding control unit 416a.

The coding sub unit 416 codes prediction errors obtained by the difference determined in the difference unit 426. The difference unit 426 detects the difference between a target block and another block in a reference frame.

The first decode unit 453 decodes coded blocks sent from the transmission control unit 455, multiplexes them with a block stored in the decode data storage unit 451, corresponding to the decode data and outputs the result to the decode data storage unit 451. As a result, the decode block corresponding to the original picture data of the coded data sent from the transmission control unit 455 is stored in the decode data storage unit 451.

The first decode sub unit 422 decodes code blocks stored in the non-transmission buffer 431 one by one.

The first addition unit 424 adds two blocks inputted and outputs the sum to the decode data storage unit 451, the two blocks being decode data decoded in the first decode sub unit 422 and the decode data of the latest-transmitted frame stored in one of the first, second, and third decode frame memories 463–465.

Under control of the second decode control unit 423a, the second decode unit 454 decodes code blocks which have been sent from the coding unit 452 to the transmission buffer 417, and multiplexes them with a decode block stored in the frame memory 425. As a result, the decode block corresponding to the original picture data of the coded data sent from the transmission buffer 417 is stored in the frame memory 425.

The second decode sub unit 423 decodes blocks that have been predictive coded by the coding unit 452.

The frame memory 425 stores decoded blocks multiplexed by the second addition unit 427, the decode blocks being inputted through the second switch 429.

The second addition unit 427 adds two blocks inputted, one block being detected from a decode frame decoded by the second decode sub unit 423, and the other block being detected in the reference frame stored in the frame memory 425.

The transmission control unit 455 transmits a frame to the receiver through the transmission path 430, judges the possibility of displaying the frame, and switches the entire operation of the picture coding apparatus to minimize the frame skipping when the frame has been judged to be incapable of being displayed.

The transmission buffer 417 is a FIFO memory, and stores transmitted frames.

The transmission control sub unit 418 transmits frames stored in the transmission buffer 417 to the receiver. The transmission control sub unit 418 has a storing area for storing at least one block and stores the code block under transmission to the storing area.

Upon detecting the data receipt signal sent from the receiver, the transmission control sub unit 418 outputs the detected data receipt signal to the mode shift unit 419 and outputs the corresponding coded block to the non-transmission buffer 431. When the data receipt signal cannot be detected, the transmission control sub unit 418 outputs a transmission impossibility signal to the mode shift unit 419 and resends the coded block stored in the storage area to the receiver.

The mode shift unit 419 includes a frame limit calculation unit 591 which is similar to the frame limit calculation unit 502 provided in the first embodiment, and judges the possibility of displaying each frame, from the frame limit outputted from the frame limit calculation unit 591. The mode shift unit 419, when a frame under transmission cannot be displayed, switches the operational status of the first switch 428 and the second switch 429, thereby switching the entire operation of the picture coding apparatus.

The timer 130 outputs a signal whose value changes every one-frame time.

The non-transmission buffer 431 stores coded frames read out of the transmission buffer 417 through the transmission control sub unit 418, the coded frames being written and read out block by block.

The operational states of the first switch 428 and the second switch 429 are shifted through a control signal sent from the mode shift unit 419. The states of the first and second switches 428 and 429 are electrically shifted. Their terminals 1 are in a connected state until the frame under transmission is judged to be incapable of being displayed, and their terminals 2 are in a disconnected state after the frame under transmission is judged to be incapable of being displayed.

<The mode shift unit 419>

Figure 16:
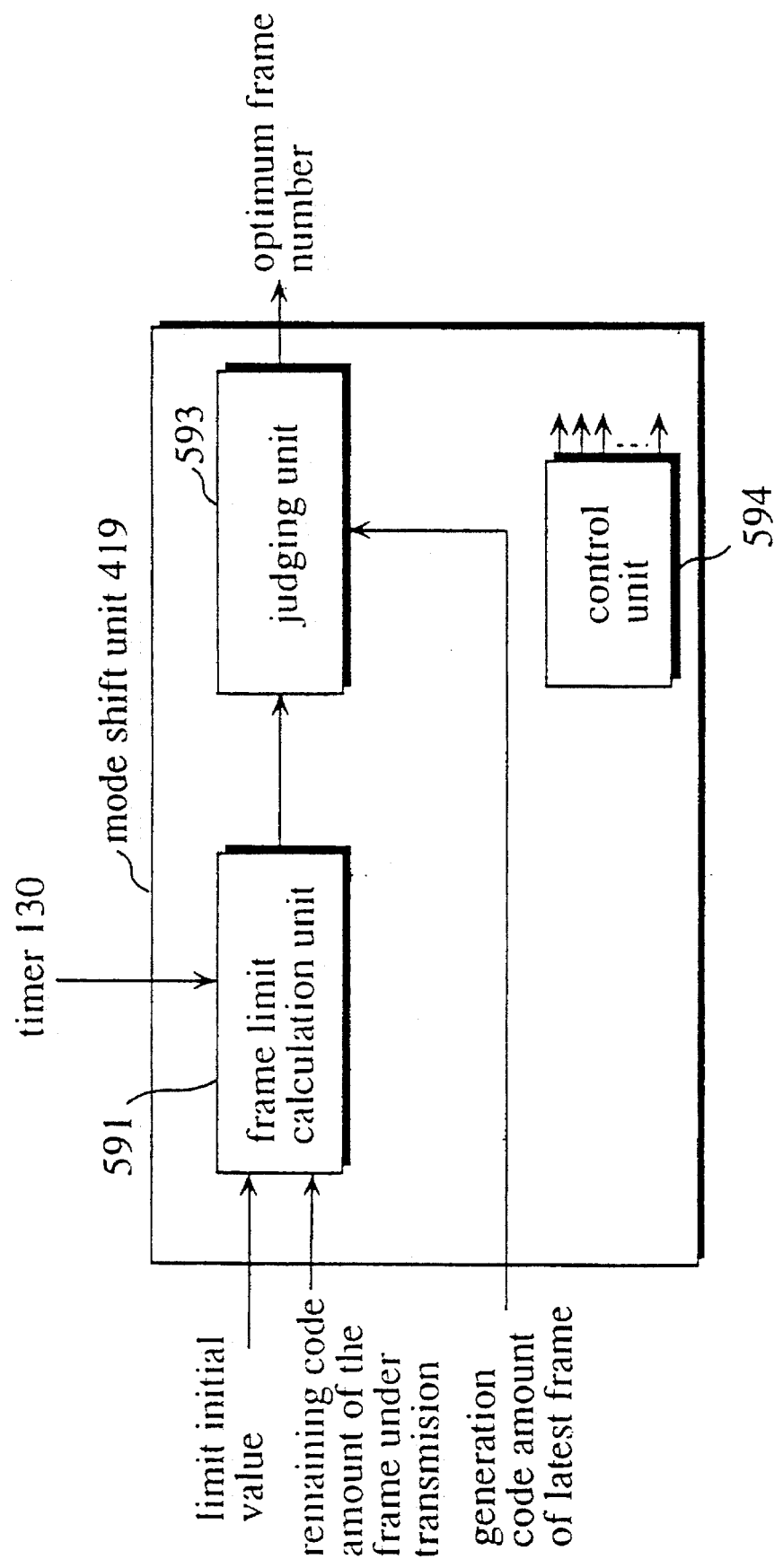
FIG. 16 shows the construction of the mode shift unit 419 of the third embodiment.

FIG. 16 shows the construction of the mode shift unit 419 of this embodiment, which includes a frame limit calculation unit 591, a judging unit 593, and a control unit 594.

The frame limit calculation unit 591 has the same construction as the frame limit calculation unit 502 of the first embodiment. When the possibility of displaying a frame is judged, the decode time of the frame is not taken into account. In other words, the frame limit calculation unit 591 determined the frame limit of a frame under transmission every one-frame time, based on the signal sent from the timer 130, and judges that the frame can be displayed if the value, which is obtained by subtracting the remaining code amount of a frame under transmission in the transmission buffer 417 from the frame limit, is smaller than the threshold. The frame limit calculation unit 591 outputs a display impossibility signal to the control unit 594 when judged that the frame can not be displayed.

The judging unit 593 compares the frame limit of a frame to be judged with the predictive generation code amount which is regarded as the generation code amount of the latest-coded frame stored in the transmission buffer 417, thereby judging that the frame whose predictive generation code amount is smaller than the frame limit can be displayed. The judging unit 593 outputs the frame number of the smallest numbered frame among the frames which have been judged to be capable of being displayed to the control unit 594 as the optimum frame. The judging unit 593 outputs a display impossibility signal to the control unit 594 when the frame has been judged to be incapable of being displayed.

Upon detecting the display impossibility signal, the control unit 594 directs the coding control unit 416a to detect the code amount of the latest-coded frame stored in the transmission buffer 417 and output it to the judging unit 593. The control unit 594 further directs the judging unit 593 to judge whether or not a frame following the frame under transmission can be displayed.

At this point, the latest-coded frame stored in the transmission buffer 417 is stored in the frame memory 425. Consequently, the coding sub unit 416 codes the latest-transmitted frame stored in the decode data storage unit 451 as a reference frame, thereby detecting the generation code amount.

Upon detecting the display impossibility signal, the control unit 594 outputs a selection signal to the frame limit calculation unit 591, thereby directing to output the frame limit of the next frame to the judging unit 593. In addition, upon detecting the optimum frame number, the control unit 594 directs the coding unit 452 to perform a predictive coding based on the decoded optimum frame stored in the decode data storage unit 451 and the decode latest-transmitted frame.

Figure 17:
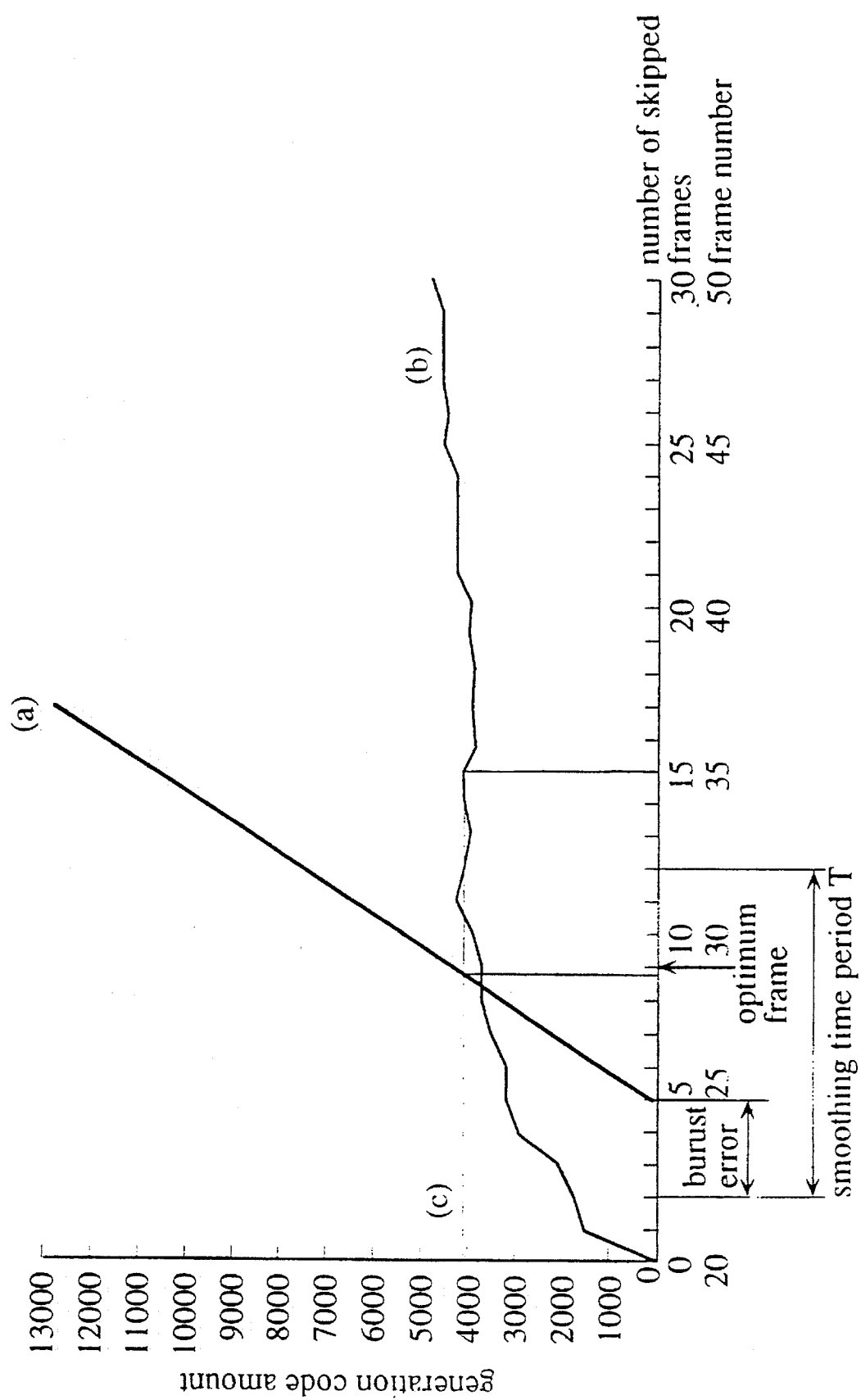
FIG. 17 is a graph showing a method for detecting the optimum frame by the mode shift unit 419 of the third embodiment.

A method for detecting the optimum frame by the mode shift unit 419 of this embodiment is shown in FIG. 17. The graph in FIG. 17 shows the generation code amount obtained when frames 21 through 50 of the test picture Miss America are coded by using the frame 20 as a reference frame. The axis of ordinate indicates the generation code amount and the axis of abscissa indicates the number of frames skipped between the frame 20 to a frame which is a candidate to detect the generation codes, and the frame number of the frame.

The straight line (a) indicates the transmission rate (32 kpbs) of the transmission path after the occurrence of a burst error. The zigzag line (b) indicates the generation code amount for the number of skipped frames. The straight line (c) indicates the generation code amount when the decoded frame 20 is coded by using the frame 35 as a reference frame. In this case, a burst error has spread over the frames 22 through 25.

As the zigzag line (b) indicates, if the number of skipped frames reaches a certain extent between the reference frame and the frame whose generation code amount is to be judged, the generation code amount shows a fixed value. In this case, when the number of skipped frames reaches 10, the generation code amount becomes around 4000 bits. This value varies depending on the motion picture data to be transmitted.

Consequently, when the frame under transmission cannot be displayed, the mode shift unit 419 detects a frame that can be displayed among all the frames stored in the transmission buffer 417 on the assumption that, when the frame under transmission cannot be displayed due to a transmission error, the generation code amount of the frame which can be displayed next can be regarded as the generation code amount of the latest-coded frame stored in the transmission buffer 417.

In FIG. 17, the latest-transmitted frame is the frame 20, and the transmission error has continued between the input point of the frame 22 and the input point of the frame 25. In addition, the generation code amount of a frame to be judged its display possibility is regarded as the generation code amount of the frame 35, that is, 4000 bits. If the smoothing time period "T" is made ten-frame time and the transmission is started when the transmission error has disappeared, that is, when the frame 25 is inputted, then the transmission is completed by the time for displaying the frame on the display unit of the receiver. The optimum frame which minimizes the frame skipping is the frame indicated on the crossing point of the straight lines (a) and (c), namely, the frame 29.

<Operation of the entire picture coding apparatus>

Figure 18:
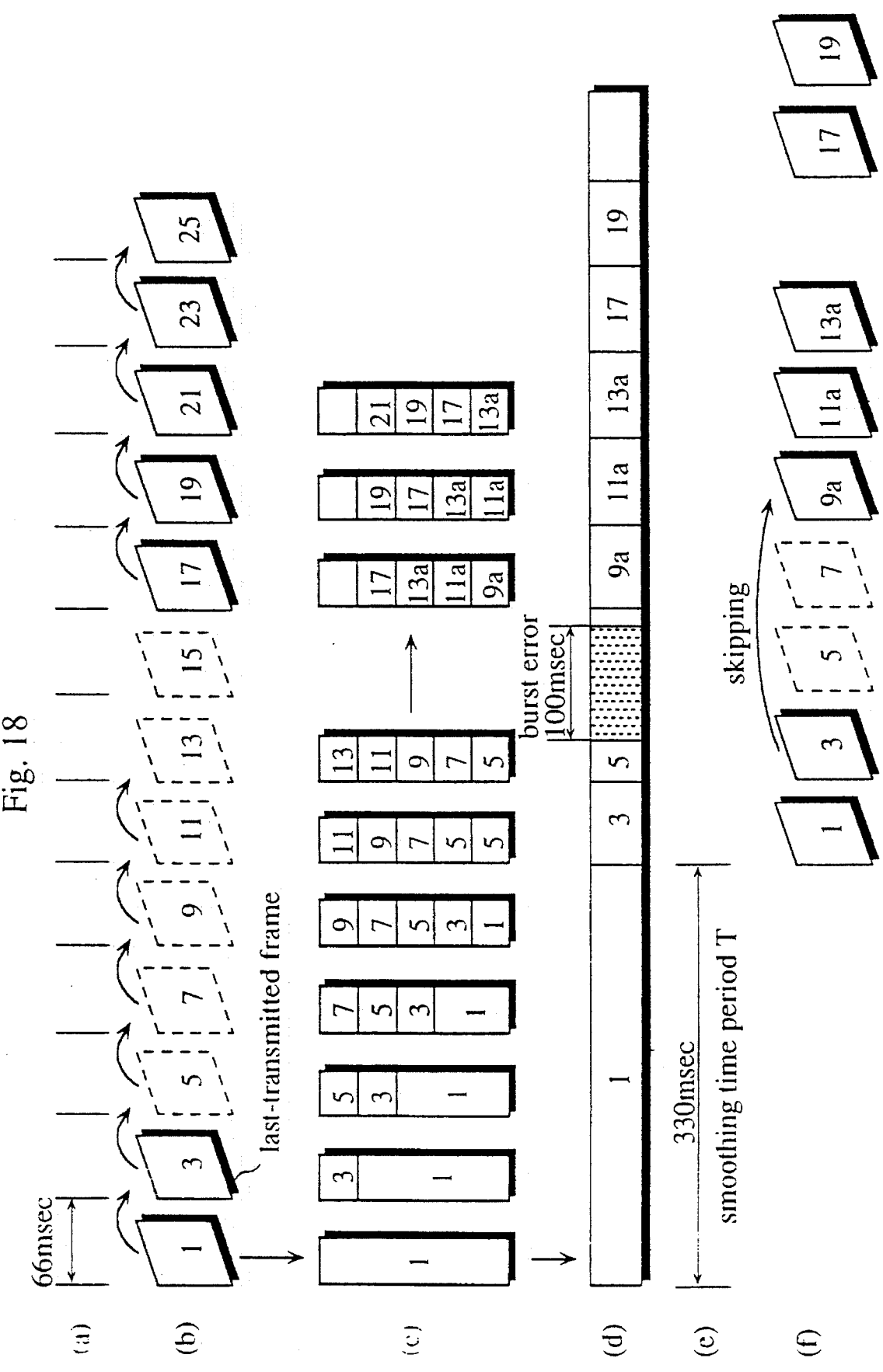
FIG. 18 shows timing charts (a)–(f) for explaining the operation of the picture coding apparatus of the third embodiment.
Figure 19:
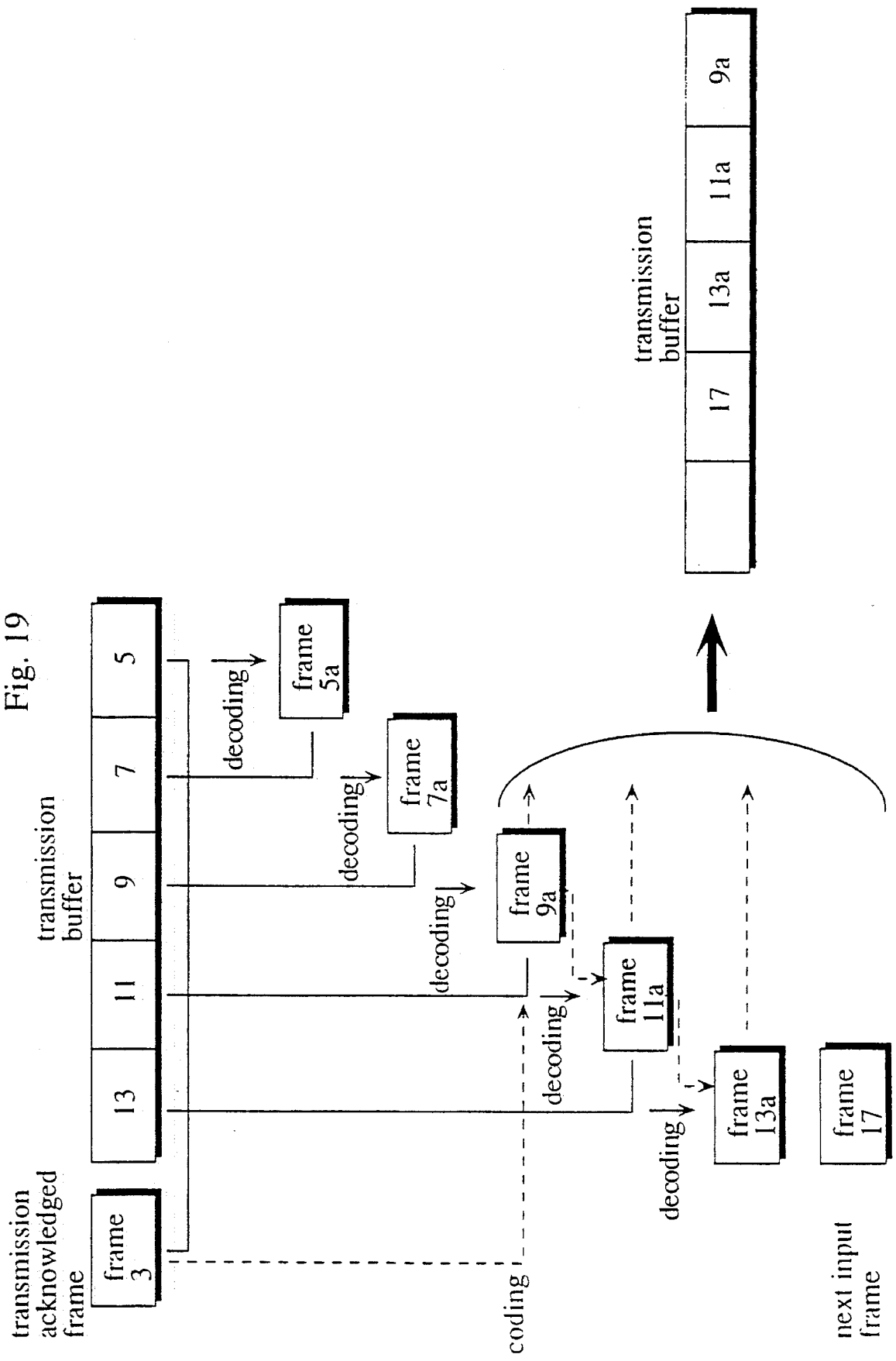
FIG. 19 shows an example of decoding, coding, and transmitting operations of each frame.
Figure 20:
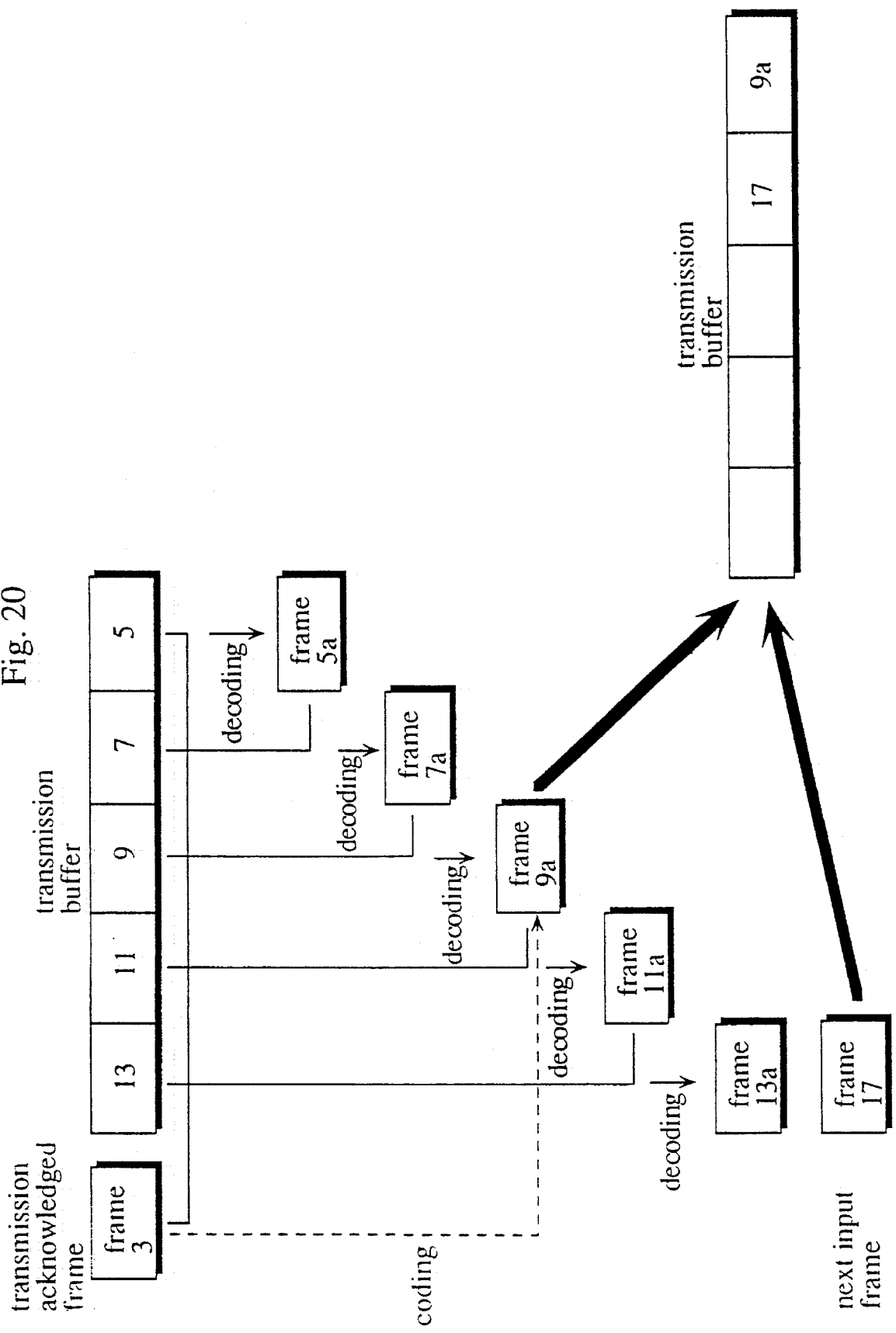
FIG. 20 shows another example of decoding, coding, and transmitting operations of each frame.

FIG. 18 shows timing charts (a)–(f) for explaining the operation of the picture coding apparatus of this embodiment. FIG. 19 shows an example of decoding, coding, and transmitting operations of each frame. FIG. 20 shows another example of decoding, coding, and transmitting operations of each frame.

In FIG. 18, the frame 5 is coded based on the prediction error, and at best, that is, when there is no transmission delay owing to a transmission error, a transmission can be completed in two-frame time (66msec), and displayed on the display unit of the receiver at the end of the smoothing time period "T", that is, ten-frame time (330 msec).

However, when the transmission path 430 is movable wireless circuit, the occurrence of a burst error caused by fading is inevitable. The burst error reaches three- to six-frame time when the moving rate is below a walking speed. It is assumed that such transmission delay has occurred over 100 msec (about three-frame time) during the transmission of frame 5.

The time chart (a) shows the timing for sampling each frame which is sent from the pre-process unit 411 to the coding sub unit 416. The time chart (b) shows the frame numbers of frames to be sampled by the coding sub unit 416 among those inputted from the pre-process unit 411. The time chart (c) shows the frame numbers of frames stored in the transmission buffer 417. The time chart (d) shows a transmission condition of each coded frame. The time chart (e) shows a smoothing time period "T". The time chart (f) shows the timing for displaying decoded frame on the display unit of the receiver.

As shown in the time chart (a), the coding sub unit 416 samples frames received from the pre-process unit 411 at 66 msec interval (one frame skipping). As shown in the time chart (f), the timing for displaying the frames decoded by the receiver is at the end of the smoothing time period "T", which follows the sampling time of the frame. Here the period "T" corresponds to ten-frame time. If the decoding is completed before the end of the period "T", the frame is held until the end of the period, and it is not completed by the end of the period, the frame is abandoned.

The time required for coding in the transmitter and for decoding in the receiver are not taken into account to simplify the operational explanation.

FIGS. 19 and 20 show methods for decoding and coding frames remaining in the transmission buffer 417, and also show the frame numbers of the frames remaining in the transmission buffer 417 right after the frame 17 is sampled. (normal operation)

The following is an operational description of the picture coding apparatus which has informed of a receipt of the frames from the receiver.

It is assumed that the third decode frame memory 465 presently store the latest-transmitted frame, whose safe receipt has been informed from the receiver. In this case, the terminals 2 of the first switch 428 and the second switch 429 are both in a connected state.

Until the display impossibility of the frame is determined, the coding unit 452 directs the difference unit 426 to detect a motion vector between the sampled frame and the decode reference frame stored in the frame memory 425 block by block, and to determine the difference, thereby determining the prediction error. The coding sub unit 416 codes the determined prediction error, thereby outputting to the transmission buffer 417.

The second decode sub unit 423 decodes the coded prediction error, thereby outputting it to the second addition unit 427. The second addition unit 427 adds the reference frame in the frame memory 425 and the prediction error decoded by the second decode sub unit 423, thereby outputting to the frame memory 425. The transmission control sub unit 418 transmits the coded frame stored in the transmission buffer 417 to the receiver through the transmission path 430 block by block.

The transmission control sub unit 418 transfers the coded frame whose safe receipt has been informed from the receiver, to the non-transmission buffer 431, thereby outputting a transmission acknowledgement signal to the mode shift unit 419.

In accordance with the direction of the mode shift unit 419, the first decode sub unit 422 sequentially decodes the coded frames thus acknowledged and outputs them to the first addition unit 424. The memory control unit 412 reads out the latest-transmitted frame stored in the third decode frame memory 465 in accordance with the mode shift unit 419, thereby outputting one decoded block corresponding to the coded block to the first addition unit 424. The first addition unit 424 adds the decoded frame and the latest-transmitted frame read out of the third decode frame memory 465, thereby storing them to the first decode frame memory 463. When the transmission of all the blocks in the frame under transmission has been acknowledged, the memory control unit 412 administrates the frame stored in the first decode frame memory 413a as the latest-transmitted frame.

The following is the operation of the picture data coding apparatus of this embodiment when the transmission speed is decreased by a burst error.

(Operations when a transmission error has occurred)

As shown in FIG. 18, if a burst error has occurred over a period corresponding to 100 msec while the coded frame 5 is under transmission, the transmission control sub unit 418 outputs a display impossibility signal to the mode shift unit 419. At this point, the transmission buffer 417 has coded frames 5, 7, 9, 11, and 13 which respectively use reference frames 3, 5, 7, 9, and 11.

The frame memory 425 stores the decode frame 13 therein.

The second decode frame memory 464 stores the decoded blocks of the frame 5 under transmission, the receipt of which blocks by the receiver has been acknowledged. The first decode frame memory 463 stores the decoded frame 3, which is the latest-transmitted frame whose receipt by the receiver has been acknowledged.

If the mode shift unit 419 has judged that the remaining blocks of the frame 5 cannot be transmitted by the displaying operation, from the frame limit and the remaining code amount of the frame 5 in the transmission buffer 417, the terminals 1 of the first switch 428 and the second switch 429 are put in a connected state.

The frames 7, 9, 11, and 13 stored in the transmission buffer 417 have been coded with prediction errors, so that they become invalid on the point that frame 5 becomes incapable of being displayed. Thus, the frame 5 is entirely decoded to reproduce the picture data therein by using the frame 3 which is the latest-transmitted frame.

(Reproduction of the frame under transmission)

The transmission control sub unit 418 reads remaining coded data of the frame 5 and the coded data of the frames 7, 9, 11, and 13 which remain in the transmission buffer 417, and transfers the coded frames to the non-transmission buffer 431. The first decode sub unit 422 reads out the remaining data of the frame 5 from the non-transmission buffer 431 block by block to decode and output them to the first addition unit 424.

In accordance with the mode shift unit 419, the memory control unit 412 reads the decoded latest-transmitted frame from the first decode frame memory 463 and transfers one decoded block of the latest-transmitted frame (the frame 3) corresponding to the block read from the non-transmission buffer 431, to the first addition unit 424.

The first addition unit 424 adds the two blocks and outputs them to the second decode frame memory 464. As a result, the remaining data of the frame 5 is added to the decode data which are already stored in the second decode frame memory 414, and reproduced there.

(Reproduction of the frame following the frame under transmission)

At first, the first decode sub unit 422 sequentially reads out and decodes remaining data of the frame 7 which remains in the non-transmission buffer 431, thereby outputting one decoded block to the first addition unit 424.

In accordance with the direction of the mode shift unit 419, the memory control unit 412 reads out the decoded data of the frame 5 of the second decode frame memory 464, and then transfer one decoded block corresponding to the block decoded by the first decode sub unit 422 to the first addition unit 424.

The first addition unit 424 adds the block of the frame 7 decoded by the first decode sub unit 422 and the block of the frame 5 transferred from the second decode frame memory 464, and outputs the result to the third decode frame memory 465. As a result, the frame 7, which has not been transmitted is reproduced by decoded data in the third decode frame memory 465.

(Detection of the optimum frame)

Informed of the receipt of a frame from the receiver, the transmission control sub unit 418 outputs a transmission acknowledgement signal to the mode shift unit 419.

Upon detecting the transmission acknowledge signal, the mode shift unit 419 directs the memory control unit 412 to transfer the frame 3, which is the latest-transmitted frame stored in the first decode frame memory 463 and the frame 13, which is the latest-transmitted frame stored in the decode frame memory 425 to the difference unit 426.

The difference unit 426 detects a prediction error between the decoded frame 3 as the reference frame and the decode frame 13 as a target frame, thereby outputting the prediction error to the coding sub unit 416 to be coded.

The coding control unit 416a detects the generation code amount of the frame 13 to output to the mode shift unit 419.

The mode shift unit 419 judges whether the frame 7 stored in the third decode frame memory 465 can be displayed or not by using the generation code amount of the frame 13 outputted from the coding control unit 416a as the prediction code amount of the target frame.

The mode shift unit 419 outputs the frame number of the smallest numbered frame among those judged to be capable of being displayed, to the memory control unit 412 as the optimum frame. It is assumed that frame 7 has been judged to be incapable of being displayed. The coded frame 9 stored in the non-transmission buffer 431 was decoded by the first decode unit 453 and produced in the second decode frame memory 464. The mode shift unit 419 judges whether or not the frame 9 can be displayed by using the generation code amount of the frame 13 as the prediction code amount. It is assumed that the frame number of the frame 9 has been outputted as the optimum frame number.

(Coding)

Furthermore, the mode shift unit 419 directs the memory control unit 412 to transfer the decoded frame 3 stored in the first decode frame memory 463 to the frame control unit 412 and the decode frame 9, which is the optimum frame stored in the second decode frame memory 464 to the difference unit 426.

The difference unit 426 detects a prediction error between the decode frame 3 as the reference frame and the decoded frame 9 as a target frame, thereby outputting the prediction error to the coding sub unit 416. The coding sub unit 416 codes the prediction error and outputs it to the transmission buffer 417. As a result, the frame which is being coded is decoded and stored in the frame memory.

In the same manner, frames after the optimum frame are reproduced by decoded data, judged its display possibility, and predictive-coded, thereby being outputted to the transmission buffer 417.

The mode shift unit 419 puts the terminals 2 of the first switch 428 and the second switch 429 in a connected state. (Transmission)

At this point, the transmission buffer 417 has coded data 9a, 11a, 13a, and 17a of the frames 9, 11, 13, and 17 which respectively use the frames 3, 9, 11, and 13 as reference frames. These coded data are transmitted to the receiver. The frame 17 is a frame which has been sampled after the transmission error.

Thus, according to this embodiment, even if a transmission error has been generated over a period 100 msec, only the frames 5 and 7 are skipped in the receiver as shown in FIG. 19.

Although this embodiment has two decode units: the first decode sub unit 422 and the second decode sub unit 423, one of them can be omitted because they have common constructions.

In this embodiment, the frames 9, 11, 13, and 17 are transmitted; however, as shown in FIG. 20, after the mode shift unit 419 detects the frame 9 as the optimum frame, the frame 17 sampled after the transmission error may be transmitted without coding the frames 11 and 13.

When the mode shift unit 419 judges whether or not frames stored in the decode data storage unit 451 can be displayed, the judging operation may be started from a frame standing in the middle of all the frames remaining in the transmission buffer 417. In other words, as shown in FIG. 18, the transmission buffer 417 contains the frames 5, 7, 9, 11, and 13 at the time of the burst error occurred. In this case, the frame standing in the middle is the frame 9 which becomes the first to be judged. Consequently, the frame 9 and following frames can be displayed.

The mode shift unit 419, which is described with reference to FIG. 16, may be provided to the picture data coding apparatus of the first and second embodiments.

Figure 21:
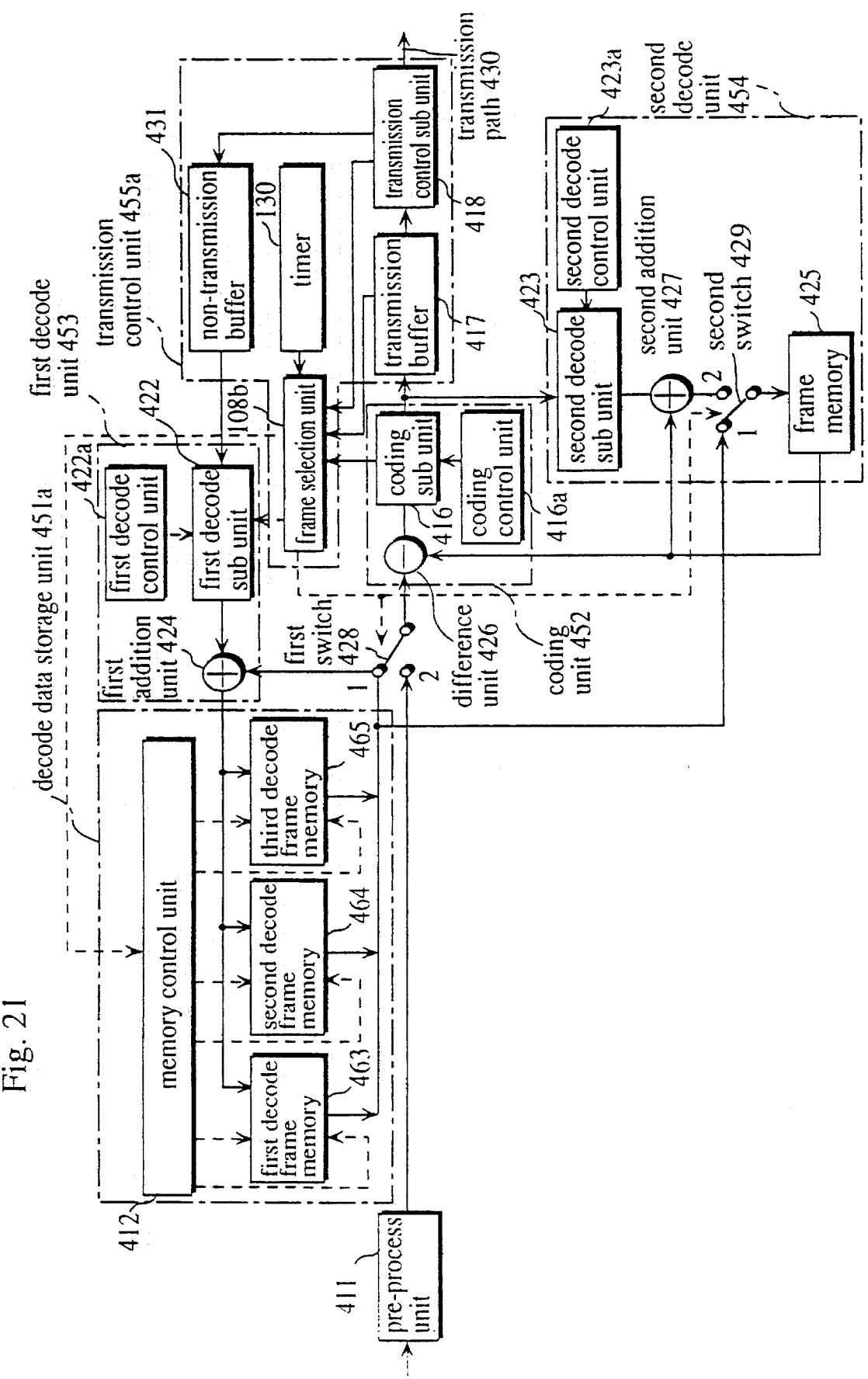

FIG. 21 shows the construction of the picture data coding apparatus of this embodiment provided with a decode memory control unit 451a and a transmission control unit 455a. In this embodiment, the frame selection unit 108b, which is similar to the frame selection unit 108 provided in the first embodiment, is provided instead of the mode shift unit 419.

Unlike the frame selection unit 108, the frame selection unit 108b has no process time calculation unit because process time is not taken into account. The frame selection unit 108 may or may not include the generation code amount prediction unit 503.

In the case where the generation code amount prediction unit 503 is included, the coding unit 452 detects the inter-frame difference for predicting the generation code amount and outputs it to the generation code amount prediction unit 503 in accordance with the direction of the controlling unit 509. The inter-frame difference is obtained by detecting the difference between a target frame and the latest-transmitted frame.

In the case where the generation code amount prediction unit 503 is not included, the coding unit 452 performs a prediction coding operation of the target frame by using the latest-transmitted frame as a reference frame in accordance with the direction of the control unit 511. The coding unit 452 then detects the generation code amount of predictive-coded data and outputs it to the frame selection unit 108b.

The operation of the picture data coding apparatus of this embodiment performed until a frame under transmission becomes incapable of being displayed is equal to that of FIG. 15.

(Operations when the frame under transmission has been judged to be incapable of being displayed)

Operation of the picture data coding apparatus of this embodiment will be described with reference to FIG. 4, 18, and 21. It is assumed that the first decode frame memory 463 stores the coded frame 3 which is the latest-transmitted frame.

When the frame selection unit 108b has judged the display impossibility of the frame under transmission, the picture data of the frame 5 which was under transmission as shown in FIG. 21 are reproduced in the second decode frame memory 464. Then, the picture data of the frame 7 is reproduced in the same manner in the third decode frame memory 465, based on the decoded frame 5 stored in the second decode frame memory 464. (Judgement of display capability)

Upon completion of the reproduction of the picture data of frame 7, the decoded frame 7 is read out of the third decode frame memory 465 and transferred to the coding unit 452 via the first switch 428.

The decode frame 3, which is the latest-transmitted frame, is read out of the first decode frame memory 463 and transferred to the frame memory 425.

(Judgement based on the predictive generation code amount)

The frame selection unit 108b is provided with the generation code amount prediction unit 503, the coding unit 452 detects the inter-frame difference between the decoded frames 7 and 3, thereby transferring to the generation code amount prediction unit 503.

The generation code amount prediction unit 503 predicts the generation code amount of the frame 7 from the inter-frame difference, thereby outputting the predicted generated code amount to the second judging unit 508.

The second judging unit 508 compares the frame limit of the frame 7 outputted from the frame limit calculation unit 502 with the predictive generation code amount. Then the second judging unit 508 determines the possibility of displaying the data of frame 7 when the value obtained by subtracting the predictive generation code amount from the frame limit is below the threshold, and then outputs a display possibility signal to the control unit 511. When they have been judged to be incapable of being displayed, a display impossibility signal is outputted to the control unit 511.

Upon detecting the display possibility signal, the control unit 511 directs the first decode unit 453 to predictive code the decoded frame 7 by using the frame 3 as a reference frame.

Upon detecting the display impossibility signal, the control unit 511 directs the first decode unit 453 to decode next remaining frame, which has not been transmitted yet.

(Judgement based on the actual generation code amount)

The coding unit 452, when not provided with the generation code amount prediction unit 503, predictive codes the decoded frame 7 by using the decoded frame 3 as the reference number, and detects the generation code amount of the predictive coded data to output to the second judging unit 508.

The second judging unit 508 compares the frame limit of the frame 7 outputted from the frame limit calculation unit 502 with the predictive generation code amount. Then the second judging unit 508 determines the possibility of displaying the data of frame 7 when the value obtained by subtracting the predictive generation code amount from the frame limit is below the threshold, and then outputs a display possibility signal to the control unit 511.

Upon detecting the display possibility signal, the control unit 511 directs the coding unit 452 to output predictive coded data to the transmission buffer 417.

Upon detecting the display impossibility signal, the control unit 511 directs the first decode unit 453 to decode next remaining frame, which has not been transmitted yet. (Decoding of next remaining frame)

It is assumed that the frame 7 has been judged to be incapable of being displayed. The remaining data of the frame 9 are decoded and reproduced in the second decode frame memory 464.

The decoded frame 9 is outputted to the coding unit 452 where the inter-frame difference or the prediction error between the decoded frame 9 and the latest-transmitted frame 3 is determined.

The judgement of data displaying possibility of each remaining frame is continued until a frame which can be displayed is detected.

When a remaining frame which can be displayed is detected, the coded data using the latest-transmitted frame as a reference frame is outputted to the transmission buffer 417, and reproduced in the second decode unit 454 and stored.

The subsequent frames are predictive coded and sequentially outputted to the transmission buffer 417.

<EMBODIMENT 4>

Figure 22:
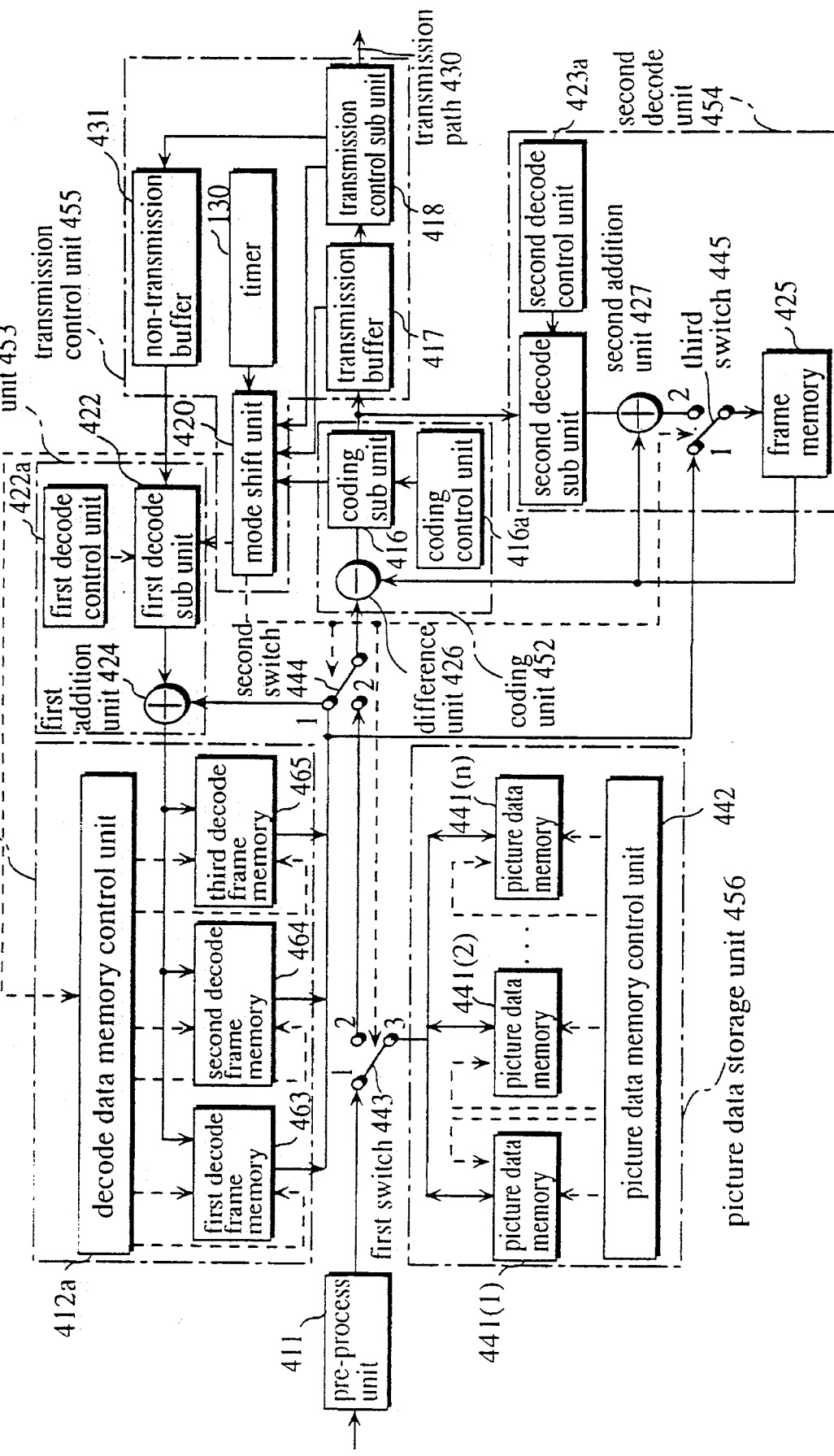
FIG. 22 shows the picture data coding apparatus of the fourth embodiment.

FIG. 22 shows the picture data coding apparatus of this embodiment. The apparatus comprises a pre-process unit 411, a decode data storage unit 451, a picture data storage unit 456, a coding unit 452, a first decode unit 453, a second decode unit 454, a transmission control unit 455, a first switch 443, a second switch 444, and a third switch 445.

The pre-process unit 411, the decode data storage unit 451, the coding unit 452, the first decode unit 453, and the second decode unit 454 are the same as those in the third embodiment, so that they are not described again. The decode memory control unit 412a has the same construction as the memory control unit 412 provided in the third embodiment.

Similar to the third embodiment, the transmission control unit 455 includes the transmission buffer 417, the transmission control sub unit 418, the mode shift unit 420, the timer 130, and the non-transmission buffer 431. The transmission buffer 417, the transmission control sub unit 418, the timer 130, and the non-transmission buffer 431 are the same as their equivalents in the third embodiment, so that they are not described again. The picture data storage unit 456, which is the same as that of the first embodiment, so that it is not described. The picture data storage unit 456 can also be used as the decode data storage unit 451 because they are identical.

The first, second, and third switches 443–445 can be electrically shifted by the control signal sent from the mode shift unit 420. The first switch 443 has three terminals 1, 2, and 3, two of which can be selectively connected.

Figure 24:
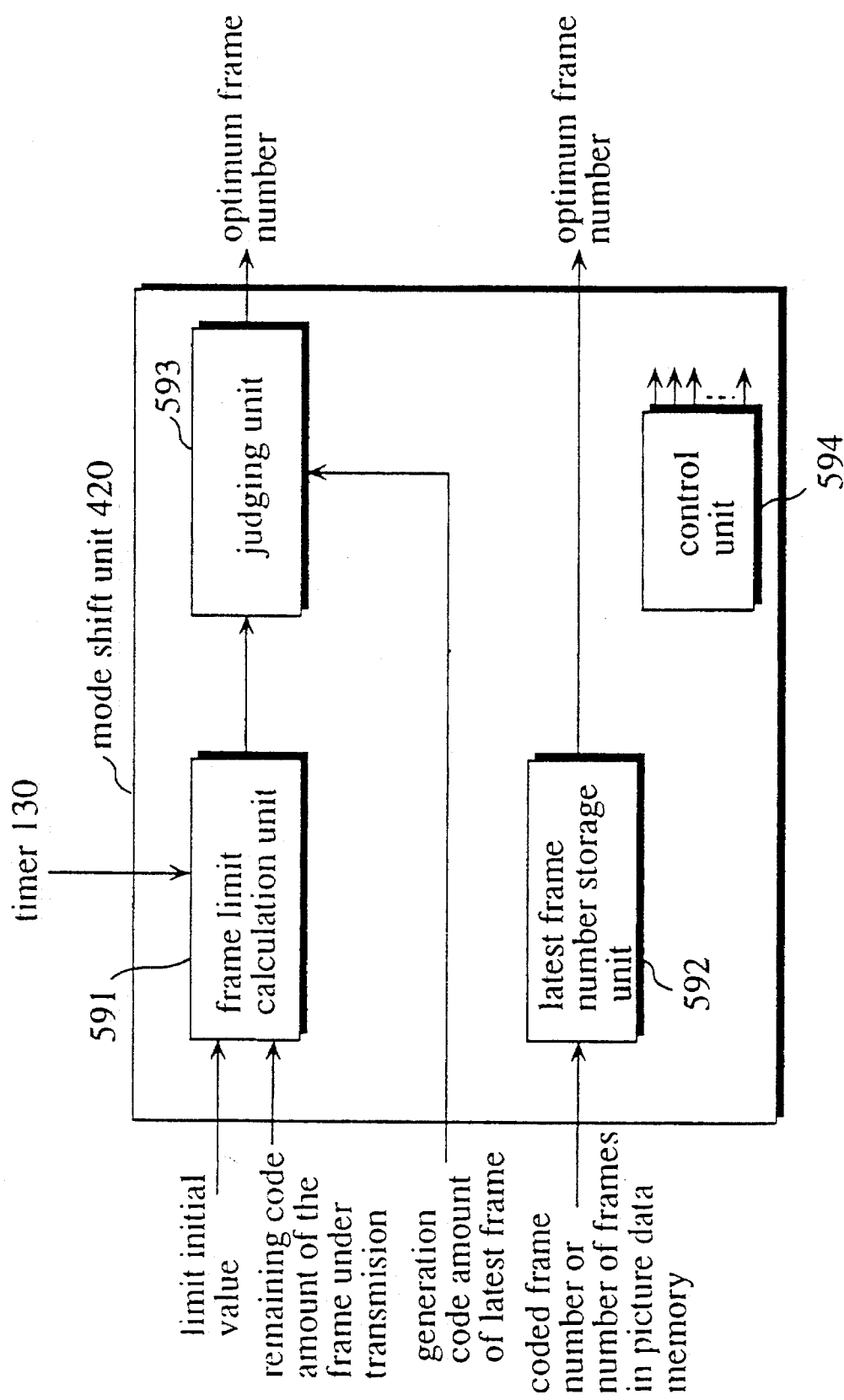
FIG. 24 shows the mode shift unit 420 of the picture data coding apparatus of the fourth embodiment.

As shown in FIG. 24, the mode shift unit 420 includes a frame limit calculation unit 591, a latest frame number storage unit 592, a judging unit 593, and a control unit 594a.

The latest frame number storage unit 592 stores the frame numbers of the latest frames stored in the picture data storage unit 456 and the decode data storage unit 451. The frame limit calculation unit 591 and the judging unit 593 are the same as their equivalents in the third embodiment, so that they are not described again.

The control unit 594a detects a transmission acknowledgement signal or a transmission impossibility signal sent from the transmission control sub unit 418. Upon detecting these signals, the control unit 594a controls the first switch 443 to put the terminals 1 and 3 in a connected state, thereby making the picture data storage unit 456 store each frame inputted from the pre-process unit 411.

The control unit 594a further detects the display impossibility signal for the frame under transmission, thereby controlling the first switch 443 to put the terminals 2 and 3 in a connected state. The control unit 594a directs the picture data storage unit 456 to output the frame number stored in the latest frame number storage unit 592 and to read the latest frame and to transfer it to the coding unit 452.

The control unit 594a controls the first switch 443 to put the terminals 1 and 2 back to a connected state as soon as the frame is transferred from the picture data storage unit 456 to the coding unit 452, and stores the picture data newly inputted to the pre-process unit 411 to the picture data storage unit 456.

The control unit 594a further directs the coding unit 452 to code the frame read out from the picture data storage unit 456 by using the latest-transmitted frame as a reference frame and to output the generation code amount of the coded frame to the judging unit 593.

Figure 23:
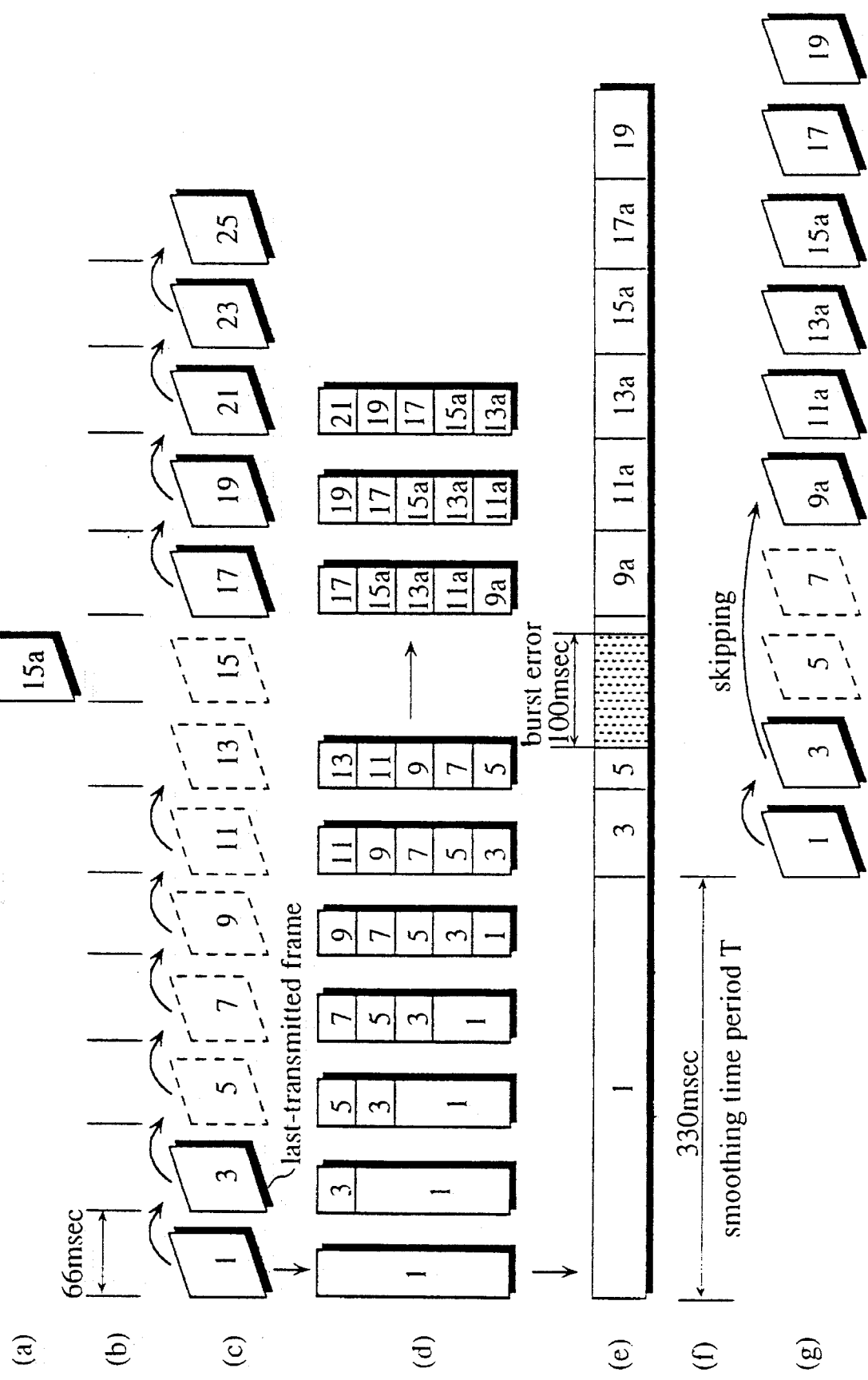
FIG. 23 shows the time charts (a)–(g) for explaining the operation of the picture data coding apparatus constructed as FIG. 22.

FIG. 23 shows the time charts (a)–(g) for explaining the operation of the picture data coding apparatus constructed as FIG. 22.

The time chart (a) shows a frame stored in n picture data memories 441(1)-(n) and sampled during a transmission error.

The time chart (b) shows the timing for sampling frames to be coded by the coding unit 452. The time chart (c) shows frames which are inputted from the pre-process unit 411 to the coding unit 452. The time chart (d) shows frames stored in the transmission buffer 417. The time chart (e) shows a transmission condition of each coded frame. The time chart (f) shows the smoothing time period "T". The time chart (g) shows the timing for displaying decoded frame on the display unit of the receiver.

As shown in the time chart (b), the coding unit 452 samples received frames, at 66 msec interval (one frame skipping). As shown in the time chart (f), the smoothing time period "T" corresponds to 330 msec. As shown in the time chart (g), the receiver displays the decoded frame at the end of the period "T". The time required for coding in the transmitter and for decoding in the receiver are not taken into account to simplify the operational explanation.

As shown in the time chart (e), if a burst error has occurred over the period corresponding to 100 msec while the coded frame 5 is under transmission. At this time point, the transmission buffer 417 has the coded frames 5, 7, 9, 11, and 13 which respectively use reference frames 3, 5, 7, 9, and 11.

It is assumed that the first decode frame memory 463 stores the coded frame 3 which is the latest-transmitted frame, and the second decode frame memory 464 stores the coded frame 5 which is being reproduced by the decode data of the frame 3.

(Sampling)

The transmission control sub unit 418 outputs a transmission impossibility signal to the mode shift unit 420 as soon as a transmission acknowledgement becomes impossible to get from the receiver because of a transmission error. Upon detecting the transmission impossibility signal sent from the transmission control sub unit 418, the mode shift unit 420 shifts the first switch 443 to put the terminals 1 and 3 in a connected state, thereby storing the inputted data to the picture data storage unit 456. In this case, the frame 15 is sampled as shown in FIG. 23(a).

(When a frame under transmission has been judged to be incapable of being displayed)
(Detection of generation code amount in the latest frame)

It is assumed that the transmission control sub unit 418 has detected the disappearance of the transmission error. The mode shift unit 420 shifts the first switch 443, and directs the picture data storage unit 456 to transfer the latest frame stored. At the same time, the mode shift unit 420 shifts the third switch 445 to put the terminal 1 in a connected state, and directs to transfer the latest-transmitted frame stored in the first decode frame memory 463 to the frame memory 425.

The mode shift unit 420 controls the third switch 445 to put the terminal 2 back to a connected state after the latest-transmitted frame has been transferred and, further controls the second switch 444 to put the terminal 1 in a connected state. The coding unit 452 codes the latest frame by using the latest-transmitted frame as a reference frame, thereby detecting the generation code amount. The coding unit 452 output the detected generation code amount to the mode shift unit 420. (Reproduction of a remaining frame and detection of the optimum frame)

Hereinafter, the picture data coding apparatus of this embodiment makes the decode data storage unit 451 sequentially reproduce and store the remaining frames in the same manner as the picture data coding apparatus shown in FIG. 15.

The mode shift unit 420 judges the possibility of displaying each remaining frame by using the generation code amount as a predictive generation code amount, and upon detecting the presence of a remaining frame which can be displayed, output the frame number of the remaining frame as the optimum frame to the decode data memory control unit 412a.

(Coding of the optimum frame and subsequent frames)

Consequently, the decoded optimum frame is read out of the storing area of the decode data storage unit 451 and is transferred to the coding unit 452. Then, the optimum frame is predictive coded by the coding unit 452 by using the last-transmitted frame as a reference frame, thereby outputting to the transmission buffer 417.

In FIG. 23, the frame 9 has been detected as the optimum frame. When the coded optimum frame is outputted to the transmission buffer 417, the prediction error of the optimum frame is decoded in the same manner as the conventional picture data coding unit. As a result, the decoded optimum frame is stored in the frame memory 425, and subsequent frames are sequentially predictive coded and outputted to the transmission buffer 417.

(Coding of a frame in the picture data storage unit 456)

When all the remaining frames following the optimum frame are coded and outputted to the transmission buffer 417, the mode shift unit 420 directs the first switch 443 to put the terminals 2 and 3 in a connected state and the second and third switches 444 and 445 to put the terminals 2 in a connected state. Thus, the mode shift unit 420 codes the picture data stored in the picture data storage unit 456, and outputs the coded data to the transmission buffer 417.

(Transmission)

When the transmission condition of the transmission path 430 get recovered, and the transmission control unit 455 is informed of the receipt of the data from the receiver, the transmission control sub unit 418 outputs a transmission acknowledgement signal to the mode shift unit 420. Upon detecting the transmission acknowledgement signal, the mode shift unit 420 directs the first switch 443 to put the terminals 1 and 2 in a connected state and further directs the coding unit 452 to predictive code the picture data inputted from the pre-process unit 411. Thus, the picture data coding apparatus returns to the normal operation.

At this point, as shown in FIG. 23, the transmission buffer 417 has coded data 9a, 11a, 13a, 15a and 17a of the frames 9, 11, 13, 15 and 17 which respectively use the frames 3, 9, 11, 13, and 15a as reference frames. The frame 17 has been sampled after the transmission condition of the transmission path is recovered. These coded data are transmitted to the receiver. Thus, only the frames 5 and 7 are skipped on the display unit of the receiver.

The mode shift unit 420 may be store the generation code amount of the latest frame stored in the picture data storage unit 456 in a separate memory as predictive generation code amount.

Although the present invention has been fully described by way of examples with reference to the accompanying drawings, it is to be noted that various changes and modification will be apparent to those skilled in the art. Therefore, unless such changes and modifications depart from the scope of the present invention, they should be construed as being included therein.

What is claimed is:

1. A picture data coding apparatus for predictive coding a series of inputted frames, each of the frames being composed of picture data, and for displaying said frames on a display of a receiver at an end of a predetermined smoothing time period, said smoothing time period following a sampling operation of each frame and being provided for smoothing dispersion in time required for coding, transmitting, and decoding each sampled frame, said picture data coding apparatus comprising:

a picture data storage means, which includes a storage area for storing at least one frame, for receiving said frames at a predetermined interval, for sampling every m frame received, and for storing sampled frames to said storage area, said m being a natural number;

a latest-transmitted frame storage means for storing a same frame as a frame which has been transmitted latest;

a coding means for predictive coding each frame inputted;

a transmission means for transmitting each coded frame to the receiver via a transmission path;

a first judging means for judging every predetermined point of time whether or not a frame under transmission can be displayed on the display of the receiver, from a remaining time before a displaying operation of the frame from a current time point, remaining amount of code of the frame, and a decode time of the frame, said frame under transmission being a frame which is being transmitted;

a second judging means for judging whether or not each frame stored in said picture data storage means can be displayed on the display of the receiver, from a remaining time before a displaying operation of the frame from a current time point, amount of code of the frame, a coding time, and a decode time of the frame;

a system control means for, when said first judging means has judged that the frame under transmission cannot be displayed, directing said picture data storage means to transfer a frame stored therein to said second judging means, and for, when said second judging means has judged that the frame stored in said picture data storage means can be displayed, directing said picture data storage means to transfer said frame that has been judged to be capable of being displayed, to said coding means, and further directing said latest-transmitted frame storage means to transfer a latest-transmitted frame to the coding means, as a reference frame.

2. The picture data coding apparatus of claim 1, wherein said picture data storage means comprising:

n picture data memories, said n being a natural number and each of said n picture data memories comprising said storage area; and a write control means for writing each received frame to a respective one of said n picture data memories, by numbering each frame, when said first judging means has judged that a frame under transmission cannot be displayed, said system control means controls said picture data storage means to transfer frames stored in said n picture data memories starting from a smallest numbered frame to said second judging means, and, when said second judging means has judged that the frame stored in said picture data storage means can be displayed, said system control means further controls said picture data storage means to transfer frames stored in said n picture data memories to said coding means.

3. The picture data coding apparatus of claim 2, wherein said transmission means comprises:

a transmission buffer for storing predictive coded frames outputted from said coding means; and a transmission control means for controlling said transmission buffer to output the predictive coded frames to said transmission path on a first-in, first-out basis and to output a next predictive coded frame to said transmission path when a receipt of a predictive coded frame that has been transmitted latest has been reported by the receiver, and to reoutput the latest-transmitted frame when no receipt thereof has been reported;

wherein said first judging means comprises:

a remaining code amount detection means for detecting amount of remaining coded data of a frame under transmission, the coded data of the frame remaining in said transmission buffer;

a first transmission time calculation means for calculating a transmission time required for transmitting the remaining coded data, based on the detected remaining code amount, using an equation shown below:

(a transmission time of remaining coded data) = (remaining code amount) / (a predetermined transmission rate);

a first decode time calculation means for detecting and storing generation code amount, said generation code amount being amount of code generated through a predictive coding operation, thereby calculating decode time of the frame under transmission, using an equation shown below:

(decode time) = (generation code amount) / (a predetermined decode rate);

a first remaining time detection means for detecting a remaining time before a displaying operation of the frame from a current time point;

a first comparison means for comparing said remaining time and a sum of said decode time and said transmission time; and said first judging means judges that a frame which meets a requirement expressed by an inequality shown below can be displayed on the display of the receiver:

(remaining time before a displaying operation) > (transmission time of remaining coded data) + (decoding time);

wherein said second judging means comprises:

a code amount prediction means for predicting generation code amount of a frame stored in said picture data storage means;

a second transmission time calculation means for calculating a transmission time of a frame stored in said picture data storage means, based on the predicted code amount, using an equation shown below:

(transmission time) = (predicted code amount) / (predetermined transmission rate);

a coding time calculation means for calculating a time required for coding a frame stored in said picture data storage means, based on the predicted code amount, using an equation shown below:

(coding time) = (predicted code amount) / (predetermined transmission rate);

a second decode time calculation means for calculating a decode time of a frame stored in said picture data storage means, based on the predicted code amount, using an equation shown below:

(decode time) = (predictive code amount) / (predetermined decode rate);

a second remaining time detection means for detecting remaining time before a displaying operation of the frame from a current time point;

a second comparison means for comparing said remaining time and a sum of said coding time, said decode time, said transmission time; and said second judging means judges that a frame which meets a requirement expressed by an inequality shown below can be displayed on the display of the receiver:

(remaining time before a displaying operation) > (coding time) + (transmission time for the coded data) + (decoding time).

4. The picture data coding apparatus of claim 3, wherein said code amount prediction means comprises:

an inter-frame difference detection unit for detecting an inter-frame difference value between a frame to be judged by said second judging means and a latest-transmitted frame by detecting a difference between one decoded block in said frame to be judged by said second judging means and picture data of a block located in a corresponding position to the decoded block in the latest-transmitted frame;

a cross conversion unit for cross converting the inter-frame difference detected by said inter-frame difference detection unit;

a no-data block detection unit for regarding a block whose cross conversion coefficients are all smaller than a predetermined threshold as a no-data block and for detecting a number of no-data blocks contained in said frame to be judged by said second judging means;

a code amount calculation unit for determining a number of effective blocks, based on the detected number of no-data blocks and for calculating generation code amount, based on an equation shown below:

(effective block number) = (entire block number) − (no-data block number)

(generation code amount) = (generation code amount per effective block in a latest-coded frame) * (effective block number).

5. The picture data coding apparatus of claim 3, wherein said code amount prediction means comprises:

a latest frame number storage unit for storing a frame number of a frame that has been stored latest in said picture data storage means;

a code amount prediction control unit for, when said first judging means has judged that the frame under transmission cannot be displayed, for directing said coding means to code a frame whose frame number is stored in said latest frame number storage means by using the latest-transmitted frame as a reference frame, and to detect generation code amount, and for predicting said generation code amount as generation code amount of a frame to be judged by said second judging means.

6. The picture data coding apparatus of claim 3, wherein each of said first remaining time detection means and said second remaining time detection means comprises:

an initial value output unit for outputting said predetermined smoothing time period;

a timer for outputting a signal every predetermined lapse time;

a first selector having one output terminal and two input terminals for receiving two input signals, one of said two input terminals receiving an output signal of said initial value output unit, and for selecting one of said two input signals in accordance with a selection signal sent from said system control means;

an lapse time subtraction unit for subtracting said lapse time from an output of said first selector every time said signal sent from said timer has been detected, and for outputting a result to said first comparison means;

n addition units, each of said n addition units adding an output of said lapse time subtraction unit and a product of said lapse time and k, said k being a natural number between 1 and n inclusive;

a second selector for selecting a signal among said n signals outputted from said n addition units in accordance with said selection signal sent from said system control means and for outputting the selected signal to said second comparison means and said first selector;

wherein at a beginning of an operation of said picture data coding apparatus, said system control means outputs said selection signal to said first selector for selecting a signal outputted from said initial value output unit among the two signals;

every time said second judging means starts a judging operation, said system control means outputs to said second selector said selection signal for sequentially selecting said n signals;

when said second judging means judges for the first time that a frame can be displayed, said system control means outputs to said first selector said selection signal for selecting said output of said second selector.

7. The picture data coding apparatus of claim 6, wherein each of said first remaining time detection means and said second remaining time detection means further comprises n subtraction units for subtracting transmission time required for transmitting remaining coded data in a frame under transmission from n output signals outputted from said n addition units, thereby outputting results to said second selector.

8. The picture data coding apparatus of claim 4, wherein each of said first remaining time detection means and said second remaining time detection means, in place of said n addition units and said second selector, comprises:

a time difference detection unit for detecting a time difference between a time point on which a frame under transmission is sampled and a frame stored in said picture data storage means is sampled, said time difference being detected as a negative value when the frame stored in said picture data storage means precedes the frame under transmission; and a time difference addition unit for adding the detected time difference and an output of said lapse time subtraction unit, and for outputting an obtained result to said second comparison means and said first selector.

9. A picture data coding apparatus for predictive coding a series of inputted frames, each of the frames being composed of picture data, and for displaying said frames on a display of a receiver at an end of a predetermined smoothing time period, said smoothing time period following a sampling operation of each frame and being provided for smoothing dispersion in time required for coding, transmitting, and decoding each sampled frame, said picture data coding apparatus comprising:

a reference frame storage means having a capacity to store at least one frame for storing a predetermined frame;

a coding means for sampling every predetermined number of inputted frames and for predictive coding sampled frames by using, as reference frames, at least a latest-transmitted frame stored in said reference frame storage means and a frame under transmission;

a coded data storage means having storage areas to store at least two coded frames for storing predictive coded frames;

a transmission means for transmitting each coded frame to the receiver via a transmission path;

a first judging means for judging every predetermined point of time whether or not a frame under transmission can be displayed on the display of the receiver, from a remaining time before a displaying operation of the frame from a current time point, amount of coded data of the frame, and a decode time of the frame;

a second judging means for judging whether or not each frame stored in said coded data storage means can be displayed on the display of the receiver, from a remaining time before a displaying operation of the frame from a current time point, amount of coded data of the frame, and a decode time of the frame; and a system control means for, when said first judging means has judged that the frame under transmission cannot be displayed, directing said coded data storage means to read a frame which uses a predetermined frame as a reference frame among frames stored in said storage area and to transfer the read frame to said second judging means, and for, when said second judging means has judged that the frame stored in said coded data storage means can be displayed, directing said coded data storage means to transfer said frame that has been judged to be capable of being displayed, to said coding means.

10. The picture data coding apparatus of claim 9, wherein said coded data storage means comprises:

a coded data memory having a storage area for storing a coded frame;

a write control means for writing a predetermined frame, among coded frames received from said coding means, which has been sampled after the frame under transmission and use a latest-transmitted frame as a reference frame, said predetermined frame being written by being associated with a frame number and a reference frame number; and when said first judging means has judged that a frame under transmission cannot be displayed, said system control means controls said coded data storage means to transfer a coded frame stored in said coded data memory to said second judging means, and, when said second judging means has judged that the frame stored in said coded data memory can be displayed, said system control means further controls said coded data storage means to read the frame stored in said coded data memory and to transfer to said transmission means.

11. The picture data coding apparatus of claim 9, wherein said coded data storage means comprises:

n coded data memories, said n being a natural number and each of said n coded data memories having a storage area for storing coded frame;

a write control means for sequentially writing coded frames received from said coding means to said n coded data memories by associating with a respective frame number and a respective reference frame number; and when said first judging means has judged that a frame under transmission cannot be displayed, said system control means controls said coded data storage means to transfer coded frames stored in said n coded data memories starting from a smallest numbered frame to said second judging means, and, when said second judging means has judged that the frame transferred from one of said n coded data memories can be displayed, said system control means further controls said coded data storage means to read a coded frame which has been judged to be capable of being displayed, by using a predetermined frame as a reference frame among the coded frames stored in said coded data storage means and to transfer the coded frame to said transmission means.

12. The picture data coding apparatus of claim 11, wherein said transmission means comprises:

a transmission buffer for storing predictive coded frames outputted from said coding means; and a transmission control means for controlling said transmission buffer to output the predictive coded frames to said transmission path on a first-in, first-out basis and to output a next predictive coded frame to said transmission path when a receipt of a predictive coded frame that has been transmitted latest has been reported by the receiver, and to reoutput the latest-transmitted frame when no receipt thereof has been reported;

wherein said first judging means comprises:

a remaining code amount detection means for detecting amount of remaining code of a frame under transmission, the code remaining in said transmission buffer;

a first transmission time calculation means for calculating a transmission time required for transmitting the remaining coded data, based on the detected remaining code amount, using an equation shown below:

(a transmission time of remaining coded data) = (remaining code amount) / (a predetermined transmission rate);

a first decode time calculation means for detecting and storing generation code amount, said generation code amount being amount of code generated through a predictive coding operation, thereby calculating decode time of the frame under transmission, using an equation shown below:

(decode time) = (generation code amount) / (a predetermined decode rate);

a first remaining time detection means for detecting a remaining time before a displaying operation of the frame from a current time point;

a first comparison means for comparing said remaining time and a sum of said decode time and said transmission time; and wherein said second judging means comprises:

a code amount prediction means for predicting generation code amount of a frame stored in said coded data storage means;

a second transmission time calculation means for calculating a transmission time of a frame stored in said coded data storage means, based on the predicted code amount, using an equation shown below:

(transmission time) = (predicted code amount) / (predetermined transmission rate);

a second decode time calculation means for calculating a decode time of a frame stored in said coded data storage means, based on the predicted code amount, using an equation shown below:

(decode time) = (predictive code amount) / (predetermined decode rate);

a second remaining time detection means for detecting remaining time before a displaying operation of the frame stored in said coded data storage means from a current time point; and a second comparison means for comparing said remaining time and a sum of said decode time and said transmission time;

said first judging means judges that a frame which meets a requirement expressed by an inequality shown below can be displayed on the display of the receiver:

(remaining time before a displaying operation) > (transmission time of remaining coded data) + (decoding time);

said second judging means judges that a frame which meets a requirement expressed by an inequality shown below can be displayed on the display of the receiver:

(remaining time before a displaying operation) > (transmission time for the coded data) + (decoding time).

13. The picture data coding apparatus of claim 12, wherein each of said first remaining time detection means and said second remaining time detection means comprises:

an initial value output unit for outputting said predetermined smoothing time period;

a timer for outputting a signal every predetermined lapse time;

a first selector having one output terminal and two input terminals for receiving two input signals, one of said two input terminals receiving an output signal of said initial value output unit, and for selecting one of said two input signals in accordance with a selection signal sent from said system control means;

an lapse time subtraction unit for subtracting said lapse time from an output of said first selector every time said signal sent from said timer has been detected, and for outputting a result to said first comparison means;

n addition units, each of said n addition units adding an output of said lapse time subtraction unit and a product of said lapse time and k, said k being a natural number between 1 and n inclusive;

a second selector for selecting a signal among said n signals outputted from said n addition units in accordance with said selection signal sent from said system control means and for outputting the selected signal to said second comparison means and said first selector;

wherein at a beginning of an operation of said picture data coding apparatus, said system control means outputs said selection signal to said first selector for selecting a signal outputted from said initial value output unit among the two signals;

every time said second judging means starts a judging operation, said system control means outputs to said second selector said selection signal for sequentially selecting said n signals; and when said second judging means judges that a frame under transmission can be displayed for the first time after said first judging means has judged that the frame under transmission cannot be displayed, said system control means outputs to said first selector said selection signal for selecting said output of said second selector.

14. The picture data coding apparatus of claim 13, wherein each of said first remaining time detection means and said second remaining time detection means further comprises n subtraction units for subtracting transmission time required for transmitting remaining coded data in a frame under transmission from n output signals outputted from said n addition units, thereby outputting results to said second selector.

15. The picture data coding apparatus of claim 13, wherein each of said first remaining time detection means and said second remaining time detection means, in place of said n addition units and said second selector, comprises:

a time difference detection unit for detecting a time difference between a time point on which a frame under transmission is sampled and a frame stored in said coded data storage means is sampled, said time difference being detected as a negative value when the frame stored in said coded data storage means precedes the frame under transmission; and a time difference addition unit for adding the detected time difference and an output of said lapse time subtraction unit, and for outputting an obtained result to said second comparison means and said first selector.

16. A picture data coding apparatus for predictive coding a series of inputted frames, each of the frames being composed of picture data, and for displaying said frames on a display of a receiver at an end of a predetermined smoothing time period, said smoothing time period following a sampling operation of each frame and being provided for smoothing dispersion in time required for coding, transmitting, and decoding each sampled frame, said picture data coding apparatus comprising:

a coding means for predictive coding each inputted frame from a smallest numbered frame;

a transmission means having a transmission buffer for storing coded frames to be transmitted, for storing coded frames coded by said coding means to said transmission buffer and transferring each coded frame from a smallest numbered frame from said transmission buffer to the receiver via a transmission path;

a first judging means for judging whether or not a frame under transmission can be displayed on the display of the receiver at the end of said smoothing time period;

a picture data reproduction means for applying a process opposite to the coding operation to coded frames coded by said coding means until said first judging means has been judged that a frame under transmission cannot be displayed, and for substantially reproducing picture data before the coding operation; and when said first judging means has been judged that a frame under transmission cannot be displayed, applying said process opposite to the coding operation to all remaining frames in said transmission buffer at that time and for substantially reproducing picture data before the coding operation;

a reproduced data storage means having a storage area for storing at least four reproduced frames, two of said four reproduced frames being a latest-transmitted frame and a latest-coded frame among frames reproduced by said picture data reproduction means;

a second judging means for judging whether or not every remaining frame in said transmission buffer can be displayed on the display of the receiver at the end of said smoothing time period; and a system control means for controlling said coding means to code a reproduced frame which has been first judged to be capable of being displayed, by using, as a reference frame, a latest-transmitted frame whose receipt has been informed from the receiver and further to code a next inputted frame in a same manner as a newly inputted frame by using, as a reference frame, a frame which has been coded immediately before said next inputted frame and to transfer the coded frame to said transmission means.

17. The picture data coding apparatus of claim 16, wherein said first judging means comprises:

a remaining code amount detection means for detecting amount of remaining coded data of a frame under transmission, the coded data of the frame remaining in said transmission buffer;

a first transmission time calculation means for calculating a transmission time required for transmitting the remaining coded data, based on the detected remaining code amount, using an equation shown below:

(a transmission time of remaining coded data) = (remaining code amount) / (a predetermined transmission rate);

a first decode time calculation means for detecting and storing generation code amount, said generation code amount being amount of code generated through a predictive coding operation, thereby calculating decode time of the frame under transmission, using an equation shown below:

(decode time) = (generation code amount) / (a predetermined decode rate);

a first remaining time detection means for detecting a remaining time before a displaying operation of the frame from a current time point; and a first comparison means for comparing said remaining time and a sum of said decode time and said transmission time, wherein said second judging means comprises:

a code amount prediction means for predicting generation code amount of a frame stored in said reproduced data storage means when the frame is coded;

a second transmission time calculation means for calculating a transmission time of the frame stored in said reproduced data storage means, based on the predicted code amount, using an equation shown below:

(transmission time) = (predicted code amount) / (predetermined transmission rate);

a coding time calculation means for calculating a time required for coding a frame stored in said picture data storage means, based on the predicted code amount, using an equation shown below:

(coding time) = (predicted code amount) / (predetermined transmission rate);

a second decode time calculation means for calculating a decode time of a frame stored in said picture data storage means, based on the predicted code amount, using an equation shown below:

(decode time) = (predictive code amount) / (predetermined decode rate);

a second remaining time detection means for detecting remaining time before a displaying operation of the frame stored in said reproduced data storage means from a current time point;

a second comparison means for comparing said remaining time and a sum of said coding time, said decode time, and said transmission time; and said first judging means judges that a frame which meets a requirement expressed by an inequality shown below can be displayed on the display of the receiver:

(remaining time before a displaying operation) > (transmission time of remaining coded data) + (decode time);

said second judging means judges that a frame which meets a requirement expressed by an inequality shown below can be displayed on the display of the receiver:

(remaining time before a displaying operation) > (coding time) + (transmission time for the coded data) + (decode time).

18. The picture data coding apparatus of claim 17, wherein each of said first remaining time detection means and said second remaining time detection means comprises:

an initial value output unit for outputting said predetermined smoothing time period;

a timer for outputting a signal every predetermined lapse time;

a first selector having one output terminal and two input terminals for receiving two input signals, one of said two input terminals receiving said smoothing time period outputted from said initial value output unit, and for selecting and outputting one of said two input signals in accordance with a selection signal sent from said system control means;

an lapse time subtraction unit for subtracting said lapse time from an output of said first selector every time said signal sent from said timer has been detected, and for outputting a result to said first comparison means;

n addition units, each of said n addition units adding an output of said lapse time subtraction unit and a product of said lapse time and k, said k being a natural number between 1 and n inclusive;

a second selector for selecting a signal among said n signals outputted from said n addition units in accordance with said selection signal sent from said system control means and for outputting the selected signal to said second comparison means and said first selector;

wherein at a beginning of an operation of said picture data coding apparatus, said system control means outputs said selection signal to said first selector for selecting a signal outputted from said initial value output unit among the two signals;

every time said second judging means starts a judging operation, said system control means outputs to said second selector said selection signal for sequentially selecting said n signals;

when said second judging means judges for the first time that a frame can be displayed, said system control means outputs to said first selector said selection signal for selecting said output of said second selector.

19. The picture data coding apparatus of claim 17, wherein each of said first remaining time detection means and said second remaining time detection means further comprises n subtraction units for subtracting transmission time required for transmitting remaining coded data in a frame under transmission from said n output signals outputted from said n addition units, thereby outputting results to said second selector.

20. The picture data coding apparatus of claim 17, wherein said code amount prediction means comprises:

an inter-frame difference detection unit for detecting an inter-frame difference value between a frame to be judged and a latest-transmitted frame by detecting a difference between one decoded block in said frame to be judged by said second judging means and picture data of a decoded block located in a corresponding position to the decoded block to be judged, in the latest-transmitted frame;

a cross conversion unit for cross converting the interframe difference detected by said inter-frame difference detection unit;

a no-data block detection unit for regarding a block whose cross conversion coefficients are all smaller than a predetermined threshold as a no-data block and for detecting a number of no-data blocks contained in said frame to be judged by said second judging means;

a code amount calculation unit for determining a number of effective blocks, based on the detected number of no-data blocks and for calculating generation code amount, based on an equation shown below: (effective block number) = (entire block number) − (no-data block number) (generation code amount) = (generation code amount per effective block in a latest-coded frame) * (effective block number)

21. The picture data coding apparatus of claim 17, wherein said code amount prediction means comprises a code amount prediction control unit for, when said first judging means has judged that the frame under transmission cannot be displayed, for directing said coding means to code a latest-coded frame which has been stored in said transmitted buffer and then decoded, by using the latest-transmitted frame as a reference frame and for regarding said generation code amount as generation code amount of a frame to be judged by said second judging means.

22. The picture data coding apparatus of claim 16, further comprising:

a picture data storage means, which includes a storage area for storing at least one frame; and a memory control means for controlling said picture data storage means to store frames sampled during a presence of a transmission error, and to transfer each frame stored in said picture data storage means to said coding means after a transfer of a latest-reproduced frame to said coding means has been completed.

23. The picture data coding apparatus of claim 22, wherein said first judging means comprises:

a remaining code amount detection means for detecting amount of remaining coded data of a frame under transmission, the coded data of the frame remaining in said transmission buffer;

a first transmission time calculation means for calculating a transmission time required for transmitting the remaining coded data, based on the detected remaining code amount, using an equation shown below:

(a transmission time of remaining coded data) = (remaining code amount) / (a predetermined transmission rate);

a first decode time calculation means for detecting and storing generation code amount, said generation code amount being amount of code generated through a predictive coding operation, thereby calculating decode time of the frame under transmission, using an equation shown below:

(decode time) = (generation code amount) / (a predetermined decode rate);

a first remaining time detection means for detecting a remaining time before a displaying operation of the frame from a current time point; and a first comparison means for comparing said remaining time and a sum of said decode time and said transmission time, wherein said second judging means comprises:

a code amount prediction means for predicting generation code amount of a reproduced frame when the reproduced frame stored in said picture data reproduction means;

a second transmission time calculation means for calculating a transmission time of a frame stored in said reproduced data storage means and said picture data storage means, based on the predicted code amount, using an equation shown below:

(transmission time) = (predicted code amount) / (predetermined transmission rate);

a coding time calculation means for calculating a time required for coding a frame stored in said picture data storage means, based on the predicted code amount, using an equation shown below:

(coding time) = (predicted code amount) / (predetermined transmission rate);

a second decode time calculation means for calculating a decode time of a frame stored in said picture data storage means, based on the predicted code amount, using an equation shown below:

(decode time) = (predictive code amount) / (predetermined decode rate);

a second remaining time detection means for detecting remaining time before a displaying operation of the frame stored in said reproduced data storage means and said picture data storage means from a current time point;

a second comparison means for comparing said remaining time and a sum of said coding time, said decode time, and said transmission time; and said first judging means judges that a frame which meets a requirement expressed by an inequality shown below can be displayed on the display of the receiver:

(remaining time before a displaying operation) > (transmission time of remaining coded data) + (decode time);

said second judging means judges that a frame which meets a requirement expressed by an inequality shown below can be displayed on the display of the receiver:

(remaining time before a displaying operation) > (coding time) + (transmission time for the coded data) + (decode time).

24. The picture data coding apparatus of claim 23, wherein said code amount prediction means comprises:

an inter-frame difference detection unit for detecting an inter-frame difference value between a frame to be judged and a latest-transmitted frame by detecting a difference between one block in said frame to be judged by said second judging means and picture data of a decoded block located in a corresponding position to the decoded block to be judged, in the latest-transmitted frame;

a cross conversion unit for cross converting the interframe difference detected by said inter-frame difference detection unit;

a no-data block detection unit for regarding a block whose cross conversion coefficients are all smaller than a predetermined threshold as a no-data block and for detecting a number of no-data blocks contained in said frame to be judged by said second judging means;

a code amount calculation unit for determining a number of effective blocks, based on the detected number of no-data blocks and for calculating generation code amount, based on an equation shown below:

(effective block number) = (entire block number) − (no-data block number)

(generation code amount) = (generation code amount per effective block in a latest-coded frame) * (effective block number).

25. The picture data coding apparatus of claim 23, wherein said code amount prediction means further comprises:

a latest-stored frame number storage means for storing a frame number of a latest-stored frame among frames stored in said picture data storage means and said reproduced data storage means; and a code amount prediction control unit for, when said first judging means has judged that the frame under transmission cannot be displayed, directing said coding means to code a frame whose frame number is stored in said latest-stored frame number storage means and the reproduced data by using the latest-transmitted frame as a reference frame and to detect its generation code amount and regarding said generation code amount as generation code amount of a frame to be judged by said second judging means.

26. The picture data coding apparatus of claim 23, wherein each of said first remaining time detection means and said second remaining time detection means comprises:

an initial value output unit for outputting said predetermined smoothing time period;

a timer for outputting a signal every predetermined lapse time;

a first selector having one output terminal and two input terminals for receiving two input signals, one of said two input terminals receiving said smoothing time period outputted from said initial value output unit, and for selecting and outputting one of said two input signals in accordance with a selection signal sent from said system control means;

an lapse time subtraction unit for subtracting said lapse time from an output of said first selector every time said signal sent from said timer has been detected, and for outputting a result to said first comparison means;

n addition units, each of said n addition units adding an output of said lapse time subtraction unit and a product of said lapse time and k, said k being a natural number between 1 and n inclusive;

a second selector for selecting a signal among said n signals outputted from said n addition units in accordance with said selection signal sent from said system control means and for outputting the selected signal to said second comparison means and said first selector;

wherein at a beginning of an operation of said picture data coding apparatus, said system control means outputs said selection signal to said first selector for selecting a signal outputted from said initial value output unit among the two signals;

every time said second judging means starts a judging operation, said system control means outputs to said second selector said selection signal for sequentially selecting said n signals;

when said second judging means judges for the first time that a frame can be displayed, said system control means outputs to said first selector said selection signal for selecting said output of said second selector.

27. The picture data coding apparatus of claim 26, wherein each of said first remaining time detection means and said second remaining time detection means further comprises n subtraction units for subtracting transmission time required for transmitting remaining coded data in a frame under transmission from said n output signals outputted from said n addition units, thereby outputting a result to said second selector.

\* \* \* \* \*